United States Patent
Kawata et al.

(10) Patent No.: US 9,162,422 B2
(45) Date of Patent: Oct. 20, 2015

(54) HIGH-STRENGTH HOT-DIP GALVANIZED STEEL SHEET, HIGH-STRENGTH ALLOYED HOT-DIP GALVANIZED STEEL SHEET EXCELLENT IN BAKE HARDENABILITY, AND MANUFACTURING METHOD THEREOF

(71) Applicant: NIPPON STEEL & SUMITOMO METAL CORPORATION, Tokyo (JP)

(72) Inventors: Hiroyuki Kawata, Tokyo (JP); Naoki Maruyama, Tokyo (JP); Akinobu Murasato, Tokyo (JP); Akinobu Minami, Tokyo (JP); Takeshi Yasui, Tokyo (JP); Takuya Kuwayama, Tokyo (JP); Hiroyuki Ban, Tokyo (JP); Kaoru Hiramatsu, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/348,536

(22) PCT Filed: Sep. 28, 2012

(86) PCT No.: PCT/JP2012/075218
§ 371 (c)(1),
(2) Date: Mar. 28, 2014

(87) PCT Pub. No.: WO2013/047821
PCT Pub. Date: Apr. 4, 2013

(65) Prior Publication Data
US 2014/0234660 A1    Aug. 21, 2014

(30) Foreign Application Priority Data

Sep. 30, 2011 (JP) ................. 2011-218775

(51) Int. Cl.
*B32B 15/01* (2006.01)
*B32B 15/04* (2006.01)
(Continued)

(52) U.S. Cl.
CPC ................. *B32B 15/013* (2013.01); *B21B 1/22* (2013.01); *B21B 1/26* (2013.01); *B21B 3/00* (2013.01); *C21D 9/00* (2013.01); *C21D 9/46* (2013.01); *C22C 18/04* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/58* (2013.01); *C23C 2/02* (2013.01); *C23C 2/06* (2013.01); *C23C 2/26* (2013.01); *C23C 2/28* (2013.01); *C23C 2/40* (2013.01); *C23C 30/005* (2013.01); *B21B 2001/225* (2013.01); *B21B 2001/228* (2013.01); *Y10T 428/12618* (2015.01);
(Continued)

(58) Field of Classification Search
CPC .... B32B 15/01; B32B 15/012; B32B 15/013; B32B 15/04; B32B 15/043; B32B 15/18; C23C 2/12; C23C 2/40; C23C 2/26; C23C 2/02; C23C 2/06; C23C 2/28; C23C 30/00; C23C 30/005; C22C 18/04; C22C 18/00; C22C 38/00; C22C 38/001; C22C 38/002; C22C 38/005; C22C 38/02; C22C 38/04; C22C 38/06; C22C 38/08; C22C 38/12; C22C 38/14; C22C 38/16; C22C 38/18; C22C 38/20; C22C 38/22; C22C 38/24; C22C 38/26; C22C 38/28; C22C 38/32; C22C 38/34; C22C 38/38; C22C 38/40; C22C 38/42; C22C 38/44; C22C 38/46; C22C 38/48; C22C 38/50; C22C 38/52; C22C 38/54; C22C 38/58; Y10T 428/12799; Y10T 428/12965; Y10T 428/12972; Y10T 428/264; Y10T 428/265; Y10T 428/2495; Y10T 428/24967; Y10T 428/12618

USPC ......... 428/659, 628, 629, 632, 633, 639, 683, 428/684, 213, 215, 220, 332, 336, 335

See application file for complete search history.

(56) References Cited

U.S. PATENT DOCUMENTS 6,066,212 A    5/2000  Koo et al.
6,159,312 A    12/2000 Koo et al.
(Continued)

FOREIGN PATENT DOCUMENTS

CN    101310031 A    11/2008
JP    09-143570    *    6/1997
(Continued)

OTHER PUBLICATIONS

Machine Translation, Morita et al., JP 09-143570, Jun. 1997.*
(Continued)

*Primary Examiner* — Michael E La Villa
(74) *Attorney, Agent, or Firm* — Birch, Stewart, Kolasch & Birch, LLP

(57) ABSTRACT

Steel contains each of C, Si, Mn, P, S, Al, N, O, at a range from ⅛ thickness centered around a ¼ sheet thickness from a surface to ⅜ thickness centered around the ¼ sheet thickness from the surface at a base steel sheet, a structure of the base steel sheet contains, in volume fraction, 3% or more of a retained austenite phase, 50% or less of a ferrite phase, and 40% or more of a hard phase, average dislocation density is $5 \times 10^{13}/m^2$ or more, solid-solution C amount contained in the retained austenite phase is in mass % 0.70 to 1.00%, X-ray random intensity ratio of FCC iron in an texture of the retained austenite phase is 3.0 or less, ratio between a grain diameter relative to a rolling direction and a grain diameter relative to a sheet width direction of the retained austenite phase is 0.75 to 1.33.

22 Claims, No Drawings

(51) Int. Cl.
  B32B 15/18   (2006.01)
  C23C 2/02    (2006.01)
  C23C 2/06    (2006.01)
  C21D 9/00    (2006.01)
  C21D 9/46    (2006.01)
  B21B 3/00    (2006.01)
  B21B 1/26    (2006.01)
  B21B 1/22    (2006.01)
  C23C 30/00   (2006.01)
  C23C 2/28    (2006.01)
  C22C 18/04   (2006.01)
  C22C 38/00   (2006.01)
  C22C 38/06   (2006.01)
  C22C 38/58   (2006.01)
  C22C 38/02   (2006.01)
  C22C 38/04   (2006.01)
  C23C 2/26    (2006.01)
  C23C 2/40    (2006.01)

(52) U.S. Cl.
  CPC .. *Y10T 428/12799* (2015.01); *Y10T 428/12965* (2015.01); *Y10T 428/12972* (2015.01); *Y10T 428/2495* (2015.01); *Y10T 428/24967* (2015.01); *Y10T 428/264* (2015.01); *Y10T 428/265* (2015.01)

(56) References Cited

U.S. PATENT DOCUMENTS 6,537,394 B1   3/2003   Osawa et al.

2008/0175743 A1*   7/2008   Futatsuka et al. ............. 420/120
2008/0251168 A1    10/2008  Han
2010/0132849 A1*   6/2010   Takagi et al. ................. 148/533
2012/0118439 A1    5/2012   Ono et al.

FOREIGN PATENT DOCUMENTS

| JP | 2001-247946 A | 9/2001 |
| JP | 2002-533567 A | 10/2002 |
| JP | 2003-49242 A  | 2/2003 |
| JP | 2003-277884 A | 10/2003 |
| JP | 2004-263270 A | 9/2004 |
| JP | 2005-23348 A  | 1/2005 |
| JP | 2008-144233 A | 6/2008 |
| JP | 2010-202949 A | 9/2010 |
| JP | 2010-209433 A | 9/2010 |
| JP | 2011-26699 A  | 2/2011 |
| TW | 521095 B      | 2/2003 |

OTHER PUBLICATIONS

International Search Report, issued in PCT/JP2012/075218, dated Jan. 8, 2013.
Written Search Report, issued in PCT/JP2012/075218, dated Jan. 8, 2013.
Taiwanese Office Action dated Jul. 10, 2014, issued in corresponding Taiwanese Patent Application No. 101136120.
Korean Office Action dated Aug. 7, 2015, issued in corresponding Korean Patent Application No. 10-2014-7008175, with partial English translation.

* cited by examiner

HIGH-STRENGTH HOT-DIP GALVANIZED STEEL SHEET, HIGH-STRENGTH ALLOYED HOT-DIP GALVANIZED STEEL SHEET EXCELLENT IN BAKE HARDENABILITY, AND MANUFACTURING METHOD THEREOF

TECHNICAL FIELD

The present invention relates to a high-strength hot-dip galvanized steel sheet, a high-strength alloyed hot-dip galvanized steel sheet excellent in bake hardenability, and a manufacturing method thereof.

BACKGROUND ART

In recent years, requirement for high-strengthening of a steel sheet used for a vehicle and so on becomes high, and a high-strength steel sheet whose tensile maximum stress is 900 MPa or more comes to be used. On the other hand, it is required to show excellent forming workability at a forming work time such as presswork. However, improvement in the strength easy to incur deterioration in the forming workability, and it is difficult to satisfy both requirements.

Accordingly, in recent years, a steel sheet using bake hardenability (BH-ability) by a coating/baking process (bake hardening process) after the forming work has been developed so that workability such as ductility and hole expandability and high-strengthening are both enabled.

Here, the bake hardening is a phenomenon in which C (solid-solution C) and N (solid-solution N) remaining in a steel sheet in a solid-solution state diffuse to dislocations during a baking process (normally heated up to approximately 170° C., then kept for several dozen minutes) after coating, the dislocations are fixed, and thereby, a yield strength increases. The increased amount of the yield strength is a coated bake hardening amount (BH amount), and the BH amount is generally known to increase by increasing a solid-solution C amount or a solid-solution N amount.

In Patent Literature 1, a cold-rolled steel sheet is disclosed in which a hard structure made up of bainite and martensite is a main structure thereof, and a high bake hardening amount is secured by limiting a fraction of ferrite into 5% or less.

Besides, in Patent Literature 2, a high-strength cold-rolled steel sheet is disclosed in which bainite is a main structure thereof, a hardness ratio between bainite and ferrite is made small, and dispersion of hardness in each structure is made small to thereby improve the bake hardenability, the ductility, and the hole expandability.

Besides, in Patent Literature 3, a method is disclosed in which a steel sheet is made to be one containing tempered martensite and/or tempered bainite obtained by performing annealing for a hot-rolled steel sheet without performing cold-rolling, or performing the annealing for two times after the cold-rolling to thereby improve the workability and the bake hardenability.

Besides, in each of Patent Literatures 4, 5 and 6, an art improving the bake hardenability adding a lot of N is disclosed

CITATION LIST

Patent Literature

Patent Literature 1: Japanese Laid-open Patent Publication No. 2008-144233
Patent Literature 2: Japanese Laid-open Patent Publication No. 2004-263270
Patent Literature 3: Japanese Laid-open Patent Publication No. 2003-277884
Patent Literature 4: Japanese Laid-open Patent Publication No. 2005-023348
Patent Literature 5: Japanese Laid-open Patent Publication No. 2003-049242
Patent Literature 6: Japanese Laid-open Patent Publication No. 2001-247946

SUMMARY OF INVENTION

Technical Problem

However, in Patent Literatures 1 and 2, it is mentioned about the bake hardening amount, but anisotropy of the bake hardenability is not mentioned, and it is extremely unstable whether or not it is possible to stably secure a desired bake hardening amount.

Besides, in the method of Patent Literature 3, the cold-rolling is not performed, and therefore, there is a problem in which sheet thickness accuracy of the steel sheet deteriorates. Besides, even if the cold-rolling is performed, the annealing step after the cold-rolling is performed for two times, and there is a problem in which manufacturing cost increases.

Besides, in Patent Literatures 4, 5 and 6, it is necessary to add a lot of N to secure the bake hardening amount, and there is a possibility in which weldability is deteriorated.

The present invention is made in consideration of the circumstances as stated above, and an object thereof is to provide a high-strength hot-dip galvanized steel sheet, a high-strength alloyed hot-dip galvanized steel sheet securing high-strength of tensile maximum strength of 900 MPa or more, excellent ductility, and excellent in bake hardenability, and a manufacturing method thereof.

Solution to Problem

The present inventors studied hard to solve the above-stated problems. As a result, they found that it is possible to obtain a steel sheet whose bake hardening amount is large and having isotropic bake hardenability while securing high-strength of tensile maximum strength of 900 MPa or more, and excellent ductility by increasing an average dislocation density in the steel sheet, weakening anisotropy of a texture of austenite, and enabling anisotropic structure.

Summary of the present invention with the aim of solving the above-stated problems is as follows.

[1] A high-strength hot-dip galvanized steel sheet excellent in bake hardenability, includes a base steel sheet containing, in mass %, C: 0.075 to 0.400%, Si: 0.01 to 2.00%, Mn: 0.80 to 3.50%, P: 0.0001 to 0.100%, S: 0.0001 to 0.0100%, Al: 0.001 to 2.00%, N: 0.0001 to 0.0100%, O: 0.0001 to 0.0100% each, with the balance made up of Fe and inevitable impurities, wherein a structure of the base steel sheet contains, in volume fraction, 3% or more or a retained austenite phase, 50% or less of a ferrite phase, and 40% or more of a hard phase, at a range from ⅛ thickness centered around a ¼ sheet thickness from a surface to ⅜ thickness centered around the ¼ sheet thickness from the surface at the base steel sheet, an average dislocation density is $5\times10^{13}/m^2$ or more, a solid-solution C amount contained in the retained austenite phase is in mass %, 0.70 to 1.00%, an X-ray random intensity ratio of FCC iron in an texture of the retained austenite phase is 3.0 or less, a ratio between a grain diameter relative to a rolling direction and a grain diameter relative to a sheet width direction of the retained austenite phase is 0.75 to 1.33, further, a hot-dip galvanized layer is formed at the surface of the base steel sheet and the sheet thickness becomes 0.6 to 5.0 mm.

[2] The high-strength hot-dip galvanized steel sheet according to [1], wherein the hard phase is made up of a bainitic ferrite phase and/or a bainite phase, a tempered martensite phase, and a fresh martensite phase.

[3] The high-strength hot-dip galvanized steel sheet excellent in the bake hardenability according to [1], where oxides are finely dispersed, and a decarburized layer whose thickness is 0.01 μm to 10.0 μm is formed at a surface layer portion of the base steel sheet, and an average grain diameter of the oxides is 500 nm or less, and an average density is $1.0 \times 10^{12}$ oxides/m$^2$ or more.

[4] The high-strength hot-dip galvanized steel sheet excellent in the bake hardenability according to [1], further containing, in mass %, one kind or two kinds or more from among Ti: 0.001 to 0.150%, Nb: 0.001 to 0.100%, V: 0.001 to 0.300%.

[5] The high-strength hot-dip galvanized steel sheet excellent in the bake hardenability according to [1], further containing, in mass %, one kind of two kinds or more from among Mo: 0.01 to 2.00%, W: 0.01 to 2.00%, Cr: 0.01 to 2.00%, Ni: 0.01 to 2.00%, Cu: 0.01 to 2.00%, B: 0.0001 to 0.0100%.

[6] The high-strength hot-dip galvanized steel sheet excellent in the bake hardenability according to [1], further containing, in mass %, one kind or two kinds or more from among Ca, Ce, Mg, Zr, La, REM for 0.0001 to 0.0100% as a total.

[7] The high-strength alloyed hot-dip galvanized steel sheet excellent in bake hardenability, wherein an alloying treatment is performed for the hot-dip galvanized layer formed at a surface of the high-strength steel sheet according to [1].

[8] A manufacturing method of a high-strength hot-dip galvanized steel sheet excellent in bake hardenability, including: a hot-rolling step of heating a slab having a chemical component containing, in mass %, C: 0.075 to 0.400%, Si: 0.01 to 2.00%, Mn: 0.80 to 3.50%, P: 0.000 to 0.100%, S: 0.0001 to 0.0100%, Al: 0.001 to 2.00%, N: 0.0001 to 0.0100%, O: 0.0001 to 0.0100 % each, with the balance made up of Fe and inevitable impurities to 1180° C. or more, starting a hot-rolling performing by plural passes, performed the hot-rolling in which a relationship among a temperature "T" of a hot-rolled steel sheet within a range from 1050° C. to a rolling completion temperature, a sheet thickness "h", and an elapsed time "t" between each pass satisfy the following expression (1), and completing the rolling at a temperature range of 880° C. or more; a first cooling step of starting cooling after an elapsed time after the hot-rolling completion to the cooling start is set to be 1.0 second or more, and stopping the cooling at 450° C. or more; a cold-rolling step of setting an elapsed time after the first cooling until 400° C. to be 1.0 hour or more, and thereafter, a cold-rolling is performed while setting a total reduction ratio to be 30 to 75%, a continuous annealing step of annealing at a maximum heating temperature of (Ac$_3$ −50)° C. or more; and a plating step of forming a hot-dip galvanized layer at a surface of the steel sheet by immersing the steel sheet into galvanizing batch after the continuous annealing step.

[Numerical Expression 1]

$$0.10 \leq \left\{ \sum_{i=1}^{N} (5.20 \times 10^{-6} \cdot T_i^3 - 1.06 \times 10^{-2} \cdot T_i^2 + 1.68 \times 10 \cdot T_i - 5.67 \times 10^3)^2 \cdot \left(\frac{h_{i-1}}{h_i}\right)^2 \cdot \exp\left(-\frac{2.20 \times 10^4}{T_i}\right) \cdot t_i \right\}^{0.5} \leq 1.00 \quad (1)$$

Here, in the expression (1), "N" represents a total number of passes from the hot-rolling start to completion, "i" represents an order of passes, "$T_i$" represents a rolling temperature (° C.) at the i-th pass, "$h_i$" represents a sheet thickness (mm) after the processing of the i-th pass, "$t_i$" represents an elapsed time from the i-th pass to the next pass. Note that when i=1, $h_0$=a slab thickness. Besides, an elapsed time from a final pass to the next pass is an elapsed time from the final pass to the cooling start time after the hot-rolling completion.

[9] The manufacturing method of the high-strength hot-dip galvanized steel sheet excellent in the bake hardenability according to [8], wherein in the plating step, oxides are generated at a surface layer portion of the steel sheet at a preheating zone where an air ratio being a ratio between a volume of air contained in mixed gas in a unit volume in the mixed gas of air and fuel gas used for heating and a volume of air theoretically required to enable complete combustion of the fuel gas contained in the mixed gas in a unit volume is set at 0.7 to 1.2, subsequently the oxides are reduced at a reduction zone where a partial pressure ratio (P(H$_2$O)/P(H$_2$)) between H$_2$O and H$_2$ is set to be 0.0001 to 2.0, and thereafter, the steel sheet is immersed into the galvanizing bath under a condition in which a plating bath temperature is 450 to 470° C., a steel sheet temperature at the time entering into the plating bath is 430 to 490° C., an effective Al amount in the plating bath is 0.01 to 0.18 mass %, to thereby form the hot-dip galvanized layer at the surface of the steel sheet.

[10] The manufacturing method of the high-strength hot-dip galvanized steel sheet excellent in the bake hardenability according to [8], further including: a temper rolling step of performing a rolling for the steel sheet with a reduction ratio of 5.00% or less after the plating step.

[11] A manufacturing method of a high-strength alloyed hot-dip galvanized steel sheet excellent in bake hardenability, including: alloying the hot-dip galvanized layer after the high-strength hot-dip galvanized steel sheet is manufactured by the manufacturing method according to [8].

[12] The manufacturing method of the high-strength alloyed hot-dip galvanized steel sheet excellent in the bake hardenability according to [11] [10], further including: a temper rolling step of performing a rolling for the steel sheet with a reduction ratio of less than 10% after the hot-dip galvanized layer is alloyed.

Advantageous Effects of Invention

It is possible for a high-strength hot-dip galvanized steel sheet, a high-strength alloyed hot-dip galvanized steel sheet according to the present invention to adhere C to a lot of dislocation and to increase a C amount in a steel sheet because enough average dislocation density is supplied by defining a microstructure of the steel sheet into a predetermined fraction. As a result, it is possible to enlarge a bake hardening amount. Besides, it is possible to make retained austenite unstable by reducing a solid-solution C amount in the retained austenite and to easily transform the retained austenite into martensite by a forming work, and so on. As a result, it is possible to enlarge the bake hardening amount. Further, the retained austenite transforms into extremely hard martensite as stated above, and thereby, mobile dislocation is introduced at a periphery of a martensite structure, and therefore, it is possible to secure a further bake hardening amount.

Besides, it is possible to enable an isotropic retained austenite structure by reducing an X-ray random intensity ratio or FCC iron of the texture of the retained austenite. Accordingly, it is possible to make it transform into the isotropic martensite by the processing such as the subsequent forming work, and therefore, it is possible to obtain isotropic bake hardenability. Besides, a pattern of crystal grains of the retained austenite is defined, and thereby, a transformation ratio into martensite depending on a processing direction is able to be made stably constant, and the bake hardenability obtained by the martensite transformation can be made isotropic.

As stated above, it is possible for the high-strength hot-dip galvanized steel sheet and the high-strength alloyed hot-dip galvanized steel sheet according to the present invention to enough secure the bake hardening amount, and to obtain the isotropic bake hardenability. It is thereby possible to largely improve the bake hardenability in addition to the improvement in the strength and the ductility.

Besides, the steel sheet according to the present invention is able to supply the isotropic bake hardenability, and therefore, it is possible to design without limiting a usage direction of the steel sheet according to the present invention when it is applied for a member and so on.

Besides, in the manufacturing method of the high-strength hot-dip galvanized steel sheet and the high-strength alloyed hot-dip galvanized steel sheet according to the present invention, it is possible to enable the desired microstructure having sufficient dislocation density, and to suppress development of the texture of austenite to weaken the anisotropy of the austenite structure by defining conditions of the hot-rolling step and the subsequent cooling step. Accordingly, it is possible to make the martensite structure transformed by the subsequent processing isotropic and to improve the bake hardenability. Besides, in the plating step, before and after the immersion of the steel sheet into the plating bath, the steel sheet is retained at a temperature range of 300 to 470° C. for a predetermined time to accelerate the bainite transformation. It is thereby possible to control the solid-solution C amount in the retained austenite obtained at the annealing step, and to make the retained austenite unstable. As a result, the retained austenite is easy to transform into martensite the processing being a subsequent step to increase the bake hardening amount.

DESCRIPTION OF EMBODIMENTS

Hereinafter, a high-strength hot-dip galvanized steel sheet, a high-strength alloyed hot-dip galvanized steel sheet excellent in bake hardenability, and a manufacturing method thereof according to the present invention are described in detail.

<High-Strength Hot-dip Galvanized Steel Sheet>

The high-strength hot-dip galvanized steel sheet according to the present invention is characterized in that a base steel sheet contains, in mass %, C: 0.075% to 0.0400%, Si: 0.01 to 2.00%, Mn: 0.80 to 3.50%, P: 0.0001 to 0.100%, S: 0.0001 to 0.0100%, Al: 0.001 to 2.00%, N: 0.0001 to 0.0100%, O: 0.0001% to 0.0100, with the balance made up of Fe and inevitable impurities, a structure of the base steel sheet contains, in volume fraction, 3% or more of a retained austenite phase, 50% or less of a ferrite phase, and 40% or more of a hard phase, at a range from ⅛ thickness centered around a ¼ sheet thickness from a surface to ⅜ thickness centered around the ¼ sheet thickness from the surface at the base steel sheet, an average dislocation density is $5 \times 10^{13}/m^2$ or more, a solid-solution C amount contained in the retained austenite phase is in mass %, 0.70 to 1.00%, an X-ray random intensity ratio of FCC iron of a texture of the retained austenite phase is 3.0 or less, a ratio between a grain diameter relative to a rolling direction and a grain diameter relative to a sheet width direction of the retained austenite phase is 0.75 to 1.33, further, a hot-dip galvanized layer is formed at the surface of the base steel sheet and the sheet thickness becomes 0.6 to 5.0 mm.

Hereinafter, limitation reasons of a steel sheet structure and a chemical component (composition) of the present invention are described. Note that a notation of "%" represents mass % unless otherwise specified.

(Sheet Thickness)

A sheet thickness of a steel sheet to be applied is 0.6 to 5.0 mm. When it is less than 0.6 mm, it is not suitable because it is difficult to keep a shape of the steel sheet flat, and when it exceeds 5.0 mm, a predetermined microstructure cannot be obtained because it becomes difficult to uniformly cool inside the steel sheet.

(Microstructure)

The microstructure of the base steel sheet of the high-strength hot-dip galvanized steel sheet of the present invention has a predetermined chemical component, and contains, in volume fraction, 3% or more of a retained austenite phase (hereinafter, referred to as retained austenite), 50% or less of a ferrite phase (hereinafter, referred to as ferrite), and 40% or more of a hard phase, at a range from ⅛ thickness centered around a ¼ sheet thickness from a surface to ⅜ thickness centered around the ¼ sheet thickness from the surface at the steel sheet.

"Ferrite"

The ferrite is a structure whose yield stress is low and having an excellent work hardening property. Accordingly, when a ferrite fraction is excessively increased, strength before a bake hardening process increases and the yield stress after the bake hardening process decreases, and therefore, the bake hardenability largely deteriorates. Therefore, the ferrite fraction in the steel sheet is set to be 50% or less. The ferrite fraction is preferably 45% or less, and more preferably 40% or less to further increase the bake hardenability. A lower limit of the ferrite fraction is not particularly defined, and it may be "0" (zero)%. However, the ferrite fraction is preferably 5% or more, and more preferably 10% or more from a point of view of the ductility.

"Retained Austenite"

The retained austenite is a structure having an FCC (Face-Centered Cubic lattice) crystal structure, transforming into hard martensite during processing such as a forming work, and showing large work hardening. Besides, the martensite generated during the processing rapidly increases the yield stress thereof by being tempered at a low temperature in a bake hardening process, and therefore, a large bake hardening amount can be obtained by increasing the volume fraction of the retained austenite. Further, the retained austenite transforms into martensite, and thereby, a mobile dislocation is introduced at a periphery of the martensite structure, and therefore, the bake hardening amount can further be obtained. From these points of view, the volume fraction of the retained austenite is set to be 3% or more. Further, the volume fraction of the retained austenite is preferably 5% or more, and more preferably 7% or more to increase the ductility together with the bake hardening amount.

On the other hand, it is necessary to add a lot of austenite stabilizing elements such as C and Mn to obtain the retained austenite exceeding 30%, and weldability significantly deteriorates, therefore, the volume fraction of the retained austenite is set to be 30% or less. From a point of view of the weldability, the volume fraction of the retained austenite is preferably 25% or less, and more preferably 20% or less.

An amount of the austenite stabilizing element solid-solved in the retained austenite determines stability of the retained austenite, and changes a strain amount necessary for the transformation of the retained austenite into hard martensite. Accordingly, a solid-solution element amount of the retained austenite is controlled to thereby control a work hardening behavior, and it is possible to largely improve the bake hardenability, the ductility, and a tensile strength.

In the present embodiment, a solid-solution amount of C being the austenite stabilizing element is controlled so that the retained austenite is made to be unstable, and it is possible to easily transform the retained austenite into martensite with a slight strain amount.

In the present embodiment, the solid-solution carbon amount in the retained austenite is set to be 1.00% or less because sufficient bake hardenability cannot be obtained by the retained austenite which is excessively stable for processing. When the solid-solution carbon amount in the retained austenite exceeds 1.00%, the retained austenite becomes excessively stable, a martensite amount generated by the processing such as the forming work before the bake hardening process becomes small, and the sufficient bake hardenability cannot be obtained. The solid-solution carbon amount in the retained austenite is preferably 0.96% or less to efficiently transform the retained austenite into martensite. On the other hand, when the solid-solution carbon amount in the retained austenite is below 0.70%, a martensite transformation starts during a process cooling to the room temperature after an annealing step, and the fraction of the retained austenite cannot be secured, and therefore, the solid-solution carbon amount is set to be 0.70% or more. The solid-solution carbon amount is preferably 0.75% or more, and more preferably 0.80% or more to obtain a sufficient amount of retained austenite.

Here, both of the following affects on an adjustment of the solid-solution carbon, where 1] a rolling reduction and a temperature from 1050° C. to a finish rolling completion are set to be with in a range of the later-described expression (1), and 2] as it is described later, it is kept at 300 to 470° C. for 20 to 1000 seconds after the annealing. Namely, the adjustment of the solid-solution carbon cannot be substantially performed unless both 1] and 2] are satisfied.

Namely, when the later-described expression (1) is satisfied, the microstructure of a hot-rolled sheet becomes a homogeneous and fine structure, and island pearlites disperse homogeneously and finely. In this pearlite, Mn is segregated, and therefore, it is preferentially substituted into retained γ by passing through a phase transformation at the annealing step. The solid-solution carbon is efficiently concentrated according to the phase transformation at the annealing step in the homogeneous and fine austenite to be a proper solid-solution carbon amount.

On the other hand, when the expression (1) is below a specified range, recrystallization does not proceed, and therefore, coarse pearlite extending in a rolling direction is generated. The retained austenite generated by passing through the annealing step becomes extended coarse austenite. Accordingly, the concentration of carbon resulting from the phase transformation is difficult to proceed, and the solid-solution carbon does not become a proper range. Besides, a shape of the retained austenite becomes a problem.

Besides, when the later-described expression (1) is over the specified range, the recrystallization excessively proceeds, and massive and coarse pearlite is generated. The retained austenite generated by passing through the annealing step becomes massive and coarse austenite. Accordingly, the concentration of carbon resulting from the phase transformation is difficult to proceed, and the solid-solution carbon does not become the proper range. Besides, the shape of retained austenite becomes the problem.

Note that the solid-solution C amount (Cγ) in the retained austenite is able to be found by performing an X-ray diffraction test under the same condition as a measurement of an area fraction of the retained austenite, finding a lattice constant "a" of the retained austenite, and using the following expression (2). Note that the expression (2) is disclosed in a document "Scripta Metallurgica et Materialia, vol.24.1990. p509-514".

[Numerical Expression 2]

$$C_y = \frac{(a - 0.3556)}{0.00095} \times \frac{12.01}{55.84} \qquad (2)$$

Besides, the transformation from the retained austenite into martensite according to the processing is affected by a crystal orientation of the retained austenite. Accordingly, when the crystal orientation of the retained austenite strongly deflects, a transformation ratio into martensite relative to a degree of processing changes depending on a processing direction, and the bake hardening amount changes. Accordingly, to obtain the isotropic bake hardening amount, it is necessary to make the crystal orientation of the retained austenite random so that the transformation ratio into martensite relative to the degree of processing is constant even if the processing is performed in any direction.

As for the deflection of the crystal orientation of retained austenite, it is possible to evaluate a degree thereof by measuring a texture of the FCC crystal of iron by the X-ray diffraction method. Specifically, an X-ray random intensity ratio of the FCC iron may be found from a crystal orientation distribution function (called as an Orientation Distribution Function, ODF) representing a three-dimensional texture calculated based on plural pole figures from among {200}, {311}, {220} pole figures measured by the X-ray diffraction.

In the present embodiment, it is necessary to set the X-ray random intensity ratio of the FCC iron of the texture of the retained austenite at 3.0 or less to sufficiently reduce anisotropy of the bake hardenability, and to obtain the isotropic bake hardening amount. The lower the random intensity ratio is, the more if is preferable to reduce the anisotropy, and it is preferably 2.5 or less, and more preferably 2.0 or less. A lower limit of the random intensity ratio is not particularly limited, but it is industrially extremely difficult to set it at less than 1.2, and therefore it is preferably 1.2 or more.

Note that the X-ray random intensity ratio is a numerical value in which the X-ray intensities of each of a standard sample which does not have an integration in a specific orientation and sample material are measured under the same condition by the X-ray diffraction method and so on, and the obtained X-ray intensity of the sample material is divided by the X-ray intensity of the standard sample.

Manufacturing of samples for the X-ray diffraction may be performed as stated below.

At first, a steel sheet is polished to a predetermined position in a sheet thickness direction by mechanical polishing, chemical polishing, and so on, strain is removed by electrolytic polishing and chemical polishing according to need, and at the same time, it is adjusted so that a ¼ sheet thickness portion becomes a measuring surface. Note that it is difficult to precisely set the measuring surface at the ¼ sheet thickness portion, and therefore, the sample may be manufactured such that a surface within a range of 3% relative to the sheet thickness around a target position becomes the measuring surface. Besides, when the measurement by the X-ray diffraction is difficult, statistically enough number of measurements may be performed by an EBSD method.

Further, when crystal grains of the retained austenite extend in a specific direction at a surface in parallel to the sheet surface, the transformation ratio into martensite changes depending on a processing direction, and therefore, the anisotropy in the bake hardening amount is generated. Namely, a pattern of the crystal grains of the retained austenite is defined, and thereby, it is possible to weaken the anisotropy in the bake hardening amount.

In the present embodiment, when an average grain diameter of the crystal grain of the retained austenite relative to a rolling direction is set as d(RD), and an average grain diameter relative to a sheet width direction is set as d(TD), a parameter "d(RD)/d(TD)" made up of the both is limited to be a range of 0.75 or more and 1.33 or less. The "d(RD)/d(TD)" is preferably 0.80 or more and 1.25 or less, and more preferably 0.85 or more and 1.18 or less to further reduce the anisotropy of the bake hardening amount.

Note that the crystal grain of the retained austenite is evaluated by finishing a surface in parallel to the sheet surface at the ¼ thickness into a mirror surface, using an FE-SEM (Field Emission Scanning Electron Microscopy), and performing a high-resolution crystal orientation analyses by the EBSD (Electron Bach-Scattering Diffraction) method. A measurement step is set as 0.1 μm, and a region in which points representing a diffraction pattern of the FCC iron aggregate 10 points or more, and crystal misorientation with each other is less than 10° is set to be the crystal grain or the retained austenite. In this case, the crystal misorientation with a second proximity measurement point is found at each measurement point, a point whose crystal misorientation is 10.0° or more which is determined to belong to a different crystal grain is ignored, and an average value of the crystal misorientations with a second proximity measurement point group whose crystal misorientation is 10.0° or less which are determined to be within the same crystal grain is found. As for the grain diameter, the grain diameters in the rolling direction and in the sheet width direction are each measured in 30 pieces to 300 pieces of retained austenite crystal grains selected at random.

"Hard Phase"

In the present embodiment, the hard phase is contained for 40% or more in addition to the ferrite and the retained austenite. Note that as the hard phase, it is desired that a bainitic ferrite phase, and/or a bainite phase, a tempered martensite phase, and a fresh martensite phase are contained in complex. This hard phase is a generic of a transformation product which is harder than the ferrite phase.

"Bainitic Ferrite and/or Bainite"

The Bainitic ferrite and/or bainite is a structure necessary for efficiently obtaining the retained austenite, and it is preferably contained in the steel sheet structure for 10 to 80% in volume fraction. Besides, the bainitic ferrite and/or the bainite is a microstructure having an intermediate intensity between soft ferrite and hard martensite, the tempered martensite and the retained austenite, and it is preferably contained for 15% or more, more preferably contained for 20% or more from a point of view of stretch flangeability. On the other hand, when the volume fraction of the bainitic ferrite and/or the bainite exceeds 80%, it is not preferable because there is a worry that the yield stress excessively increases and the ductility deteriorates. From a point of view of the ductility, the volume Fraction of the bainitic ferrite and/or the bainite is preferably 70% or less, and more preferably 60% or less.

"Tempered Martensite"

The tempered martensite is a structure largely improving a tensile strength, and it may be contained in the steel sheet structure for 50% or less in volume fraction. From a point of view of the tensile strength, the volume fraction of the tempered martensite is preferably 10% or more. On the other hand, when the volume fraction of the tempered martensite contained in the steel sheet structure exceeds 50%, it is not preferable because the yield stress excessively increases and there is a worry that the bake hardenability deteriorates.

"Fresh Martensite"

The fresh martensite largely improves the tensile strength, but on the other hand, it becomes a starting point of crack to deteriorate the stretch flangebility, and therefore, it is preferably contained in the steel sheet structure for 25% or less in volume fraction. The volume fraction of the fresh martensite is preferably 20% or less, more preferably 15% or less to increase the stretch flangeability.

"Other Microstructures"

Structures other than the above such as pearlite and/or coarse cementite may be contained in the microstructure of the steel sheet of the present invention. However, when an amount of the pearlite and/or the coarse cementite becomes large in the steel sheet structure of the high-strength steel sheet, the ductility deteriorates. Therefore, the volume fraction of the pearlite and/or the coarse cementite contained in the steel sheet structure is preferably 10% or less as a total, and more preferably 5% or less.

Note that the volume fraction of each structure contained in that steel sheet structure as described above can be measured by, for example, the method as illustrated below.

The volume fractions of the ferrite, the retained austenite, the bainitic ferrite, the bainite, the tempered martensite and the fresh martensite contained in the steel sheet structure of the steel sheet of the present invention are obtained by taking a sample of a cross section in parallel to the rolling direction of the steel sheet and in perpendicular to the sheet surface as an observation surface, polishing the observation surface, performing nital etching, and observing a range from ⅛ thickness centered around a ¼ sheet thickness from a surface to ⅜ thickness centered around the ¼ sheet thickness from the surface with the field emission scanning electron microscope (FE-SEM) to measure an area fraction.

(Average Dislocation Density)

The average dislocation density (before shipment) at the range of ⅛ thickness around the ¼ sheet thickness from the surface to ⅜ thickness around the ¼ sheet thickness from the surface of the base steel sheet according to the present embodiment is set to be $1.0 \times 10^{13}/m^2$ or more.

Hereinafter, definition reasons of the average dislocation density are described.

It is very effective to add a lot of solid-solution carbon to increase the bake hardenability. However, a carbon amount solid-solves in a BCC crystal of iron is very small, and therefore, it is effective that the average dislocation density in the steel sheet is increased by lowering the transformation temperature as much as possible so that carbon adheres to a lot of dislocations to increase the solid-solution carbon amount. From this point of view, the average dislocation density in the steel sheet is set to be $1.0 \times 10^{13}/m^2$ or more. The larger the dislocation density is, the easier the solid-solution carbon is obtained, and therefore, the average dislocation density is preferably $3.0 \times 10^{13}/m^2$ or more, and nacre preferably $5.0 \times 10^{13}/m^2$ or more. An upper limit of the dislocation density is not particularly provided, but it is preferably $1.0 \times 10^{17}/m^2$ or less, and more preferably $3.0 \times 10^{16}/m^2$ or less because the ductility drastically deteriorates when the dislocation density exceeds $1.0 \times 10^{17}/m^2$.

The dislocation density is able to be found by the X-ray diffraction method and a transmission electron microscope (TEM) observation. The TEM is able to observe a minute region, and therefore, it is possible to measure each of the dislocation densities of the ferrite and the hard structure in case of a multi-phase structure steel sheet. Note that in the TEM observation, it is necessary to process the steel sheet into a thin sheet state, or thin acicular at a sample manufacturing stage, and therefore, it is difficult to create the sample, and there is a case when the dislocation density is lowered because the dislocation reaches a sample surface to disappear by a slight motion because the sample is small, and therefore, enough attention is required to manufacture the sample. Besides, a measurable visual field is limited in the TEM observation. On the other hand, in the X-ray diffraction method, it is possible to relatively easily measure the average dislocation density at a wide region. Accordingly, the method measuring the dislocation density by using the X-ray diffraction method is used in the present invention.

Note that the dislocation density is obtained by controlling the fraction of the microstructure into a predetermined range, and performing an appropriate temper rolling. It is because the dislocation densities accumulated inside are different depending on kinds of the microstructures.

(Decarburized Layer)

Besides, in the high-strength hot-dip galvanized steel sheet of the present embodiment, the bake hardenability is improved by masking a surface layer portion into a decarburized layer having a small amount of hard structure to disperse fine oxides to thereby increase adhesiveness of a plating layer, increase a yield stress of a base iron surface layer, and prevent to easily yield after the bake hardening process. Note that the hard structure described here is one made up of the above-stated hard layer and the retained austenite.

In the present embodiment, a thickness of the decarburized layer formed at the surface layer portion of the base steel sheet is set to be within a range of 0.01 μm to 10.0 μm, an average grain diameter of the oxides finely dispersed in the decarburized layer is 500 nm or less, and an average density of the oxides in the decarburized layer is within a range of $1.0 \times 10^{12}$ oxides/m$^2$ or more.

Hereinafter, limitation reasons of the above are described.

The decarburized layer having an appropriate thickness is formed at the surface layer portion of the base steel sheet, and thereby, it is possible to secure the tensile strength and to increase the adhesiveness between the base steel sheet and the plating layer. When the thickness of the decarburized layer is less than 0.01 μm, the adhesiveness with the plating layer cannot be sufficiently obtained, and therefore, the thickness of the decarburized layer is set to be 0.01 μm or more. the thickness of the decarburized layer is preferably 0.08 μm or more, and more preferably 0.15 μm or more to further improve the adhesiveness with the plating layer. On the other hand, an excessively thick decarburized layer lowers the tensile strength and fatigue strength of the steel sheet. From this point of view, the thickness of the decarburized layer is set to be 10.0 μm or less. From a point of view of the fatigue strength, the thickness of the decarburized layer is preferably 9.0 μm or less, and more preferably 8.0 μm or less.

Note that, the decarburized layer is a region which continues from an uppermost surface of the base iron, and region whose fraction of the hard structure is half or less of the fraction of the hard structure at ¼ thickness of the base steel sheet in the region.

The thicknesswise cross section in parallel to the rolling direction is finished into the mirror surface, it is observed by using the FE-SEM, the decarburized layer thicknesses at three points or more are measured in one steel sheet, and the average value thereof is regarded as the thickness of the decarburized layer.

A strength of the decarburized layer formed at the surface layer portion of the base steel sheet is low, and the crack starting from the decarburized layer is difficult to occur, but there is a large strength difference between an inside of the steel sheet and the decarburized layer, and therefore, an interface between the base iron and the decarburized layer is able to function as a starting point of a new crack. To prevent the crack, it is effective to disperse the oxides into an inside of the crystal grain and/or a crystal grain boundary in the decarburized layer, the strength of the decarburized layer is increased to make the strength difference with the inside of the steel sheet small. The density of the oxides is set to be $1.0 \times 10^{12}$ oxides /m$^2$ or more to obtain enough strength. The density of the oxides is preferably $3.0 \times 10^{12}$ oxides/m$^2$ or more, and more preferably $5.0 \times 10^{12}$ oxides/m$^2$ or more to further improve low temperature toughness. On the other hand, when the density of the oxides exceeds $1.0 \times 10^{16}$ oxides/m$^2$, a distance between the oxides becomes excessively near, the surface layer portion cracks by slight processing to damage the plating layer formed thereon, and therefore, it is set to be $1.0 \times 10^{16}$ oxides/m$^2$ or less. The density of the oxides is preferably $5.0 \times 10^{15}$ oxides/m$^2$ or less, and more preferably $1.0 \times 10^{15}$ oxides/m$^2$ or less for the steel sheet surface layer to have enough formability.

Note that the oxide described here means the oxide mainly containing Si and/or Mn.

Besides, when a size of the oxide dispersing in the decarburized layer is large, the oxide in itself functions as the starting point of crack, and therefore, a crack resistance property such as the ductility deteriorates. Accordingly, the average grain diameter of the oxide is set to be 500 nm or less. The average grain diameter of the oxides is preferably 300 nm or less, and more preferably 100 nm or less to further improve the crack resistance property such as the ductility. A lower limit of the average grain diameter of the oxide is not particularly provided, but it is necessary to strictly control a process atmosphere and a temperature to make it less than 30 nm, and it is practically difficult. Therefore, it is preferably 30 nm or more.

As for the oxide in the decarburized layer, the thicknesswise cross section in parallel to the rolling direction is finished into the mirror surface, and observed, by using the FE-SEM. The oxide density is found by counting the number of oxides by observing the decarburized layer for an extent of 7 μm$^2$, or by using an observation area required to count up to 1000 pieces of oxides. Besides, the average grain diameter of the oxide is an average of circle-equivalent grain diameters of 100 pieces to 1000 pieces selected at random.

<High-Strength Alloyed Hot-Dip Galvanized Steel Sheet>

Note that a hot-dip galvanized layer formed at the surface of the high-strength hot-dip galvanized steel sheet according to the present embodiment may be performed an alloying treatment to be a high-strength alloyed hot-dip galvanized steel sheet. The high-strength alloyed hot-dip galvanized steel sheet thereby obtained is able to show the effects similar to the above-stated high-strength hot-dip galvanized steel sheet.

Besides, in the high-strength steel sheet of the present invention, a coating film made up of a phosphorus oxide and/or a composite oxide containing phosphorus may be formed at a surface of the hot-dip galvanized layer or an alloyed hot-dip galvanized layer. It can be made function as a lubricant when the steel sheet is processed, and it is possible to protect galvanization formed at the steel sheet surface.

Next, the chemical component (composition) of The high-strength hot-dip galvanized steel sheet and the high-strength alloyed hot-dip galvanized steel sheet of the present invention is described. Note that a sign [%] in the following description represents [mass %].

"C: 0.075 to 0.400%"

C is contained to increase the strength and the Bake hardenability of the high-strength steel sheet. However, when a content of C exceeds 0.400%, the weldability becomes insufficient. From a point of view of the weldability, the content of C is preferably 0.300% or less, and more preferably 0.250% or less. On the other hand, when the content of C is less than 0.075%, the strength is lowered, and it becomes difficult to secure the tensile maximum strength of 900 MPa or more. The content of C is preferably 0.085% or more, and more preferably 0.100% or more to further increase the strength and the bake hardenability.

"Si: 0.01 to 2.00%"

Si is an element necessary for increasing the strength and formability by suppressing generation of iron-based carbide, and obtaining a predetermined amount of retained austenite in the annealing step. However, when a content of Si exceeds 2.00%, there is a case when the steel sheet is embrittled, and the cold-rolling becomes difficult to perform. Accordingly, from a point of view of the cold-rolling, the content of Si is preferably 1.80% or less, and more preferably 1.50% or less. On the other hand, when the content of Si is less than 0.01%, a lot of iron-based carbides are generated in the annealing step, the sufficient amount of retained austenites cannot be obtained, further a lot of coarse iron-based carbides are generated during the alloying treatment of the plating layer, and there is a possibility in which the strength and the formability deteriorate. Accordingly, the content of Si is preferably 0.20% or more, and more preferably 0.50% or more.

"Mn: 0.80 to 3.50%"

Mn is added to the steel sheet of the present invention to increase the strength of the steel sheet. However, when a content of Mn exceeds 3.50%, a coarse Mn concentrated portion is generated at a sheet thickness center portion of the steel sheet, the embrittlement is easy to occur, and a trouble such that a casted slab cracks is easy to occur. Besides, when the content of Mn exceeds 3.50%, the weldability also deteriorates. Accordingly, the content of Mn is necessary to be set at 3.50% or less. From a point of view of the weldability, the content of Mn is preferably 3.00% or less, and more preferably 2.70% or less. On the other hand, when the content of Mn is less than 0.80%, a lot of soft structures are formed during cooling after the annealing, and it becomes difficult to secure the tensile maximum strength of 900 MPa or more. Therefore, it is necessary to set the content of Mn at 0.80% or more. The content of Mn is preferably 1.00% or more, and more preferably 1.30% or more to further increase the strength.

"P: 0.0001 to 0.100%"

P tends to segregate to the sheet thickness center portion of the steel sheet, and embrittles a weld zone. When a content of P exceeds 0.100%, the weld zone is drastically embrittled, and therefore, the content of P is limited to be 0.100% or less. From a point of view of the embrittlement, the content of P is preferably 0.030% or less. Note that the effect of the present invention is shown without particularly limiting a lower limit of the content of P, but manufacturing cost drastically increases if the content of P is set to be less than 0.0001%, and therefore, 0.0001% is set to be the lower limit value. Besides, it is preferably 0.0010% or more.

"S: 0.0001 to 0.0100%"

S adversely affects on the weldability and manufacturability at the casting time and the hot-rolling time. An upper limit value of a content of S is therefore set to be 0.0100% or less. Besides, S bonds to Mn to form coarse MnS and lowers the ductility and the stretch flangeability, and therefore, it is preferably 0.0050% or less, and more preferably 0.0025% or less. The effect of the present invention is shown without particularly limiting a lower limit of the content of S, but manufacturing cost drastically increases if the content of S is set to be less than 0.0001%, and therefore, 0.0001% is set to be the lower limit value. Note that it is preferably 0.0005% or more, and more preferably 0.0010% or more.

"Al: 0.001% to 2.00%"

Al is an element suppressing the generation of The iron-based carbide to make it easy to obtain the Retained austenite, and increasing the strength and the formability. However, when a content of Al exceeds 2.00%, the weldability deteriorates, and therefore, an upper limit of the content of Al is set to be 2.00%. From this point of view, the content of Al is preferably 1.50% or less, and more preferably 1.20% or less. On the other hand, the effect of the present invention is shown without particularly limiting a lower limit of the content of Al, but Al is the inevitable impurity minutely existing in a raw material, and manufacturing cost drastically increases if the content of Al is set to be less than 0.001%, and therefore, the lower limit is set to be 0.001% or more. Besides, Al is an effective element also as a deoxidizer, but the Al amount is preferably 0.010% or more to obtain the effect of deoxidation more sufficiently.

"N: 0.0001 to 0.0100%"

N forms a coarse nitride, and deteriorates the ductility and the stretch flangeability, and therefore, an addition amount thereof is necessary to be suppressed. When a content of N exceeds 0.0100%, the tendency becomes obvious, and therefore, an upper limit of the N content is set to be 0.0100%. From points of view of the ductility and the stretch flangeability, the upper limit of the N content is preferably 0.0070%, and more preferably 0.0050%. Besides, N accounts for blowhole occurrence at the Welding time, and therefore, the smaller the content is, the better. The effect of the present invention is shown without particularly limiting a lower limit of the content of N, but manufacturing cost drastically increases if the content of N is set to be less than 0.0001%, and therefore, the lower limit is set to be 0.000 1% or more. Besides, it is preferably 0.0005% or more, and more preferably 0.0010% or more.

"O: 0.0001 to 0.0100%"

O forms an oxide, and deteriorates the ductility and the stretch flangeability, and therefore, an addition amount thereof is necessary to be suppressed. When a content of O exceeds 0.0100%, the deterioration of the stretch flangeability becomes obvious, and therefore, an upper limit of the O content is set to be 0.0100% or less. Further, the content of O is preferably 0.0070% or less, and more preferably 0.0050% or less. The effect of the present invention is shown without particularly limiting a lower limit of the content of O, but manufacturing cost drastically increases if the content of O is set to be less than 0.0001%, and therefore, the lower limit is set to be 0.0001%. Further, the lower limit of the content of O is preferably 0.0003%, and more preferably 0.0005%.

Besides, it is preferable to add one kind or two kinds or more from among Ti: 0.001 to 0.150%, Nb: 0.001 to 0.100%, V: 0.001 to 0.300% in addition to the above-described elements to the base steel sheet of the present invention.

"Ti: 0.001 to 0.150%"

Ti is an element contributing to the strength increase of the steel sheet by precipitate strengthening, fine grain strengthening by a growth suppression of ferrite crystal grains, and dislocation strengthening through suppression of recrystallization. However, when a content of Ti exceeds 0.150%, a precipitation amount of carbonitrides increases, and the formability deteriorates, and therefore, the content of Ti is preferably 0.150% or less. The effect of the present invention is shown without particularly limiting a lower limit of the content of Ti, but the content of Ti is preferably 0.001% or more to fully obtain the strength increasing effect by the addition of Ti.

"Nb: 0.001 to 0.100%"

Nb is an element contributing to the strength increase of the steel sheet by the precipitate strengthening, the fine grain strengthening by the growth suppression of the ferrite crystal grains, and the dislocation strengthening through suppression of the recrystallization. however, when a content of Nb exceeds 0.150%, a precipitation amount of carbonitrides increases, and the formability deteriorates, and therefore, the content of Nb is preferably 0.150% or less. The effect of the present invention is shown without particularly limiting a lower limit of the content of Nb, but the content of Nb is preferably 0.001% or more to sufficiently obtain the strength increasing effect by the addition of Nb.

"V: 0.001 to 0.300%"

V is an element contributing to the strength increase of the steel sheet by the precipitate strengthening, the fine grain strengthening by the growth suppression of the ferrite crystal grains, and the dislocation strengthening through suppression of the recrystallization. However, when a content of V exceeds 0.300%, a precipitation amount of carbonitrides increases, and the formability deteriorates, and therefore, the content of V is preferably 0.300% or less. The effect of the present invention is shown without particularly limiting a lower limit of the content of V, but the content of V is preferably 0.001% or more to sufficiently obtain the strength increasing effect by the addition of V.

Further, it is preferable to add one kind or two kinds or more from among Mo: 0.01 to 2.00%, W: 0.01 to 2.00%, Cr: 0.01 to 2.00 %, Ni: 0.01 to 2.00%, Cu: 0.01 to 2.00%, B: 0.0001 to 0.0100% an addition to the above-described elements to the base steel sheet of the present invention.

"Mo: 0.01 to 2.00%"

Mo is an effective element suppressing a phase transformation at high temperature, and high-strengthening. Mo may be added instead of a part of C and/or Mn. When a content of Mo exceeds 2.00%, workability in hot working is damaged and productivity is lowered, and therefore, the content of Mo is preferably 2.00% or less. The effect of the present invention is shown without particularly limiting a lower limit of the content of Mo, but the content of Mo is preferably 0.01% or more to sufficiently obtain the high-strengthening by the addition of Mo.

"W: 0.01 to 2.00%"

W is an effective element suppressing the phase transformation at high temperature, and high-strengthening. W may be added instead of a part of C and/or Mn. When a content of W exceeds 2.00%, the workability at hot working is damaged and productivity is lowered, and therefore, the content of W is preferably 2.00% or less. The effect of the present invention is shown without particularly limiting a lower limit of the content of W, but the content of W is preferably 0.01% or more to sufficiently obtain the high-strengthening by the addition of W.

"Cr: 0.01 to 2.00%"

Cr is an effective element suppressing the phase transformation at high temperature, and high-strengthening. Cr may be added instead of a part of C and/or Mn. When a content or Cr exceeds 2.00%, the workability at hot working is damaged and the productivity is lowered, and therefore, the content of Cr is preferably 2.00% or less. The effect of the present invention is shown without particularly limiting a lower limit of the content of Cr, but the content of Cr is preferably 0.01% or more to enough obtain the high-strengthening by the addition of Cr.

"Ni: 0.01 to 2.00%"

Ni is an effective element suppressing the phase transformation at high temperature, and high-strengthening. Ni may be added instead of a part of C and/ or Mn. When a content of Ni exceeds 2.00%, the weldability is damaged, and therefore, the content of Ni is preferably 2.00% or less. The effect of the present invention is shown without particularly limiting a lower limit of the content of Ni, but the content of Ni is preferably 0.01% or more to sufficiently obtain the high-strengthening by the addition of Ni.

"Cu: 0.01 to 2.00%"

Cu is an element increasing the strength by existing in the steel as fine particles, and it can be added instead of a part of C and/or Mn. When a content of Cu exceeds 2.00%, the weldability is damaged, and therefore, the content of Cu is preferably 2.00% or less. The effect of the present invention is shown without particularly limiting a lower limit of the content of Cu, but the content of Cu is preferably 0.01% or more to sufficiently obtain the high-strengthening by the addition of Cu.

"B: 0.0001 to 0.0100%"

B is an effective element suppressing the phase transformation at high temperature, and the high-strengthening, and it may be added instead of a part of C and/or Mn. When a content of B exceeds 0.0100%, the workability at hot working is damaged and the productivity is lowered, and therefore, the content of B is preferably 0.0100% or less. The effect of the present invention is shown without particularly limiting a lower limit of the content of B, but the content of B as preferably 0.0001% or more to sufficiently obtain the high-strengthening by the addition of B.

Further, it is preferable to add one kind or two kinds or more from among Ca, Ce, Mg, Zr, La, REM to the base steel sheet of the present invention for 0.0001 to 0.0100% as a total in addition to the above-stated elements.

"One kind or Two kinds or more from among Ca, Ce, Mg, Zr, La, REM for 0.0001 to 0.0100% as Total"

Ca, Ce, Mg, Zr, La, REM are elements effective for improvement of the formability, and one kind or two kinds or more can be added. However, when a total content of one kind or two kinds or more of Ca, Ce, Mg, Zr, La, REM exceed(s) 0.0100%, there is a possibility in which the ductility is conversely damaged. Therefore, the total content of each element is preferably 0.0100% or less. The effect of the present invention is shown without particularly limiting a lower limit of the total content of one kind or two kinds or more of Ca, Ce, Mg, Zr, La, REM, but the total content of each element is preferably 0.0001% or more to enough obtain the improving effect of the formability of the steel sheet.

Note that REM is an abbreviation of a Rare Earth Metal, and indicates an element belonging to a lanthanoid series. In the present invention, it is often the case that REM and Ce are added as a misch metal, and there is a case in which the lanthanoide series elements are contained in complex in addition to La and Ce. The effect of the present invention is shown even if the lanthanoide series elements other than these La and Ce is contained as the inevitable impurities.

<Manufacturing Method of High-Strength Hot-Dip Galvanized Steel Sheet>

Next, a manufacturing method of a high-strength hot-dip galvanized steel sheet of the present embodiment is described.

The manufacturing method of the high-strength hot-dip galvanized steel sheet of the present embodiment includes: a hot-rolling step of heating a slab having the above-stated chemical component to 1180° C. or more, starting a hot-rolling performed by plural passes, and performing the hot-rolling in which a relationship among a temperature "T" of a hot-rolled steel sheet, a sheet thickness "h", and an elapsed time "t" between each pass within a range from 1050° C. to a rolling completion temperature satisfies the following expression (1), and finishing the rolling at a temperature range of 880° C. or more; a first cooling step of starting a cooling after an elapsed time after the hot-rolling completion until the cooling start is set to be 1.0 second or more, and stopping the cooling at 450° C. or more; a cold-rolling step of setting an elapsed time after the first cooling until 400° C. to be one hour or more, and thereafter, performing a cold-rolling while setting a total reduction ratio at 30% to 75%; a continuous annealing step of annealing at a maximum heating temperature ($Ac_3-50$)° C. or more; and a plating step of immersing the steel sheet in galvanizing bath and forming a hot-dip galvanized layer at a surface of the steel sheet after the continuous annealing step.

Note that in the following expression (1), "N" represents a total number of passes from the hot-rolling start to completion, "i" represents an order of each pass, "$T_i$" represents a rolling temperature (° C.) at the i-th pass, "$h_i$" represents a sheet thickness (mm) after the processing of the i-th pass, and "$t_i$" represents an elapsed time from the i-th pass to the next pass. Note that when i=1, $h_0$=a slab thickness. Besides, an elapsed time from a final pass to the next pass is an elapsed time from the final pass to the cooling start time after the hot-rolling completion.

Here, the expression (1) is an empirical formula in consideration of a progress of recrystallization of austenite at the hot-rolling step and a growth of recrystallized austenite, and is an index representing a size of an austenite crystal grain after the rolling. A product of a polynominal of the rolling temperature "T" and the reduction ratio represents a driving force of the recrystallization. An exponential term represents tendency for dispersion of atoms, and relates to a growth rate of recrystallized grain austenite. The time "t" is added to the product of both, a n a thereby, a degree of growth of austenite by each one pass can be evaluated, and an evaluation of an austenite grain diameter by a multi-pass hot-rolling can be done by finding a root mean square and a square root thereof.

Hereinafter, limitation reasons of the above-stated manufacturing conditions are described.

[Numerical Expression 3]

$$0.10 \le \left\{ \sum_{i=1}^{N} (5.20 \times 10^{-6} \cdot T_i^3 - 1.06 \times 10^{-2} \cdot T_i^2 + 1.68 \times 10 \cdot T_i - 5.67 \times 10^3)^2 \cdot \left(\frac{h_{i-1}}{h_i}\right)^2 \cdot \exp\left(-\frac{2.20 \times 10^4}{T_i}\right) \cdot t_i \right\}^{0.5} \le 1.00 \quad (1)$$

To manufacture the high-strength hot-dip galvanized steel sheet of the present embodiment, at first, a slab having the above-described chemical component (composition) is casted.

A slab manufactured by a continuously cast slab, a thin slab caster, and so on can be used as a slab supplied for the hot-rolling. The manufacturing method of the high-strength steel sheet of the present invention conforms to a process such as a continuous casting-direct rolling (CC-DR) performing the hot-rolling just after the casting.

(Hot-Rolling Step)

In the hot-rolling step, a slab heating temperature is set to be 1180° C. or more. When the slab heating temperature is excessively low, there is a possibility in which anisotropy of crystal orientation of a slab structure is generated resulting from the casting. Besides, when the slab heating temperature is low, a finish rolling temperature is below an $Ar_3$ transformation point to be a two-phase region rolling of ferrite and austenite, a hot-rolled sheet structure becomes a heterogeneous mixed grain structure, the heterogeneous structure is not settled even though passing through the cold-rolling and annealing steps, and the ductility and bendability deteriorate. Besides, the lowering of the finish rolling temperature incurs excessive increase of rolling load, and there are possibilities in which the rolling becomes difficult and a defective shape of the steel sheet after the rolling is incurred, and therefore, the slab heating temperature is preferably 1200° C. or more. On the other hand, an upper limit of the slab heating temperature is not particularly limited, but it is necessary to input a large amount of energy to heat the slab over 1300° C., and therefore, the slab heating temperature is preferably 1300° C. or less.

Note that the $Ar_3$ transformation point temperature is calculated by the following expression.

$Ar_3 = 901 - 325 \times C + 33 \times Si - 92 \times (Mn + Ni/2 + Cr/2 + Cu/2 + Mo/2) + 52 \times Al$ In the above expression, C, Si, Mn, Ni, Cr, Cu, Mo, Al represent contents [mass %] of each element.

The slab is heated up to the slab heating temperature, and thereafter, the hot-rolling is performed to make it the hot-rolled steel sheet. When the hot-rolling is performed, the texture of austenite becomes strong and the anisotropy thereof also becomes large if excessive rolling reduction is applied at high temperature. To avoid this, the hot-rolling is performed under the condition satisfying the above-stated expression (1) made up of the temperature of the hot-rolled steel sheet, the sheet thickness, and the elapsed time between each pass during a period from 1100° C. to the hot-rolling completion.

The above-stated expression (1) is also an expression evaluating a degree of development of the texture of austenite, and when a value of the above-stated expression (1) is below 0.10, the texture of austenite at the hot-rolled steel sheet becomes strong, and therefore, the value of the above-stated expression (1) is set to be 0.10 or more. The value of the above-stated expression (1) is preferably 0.20 or more, and more preferably 0.30 or more to further weaken the texture and to randomize the crystal orientation of the austenite.

On the other hand, when the value of the above-stated expression (1) is over 1.00, the recrystallization of austenite excessively proceeds, the structure becomes coarse, and therefore, the value of the above-stated expression (1) is preferably 1.00 or less, and more preferably 0.90 or less.

Besides, on the hot-rolling step, the finish rolling temperature of the hot-rolling, namely, the completion temperature of the hot-rolling is set to be 880° C. or more.

When the completion temperature of the hot-rolling is less than 800° C., the development of the texture of austenite is accelerated, the crystal orientation is strongly deflected, and there is a possibility that the crystal orientation of the retained austenite after the cold-rolling and the annealing as also deflected. Accordingly, it is important to perform the rolling at high temperature as much as possible in the hot-rolling so as not to develop the texture of the retained austenite.

On the other hand, an upper limit of the completion temperature of the hot-rolling is not particularly provided, but when the completion temperature is set at an excessively high-temperature range such as exceeding 1000° C., it is necessary to extract the slab at a very high temperature to secure the temperature, and therefore, it is not preferable in cost phase. Accordingly, the completion temperature is preferably 1000° C. or less.

(First Cooling Step)

After the hot-rolling is finished, the obtained hot-rolled steel sheet is rapidly cooled to make it a coil to be a hot-rolled coil, but it is necessary to appropriately control the following: an elapsed time until the rapid cooling starts; and conditions of the rapid cooling, because these conditions affect on the anisotropy of the hot-rolled steel sheet. In the present embodiment, the elapsed time after the hot-rolling completion until the rapid cooling start is set to be 1.0 second or more, thereafter, the rapid cooling is started, and the cooling is stopped at 450° C. or more. Limitation reasons for these are as follows.

After the hot-rolling, the texture of Austenite in the hot-rolled steel sheet has a strong anisotropy resulting from the processing by the rolling. To reduce the anisotropy, it is necessary to advance the recrystallization of austenite during a period after the hot-rolling is finished until the subsequent rapid cooling is started. From this point of view, the elapsed time after the hot-rolling is completed until the rapid cooling is started is set to be 1.0 second or more. To further advance the recrystallization of austenite, the elapsed time is preferably 1.5 seconds or more, and more preferably 2.0 seconds or more. An upper limit of the time is not particularly provided, but to start the rapid cooling after a long time over 20 seconds elapses, an enough space to retain the steel sheet after the hot-rolling is required, and facilities are necessary to be drastically increased in size. Therefore, it is not preferable in cost phase, so the time is preferably 20 seconds or less, and more preferably 15 seconds or less from a point of view of cost phase.

Besides, an average cooling rate of the rapid cooling after the hot-rolling until it is coiled as a coil is preferably 10° C./second or more and 60° C./second or less. When the average cooling rate is 10° C./second or less, the ferrite and the pearlite form a microstructure extending in band-shape in a rolling direction, further Mn concentrates in the pearlite to form an Mn concentrated region in band-shape. The retained austenite obtained by the annealing step is affected by the Mn concentrated region, easy to remain in a shape extending in the rolling direction, and it is not preferable because there is a possibility in which the anisotropy of the bake hardenability occurs. On the other hand, when the average cooling rate exceeds 60° C./second, transformation from the austenite does not proceed during the cooling, and it becomes a low-temperature transformation structure after the cooling. This low-temperature transformation structure strongly reflects the texture of the austenite, and therefore, it is not preferable.

Besides, a cooling stop temperature at the rapid cooling affects on the structure transformation during a step coiling the hot-rolled steel sheet into coil. Namely, in the step coiling the hot-rolled steel sheet as the coil, the pearlite and/or the coarse cementite whose major axis exceeds 1 μm is (are) generated in the hot-rolled steel sheet, and thereby, strains which are introduced according to the cold-rolling are dispersed unevenly. As a result, the austenites having a various crystal orientations are generated by a reverse transformation at the annealing step, and the texture of the retained austenite becomes random. Namely, the anisotropy of the retained austenite is weakened, and it is possible to improve isotropy of the martensite obtained by the transformation of the retained austenite. From this point of view, the stop temperature of the rapid colling after the hot-rolling is set to be 500° C. or more to generate the pearlite and/or the coarse cementite and to obtain the isotropy of the retained austenite. The cooling stop temperature is preferably 530° C. or more, and more preferably 550° C. or more to reduce the anisotropy. On the other hand, when the cooling stop temperature is set too high, a scale layer at the steel sheet surface layer becomes excessively think, and a surface grade is damaged. Therefore, it is necessary to set the cooling stop temperature at 650° C. or less. From this point of view, the cooling stop temperature is preferably 630° C. or less.

(Second Cooling Step)

Next, in a step in which the rapidly cooled steel sheet as stated above is continuously coiled as the coil, an elapsed time from the stop of the rapid cooling until 400° C. is set to be 1.0 hour or more. Namely, it is necessary to retain the steel sheet for the enough period of time at a temperature range in which the cementite is generated after the stop of the rapid cooling to sufficiently generate the pearlite and/or the coarse cementite to reduce the anisotropy of the bake hardenability during this elapsed time. Therefore, slow cooling is performed so that the elapsed time from the stop of the rapid cooling until 400° C. becomes one hour or more.

The elapsed time is preferably 2.0 hours or more, and more preferably 3.0 hours or more. An upper limit of the elapsed time is not particularly provided, but a special facility is required to retain the steel sheet for over 24.0 hours, and it is not preferable in cost phase, so the upper limit is preferably 24.0 hours or less.

Note that a step retaining the hot-rolled steel sheet during this elapsed time is normally overlapped with the coiling step, but it goes without saying that the elapsed period may include up to a coil retaining period after the coiling. Further, the slow cooling in the second cooling step is a part of a period within the elapsed period, and it goes without saying that a case when the steel sheet is retained at a constant temperature is included.

(Cold-Rolling Step)

The cold-rolling is thereafter performed for the steel sheet coiled as the hot-rolled coil as stated above.

The cold-rolling is performed such that a total reduction ratio is 30% or more and 75% or less. The cold-rolling is preferably performed by plural passes, and the number of passes of the rolling and allocation of the reduction ratio for each pass are no object. When the total reduction ratio of the cold-rolling is below 30%, enough strain is not accumulated in the steel sheet, and in the subsequent annealing step, the crystal orientation of the austenite generated by the reverse transformation does not become sufficiently random to generate anisotropy, and the anisotropy of the bake hardenability is generated. To accumulate enough strain, the total reduction ratio of the cold-rolling is preferably 33% or more, and more preferably 36% or more. On the other hand, when the total reduction ratio exceeds 75%, the steel sheet is at high risk of fracture during the cold-rolling, and therefore, the total reduction ratio is set to be 75% or less. From this point of view, the total reduction ratio is preferably 70% or less, and more preferably 65% or less.

(Continuous Annealing Step)

Next, the annealing process is performed for the cold-rolled steel sheet obtained as stated above. It is desirable to incorporate the hot-dip galvanized process (further the alloying treatment of the plating layer according to circumstances) for the steel sheet surface into the cooling process after reaching the maximum heating temperature during the annealing step. Namely, as a facility to perform the annealing step, it is preferable to use a continuous annealing plating line having a preheating zone, a reduction zone, and a plating zone. Note that an atmosphere of the preheating zone may be any one of an oxidation atmosphere, a non-oxidation atmosphere, and a direct reduction atmosphere.

Hereinafter, the step is describe as a continuous process in which a step relating to plating is incorporated into the cooling step after the annealing by using the continuous annealing plating line as stated above.

In the annealing step, it is preferable to Increase the temperature such that an average heating Rate within a range of 600 to 750° becomes 20° C./sec or less, the heating is performed such that the maximum heating temperature becomes $(Ac_3-50)°$ C. or more, and the cooling is performed such that the average cooling rate within a range of 740 to 500° C. becomes 1.0° C./second or more.

Here, in the continuous annealing plating line, the heating step including the temperature increase at 20° C./sec or less within the range of 600 to 750° C. is performed at the preheating zone, subsequently it is reached the maximum heating temperature of the annealing at the reduction zone, and further, the cooling within the range of 740 to 500° C. is performed at 1.0° C./sec or more during the cooling process until reaching the plating zone.

These annealing conditions are described below.

The heating rate at the annealing step affects on a recrystallization behavior in the steel sheet. In particular, the rate of heating at 600 to 750° C. largely affects on the isotropy of the structure. Accordingly, within this temperature range, it is preferable to set the average heating rate particularly at 600 to 750° C. to be 20° C./second or less because the recrystallization is enough advanced to make the structure before the reverse transformation uniform and isotropic, and thereby, the austenite generated therefrom by the reverse transformation has fine and isotropic pattern.

Here, the heating process in the annealing step is performed at the preheating zone in the continuous annealing plating line, but it is desirable that at least a part of the preheating zone is an oxidation process zone in the oxidation atmosphere, and an oxidation process to form an Fe-oxide coating film having an appropriate thickness at the steel sheet surface layer is performed in the oxidation process zone. Namely, it is desirable to form the Fe-oxide coating film having the appropriate thickness at the oxidation process zone being at least a part of the preheating zone as a preprocess of a stage forming a decarburized layer at the steel sheet surface layer by the heating at the subsequent redaction zone. In this case, it is desirable that the steel sheet temperature when it passes through the oxidation process zone is set at 400 to 800° C., and an air ratio being a ratio between "a volume of air contained in mixed gas in a unit volume" and "a volume of air theoretically required to enable complete combustion of fuel gas contained in the mixed gas in a unit volume" is set at 0.7 to 1.2 in the mixed gas of air and the fuel gas used for a preheating burner when the heating is performed at the oxidation process zone in the preheating zone to thereby form the Fe-oxide coating film of 0.01 to 20 μm at the surface layer of the steel sheet.

When the air ratio exceeds 1.2, the oxide coating film excessively grows, and there are possibilities in which the decarburized layer formed at the steel sheet surface layer portion excessively grows at the subsequent reduction zone, and in which the oxide coating film cannot fully be reduced at the reduction zone, the oxide coating film remains at the surface layer of the steel sheet, and platability is lowered. On the other hand, when the air ratio volume ratio is less than 0.7, the oxide coating film is not fully generated. Besides, the oxide coating film generated at the oxidation process zone in the preheating zone functions as an oxygen supply source of the oxide containing Si and/or Mn in the decarburized layer formed at the subsequent reduction zone, but if the oxide coating film is not fully generated, there is a possibility in which the decarburized layer where the high density and fine oxides are dispersed as described above cannot be obtained.

Besides, when the steel sheet temperature when passing through the oxidation process zone in the preheating zone is less than 400° C., in is impossible to form the sufficient oxide coating film, on the other hand, the oxide coating film excessively grows at the high-temperature over 800° C., and therefore, it becomes difficult to set the thickness of the decarburized layer within at predetermined range.

When the maximum heating temperature at the annealing step is low, the reverse transformation into the austenite does not proceed sufficiently, and a fraction of the ferrite becomes excessively large. Besides, the maximum heating temperature is set at $(Ac_3-50)°$ C. or more to secure a sufficient hard Structural fraction, and it is preferably $(Ac_3-35)°$ C. or more. An upper limit of the maximum heating temperature is not particularly provided, but when it is heated over 1000° C., the quality of the steel sheet surface is drastically damaged, wettability of the plating is deteriorated, and therefore, the maximum heating temperature is preferably 1000° C. or less, and more preferably 950° C. or less.

Besides, it is desirable to reach the maximum heating temperature in the annealing step at the reduction zone in the continuous annealing plating line. At the reduction zone, it is possible to form the decarburized layer by reducing the Fe-oxide coating film generated at the oxidation process zone in the preheating zone, and to disperse the oxides moderately containing Si and/or Mn in the decarburized layer. Here, the atmosphere of the reduction zone is desirable to be an atmosphere in which a ratio $(P(H_2O)/P(H_2))$ between a water vapor partial pressure $P H_2O$) and a hydrogen partial pressure $P(H_2)$ is within a range of 0.0001 to 2.00. When the $(P(H_2O)/P(H_2))$ is less than 0.0001, the oxides containing Si and/or Mn are formed only at an upper most surface layer, and it becomes difficult to moderately disperse the oxides containing Si and/or Mn inside the decarburized layer. On the other hand, when the $(P(H_2O)/P(H_2))$ exceeds 2.00, the decarburization excessively proceeds, and there is a possibility in which the thickness of the decarburized layer cannot be controlled into a predetermined range. Note that the $(P(H_2O)/P(H_2))$ is preferably within a range of 0.001 to 1.50, and more preferably within a range of 0.002 to 1.20.

In the cooling process from the maximum heating temperature in the annealing step, the cooling is performed such that the average cooling rate within a range of 740° C. to 500° C. in the cooling process is 1.0° C./second or more to suppress the ferrite transformation, and to make the transformation temperature low as much as possible to make an effective crystal grain diameter fine. Namely, 740° C. to 500° C. is a temperature range where the ferrite is generated, and it is possible to suppress the ferrite transformation by setting the average cooling rate within the temperature range at 1.0° C./second or more. From this point of view, the average cooling rate in the cooling process from the maximum heating temperature is preferably 2.5° C./second or more, and more preferably 4.0° C./second or more. An upper limit of the cooling rate is not particularly provided, but a special cooling facility and a coolant interfering with the plating step are required to obtain an excessively large average cooling rate, and therefore, it is not preferable. From this point of view, the average cooling rate is preferably 150° C./second or less, and more preferably 100° C./second or less.

(Plating Step)

Subsequently, the steel sheet is immersed into hot-dip galvanizing bath at the plating zone to perform hot-dip galvanizing. As a composition of the plating bath, it is preferable that zinc is a main constituent, an effective Al amount being a value in which a total Fe amount is subtracted from a total Al amount in the bath is within a range of 0.01 to 0.18 wt %. Particularly when an alloying treatment is performed after the plating, the effective Al amount in the bath is preferably within a range of 0.07 to 0.12 wt % to control the progress of alloying of the plating layer.

On the other hand, when the plating layer is not to be alloyed, there is no problem if the effective Al amount in the bath is within a range of 0.18 to 0.30 wt %. When the amount of Al is large, an Al alloy is generated first between a base iron/plating layer before the alloying, and it functions as a barrier, therefore the alloying does not proceed. Accordingly, the Al amount is to be suppressed when the alloying is performed. On the other hand, when the Al amount is too much suppressed, the alloying excessively proceeds, and from this point of view, Al is necessary to be added, so the Al amount is determined by a relationship of both balance. On the other hand, when the alloying is not performed, there is no big problem if the barrier layer is generated, and therefore, there is no practical problem if the Al amount becomes large.

Besides, the effect of the present invention is not damaged if one kind or two kinds or more from among Pb, Sb, Si, Sn, Mg, Mn, Ni, Cr, Co, Ca, Cu, Li, Ti, Be, Bi, Sr, I, Cs, Sr, REM is(are) mixed into the galvanizing bath, and there is a case when it is preferable such that corrosion resistance and workability are improved depending on the amount thereof.

A temperature of the plating bath is preferably 450° C. to 470° C. When the plating bath temperature is less than 450° C., viscosity of the plating bath excessively increases, then it becomes difficult to control a thickness of the plating layer, and an external appearance of the steel sheet is damaged. On the other hand, when the plating bath temperature exceeds 470° C., a lot of fumes are generated, and it becomes difficult to safely perform the manufacturing. Therefore, the plating bath temperature is preferably 470° C. or less.

Besides, when, the steel sheet temperature at the time when the steel sheet enters into the plating bath is below 430° C., it is practically not appropriate because it is necessary to give the plating bath a lot of heat quantity to stabilize the plating bath temperature at 450° C. or more. On the other hand, when the steel sheet temperature at the time when the steel sheet enters into the plating bath is over 490° C., a facility to remove a lot of heat from the plating bath becomes necessary to stabilize the plating bath temperature at 470° c. or less, and it is not appropriate from a point of view of the manufacturing cost. Accordingly, the entering temperature of the steel sheet into the plating bath is preferably 430° C. to 490° C. to stabilize the bath temperature of the plating bath.

Further, to advance the bainite transformation and to enough secure the retained austenite, the steel sheet is retained for 20 seconds to 1000 seconds including the time to immerse into the plating bath at the temperature within a range of 300 to 470° C. before or after the immersion into the plating bath, and thereby, it is possible to control the volume fraction of the retained austenite. In this case, when the retention time is less than 20 seconds, the bainite transformation does not enough proceed, and the concentration of carbon to the retained austenite becomes insufficient. The retention time is preferably 35 seconds or more, and more preferably 50 seconds or more to further increase the bake hardenability. On the other hand, when the retention time exceeds 1000 seconds, predetermined properties cannot be obtained because carbon excessively concentrates to the retained austenite, or generation of the cementite begins. The retention time is preferably 600 seconds or less, and more preferably 450 seconds or less to limit the carbon concentration in the retained austenite and to obtain the high bake hardenability.

Besides, when the alloying treatment is performed after the plating, the bainite transformation process may be performed either before or after the alloying treatment.

After the immersion into the plating bath, the alloying treatment of the plating layer may be performed. An alloying treatment temperature is preferably 470° C. or more because when it is less than 470C., the alloying does not sufficiently proceed. Besides, when the alloying treatment temperature exceeds 620° C., coarse cementite is generated to drastically lower the strength, and therefore, it is preferably 620° C. or less. The alloying treatment temperature is preferably 480 to 600° C., and more preferably 490 to 580° C.

An alloying treatment time is preferably two seconds or more, and more preferably five seconds or more to enough proceed the alloying. On the other hand, when the alloying treatment time exceeds 200 seconds, the plating layer is excessively alloyed, and there is a possibility in which the properties deteriorate, and therefore, the alloying treatment time is preferably 200 seconds or less, and more preferably 100 seconds or less.

Note that the alloying treatment is preferably performed just after the immersion into the plating bath, but the steel sheet temperature may be once lowered to 150° C. or less after the immersion, and thereafter, reheated to the alloying treatment temperature.

In the colling process after the hot-dip galvanizing (after the alloying treatment when the alloying treatment is performed just after the hot-dip galvanizing), when the average cooling rate to cool to a temperature range of 150° C. or less is below 0.5° C./second, the coarse cementite is generated, and there is a possibility in which the strength and/or the ductility deteriorate, and therefore, the average cooling rate is preferably 0.5° C./second or more, and more preferably 1.0° C./second or more.

Besides, a reheating process may be performed with the aim of tempering the martensite during the cooling or after the cooling after the hot-dip galvanizing (after the alloying treatment when the alloying treatment is performed just after the hot-dip galvanizing). The heating temperature when the reheating is performed is preferably 200° C. or more because the tempering does not sufficiently proceed if it is less than 200° C. Besides, when the heating temperature exceeds 620° C., the strength extremely deteriorates, and therefore, it is preferably 620° C. or less, and more preferably 550° C. or less.

Further, it is preferable to perform a temper rolling in which a rolling is performed in cold state for the steel sheet cooled to a room temperature after the plating step to increase an average dislocation density. Also in this temper rolling, the reduction ratio is preferably 5.00% or less Note that a lower limit of the reduction ratio is not particularly defined, but it is preferably 0.05 % or more, and more preferably 0.10% or more.

In this case, a degree of reduction ratio of the temper rolling in which a strain-induced martensite is not practically generated and transition is generated in ferrite is preferably 1 % or less, and more preferably 0.50%. It is possible to introduce the strain of approximately $1.0 \times 10^{13}/m^2$ at a whole area of the steel sheet without generating the strain-induced transformation of major part of the retained austenite by this temper rolling.

Besides, a coating film made up of a composite oxide containing phosphorus oxide and/or phosphorus may be formed by performing a phosphoric acid-based coating film forming process for the hot-dip galvanized steel sheet obtained by the above-stated method. The coating film made up of the composite oxide containing phosphorus oxide and/or phosphorus can be made function as lubricant when the steel sheet is processed, and it is possible to protect the plating layer formed at the surface of the base steel sheet.

Hereinafter, the present invention is concretely described by examples. Incidentally, the following examples are to be considered to illustrate concrete effects of the present invention, and it goes without saying that conditions described in the examples are not to limit the technical scope of the present invention.

EXAMPLES

Hereinafter, the effects of the present invention are described by examples, but the present invention is not limited to conditions used in the following examples.

Stabs harming the chemical components (composition) of A to AG illustrated in Tables 1 to 3 are casted, they are hot-rolled with conditions (the slab heating temperature, the above-stated expression (1), the hot-rolling completion temperature) of the hot-rolling step illustrated in Tables 4 to 7 immediately after the casting, they are cooled while using conditions (the elapsed time until the start of the rapid cooling, the average cooling rate of the rapid cooling, the stop temperature of the rapid cooling) of the rapid cooling (first cooling step) after the hot-rolling is completed until the time when the steel sheet is coiled as a coil as conditions illustrated in Tables 4 to 7, and thereafter, in the step subsequently coiling as a coil, the process is performed while setting the elapsed time required for the cooling (second cooling) from the stop of the rapid cooling until 400° C. under conditions illustrated in Tables 4 to 7. After the steel sheet is coiled as the coil, the cold-rolling step is performed with each of reduction ratios illustrated in Tables 4 to 7.

TABLE 1

| CHEMICAL COMPONENT | C MASS (%) | Si MASS (%) | Mn MASS (%) | P MASS (%) | S MASS (%) | Al MASS (%) | N MASS (%) | O MASS (%) | |
|---|---|---|---|---|---|---|---|---|---|
| A | 0.165 | 1.06 | 2.30 | 0.0051 | 0.0020 | 0.042 | 0.0018 | 0.0016 | EXAMPLE |
| B | 0.096 | 1.39 | 2.52 | 0.0110 | 0.0010 | 0.035 | 0.0021 | 0.0016 | EXAMPLE |
| C | 0.233 | 0.72 | 1.70 | 0.0137 | 0.0031 | 0.062 | 0.0031 | 0.0009 | EXAMPLE |
| D | 0.171 | 0.58 | 2.08 | 0.0131 | 0.0005 | 0.204 | 0.0047 | 0.0012 | EXAMPLE |
| E | 0.287 | 0.23 | 2.52 | 0.0157 | 0.0045 | 0.949 | 0.0014 | 0.0005 | EXAMPLE |
| F | 0.228 | 1.23 | 1.51 | 0.0143 | 0.0062 | 0.065 | 0.0023 | 0.0020 | EXAMPLE |
| G | 0.218 | 1.01 | 2.73 | 0.0077 | 0.0030 | 0.054 | 0.0009 | 0.0014 | EXAMPLE |
| H | 0.123 | 1.95 | 1.26 | 0.0096 | 0.0050 | 0.072 | 0.0043 | 0.0024 | EXAMPLE |
| I | 0.166 | 0.36 | 2.88 | 0.0137 | 0.0011 | 0.960 | 0.0047 | 0.0002 | EXAMPLE |
| J | 0.236 | 0.89 | 2.12 | 0.0139 | 0.0038 | 0.037 | 0.0046 | 0.0017 | EXAMPLE |
| K | 0.183 | 0.84 | 1.60 | 0.0051 | 0.0025 | 0.060 | 0.0018 | 0.0015 | EXAMPLE |
| L | 0.330 | 0.56 | 2.20 | 0.0109 | 0.0034 | 0.692 | 0.0027 | 0.0025 | EXAMPLE |
| M | 0.187 | 1.39 | 0.92 | 0.0094 | 0.0027 | 0.073 | 0.0016 | 0.0014 | EXAMPLE |
| N | 0.087 | 1.78 | 2.21 | 0.0060 | 0.0042 | 0.056 | 0.0026 | 0.0017 | EXAMPLE |
| O | 0.224 | 1.21 | 2.66 | 0.0032 | 0.0050 | 0.063 | 0.0036 | 0.0008 | EXAMPLE |
| P | 0.165 | 0.82 | 1.94 | 0.0083 | 0.0020 | 0.051 | 0 0023 | 0.0017 | EXAMPLE |
| Q | 0.244 | 0.08 | 2.44 | 0.0190 | 0.0026 | 1.261 | 0.0039 | 0.0018 | EXAMPLE |
| R | 0.170 | 1.51 | 1.12 | 0.0140 | 0.0019 | 0.067 | 0.0038 | 0.0011 | EXAMPLE |
| S | 0.126 | 0.80 | 2.97 | 0.0075 | 0.0047 | 0.061 | 0.0018 | 0.0006 | EXAMPLE |
| T | 0.185 | 0.48 | 2.51 | 0.0132 | 0.0009 | 0.325 | 0.0049 | 0.0013 | EXAMPLE |
| U | 0.195 | 1.17 | 1.99 | 0.0063 | 0.0051 | 0.029 | 0.0027 | 0.0012 | EXAMPLE |
| V | 0.207 | 0.96 | 1.66 | 0.0149 | 0.0020 | 0.040 | 0.0046 | 0.0021 | EXAMPLE |
| W | 0.153 | 0.19 | 2.15 | 0.0086 | 0.0012 | 0.749 | 0.0016 | 0.0024 | EXAMPLE |
| X | 0.163 | 0.83 | 1.44 | 0.0100 | 0.0057 | 0.461 | 0.0021 | 0.0024 | EXAMPLE |
| Y | 0.104 | 1.73 | 1.90 | 0.0098 | 0.0034 | 0.017 | 0.0059 | 0.0018 | EXAMPLE |
| Z | 0.274 | 0.67 | 2.35 | 0.0147 | 0.0026 | 0.123 | 0.0053 | 0.0018 | EXAMPLE |
| AA | 0.121 | 0.94 | 3.04 | 0.0074 | 0.0015 | 0.046 | 0.0030 | 0.0013 | EXAMPLE |
| AB | 0.153 | 1.14 | 1.70 | 0.0051 | 0.0043 | 0.054 | 0.0038 | 0.0017 | EXAMPLE |
| AC | 0.252 | 0.72 | 2.85 | 0.0140 | 0.0044 | 0.069 | 0.0027 | 0.0009 | EXAMPLE |
| AD | 0.197 | 1.37 | 1.87 | 0.0094 | 0.0014 | 0.052 | 0.0039 | 0.0013 | EXAMPLE |
| AE | 0.069 | 1.23 | 2.30 | 0.0116 | 0.0048 | 0.028 | 0.0026 | 0.0014 | COMPARATIVE EXAMPLE |
| AF | 0.421 | 1.17 | 2.31 | 0.0050 | 0.4600 | 0.038 | 0.0030 | 0.0022 | COMPARATIVE EXAMPLE |
| AG | 0.149 | 1.16 | 0.37 | 0.0090 | 0.0053 | 0.028 | 0.0030 | 0.0011 | COMPARATIVE EXAMPLE |
| AH | 0.164 | 2.79 | 2.31 | 0.015 | 0.0024 | 0.111 | 0.0032 | 0.0009 | COMPARATIVE EXAMPLE |
| AI | 0.167 | 0.00 | 2.35 | 0.014 | 0.0015 | 0.013 | 0.0026 | 0.0017 | COMPARATIVE EXAMPLE |
| AJ | 0.154 | 0.94 | 4.27 | 0.012 | 0.0025 | 0.087 | 0.0039 | 0.0016 | COMPARATIVE EXAMPLE |
| AK | 0.152 | 0.84 | 2.34 | 0.016 | 0.0009 | 2.43 | 0.0048 | 0.0013 | COMPARATIVE EXAMPLE |

TABLE 2

| CHEMICAL COMPONENT | Ti MASS (%) | Nb MASS (%) | V MASS (%) | Cr MASS (%) | Ni MASS (%) | Cu MASS (%) | Mo MASS (%) | B MASS (%) | |
|---|---|---|---|---|---|---|---|---|---|
| A | | | | | | | | | EXAMPLE |
| B | | | | | | | | | EXAMPLE |
| C | | | | | | | | | EXAMPLE |
| D | | | | | | | | | EXAMPLE |
| E | | | | | | | | | EXAMPLE |
| F | | | | 0.17 | | | | | EXAMPLE |
| G | | 0.029 | | | | | | | EXAMPLE |
| H | | | | 1.04 | | | | | EXAMPLE |
| I | | | | | 0.79 | | | | EXAMPLE |
| J | | | 0.109 | | | | | | EXAMPLE |
| K | | | | | | | | 0.0015 | EXAMPLE |
| L | | | | | | 0.14 | | | EXAMPLE |
| M | | | | 0.81 | | | 0.05 | | EXAMPLE |
| N | | | | | | | | | EXAMPLE |
| O | | | | | | | | | EXAMPLE |
| P | | | | | | | | | EXAMPLE |
| Q | | | | | | | 0.09 | 0.0009 | EXAMPLE |
| R | 0.003 | 0.016 | | | | | | 0.0030 | EXAMPLE |
| S | 0.030 | | | | | | | | EXAMPLE |
| T | | | | | 0.49 | 0.21 | | | EXAMPLE |
| U | | | | | | | | | EXAMPLE |
| V | 0.051 | | | | | | | 0.0042 | EXAMPLE |
| W | | | | | | | | | EXAMPLE |
| X | | | | | 1.04 | 0.47 | | | EXAMPLE |
| Y | | | | | | | | | EXAMPLE |
| Z | | | | | | | 0.23 | | EXAMPLE |
| AA | | | | | | | | | EXAMPLE |
| AB | | | | | | | | | EXAMPLE |
| AC | 0.079 | 0.007 | | | | | | | EXAMPLE |
| AD | | | | | | | | | EXAMPLE |
| AE | | | | | | | | | COMPARATIVE EXAMPLE |
| AF | | | | | | | | | COMPARATIVE EXAMPLE |
| AG | | | | | | | | | COMPARATIVE EXAMPLE |
| AH | | | | | | | | | COMPARATIVE EXAMPLE |
| AI | | | | | | | | | COMPARATIVE EXAMPLE |
| AJ | | | | | | | | | COMPARATIVE EXAMPLE |
| AK | | | | | | | | | COMPARATIVE EXAMPLE |

TABLE 3

| CHEMICAL COMPONENT | W MASS (%) | Ca MASS (%) | Ce MASS (%) | Mg MASS (%) | Zr MASS (%) | La MASS (%) | REM MASS (%) | |
|---|---|---|---|---|---|---|---|---|
| A | | | | | | | | EXAMPLE |
| B | | | | | | | | EXAMPLE |
| C | | | | | | | | EXAMPLE |
| D | | | | | | | | EXAMPLE |
| E | | | | | | | | EXAMPLE |
| F | | 0.0028 | | | | | | EXAMPLE |
| G | | | | | | | | EXAMPLE |
| H | | | | | | | | EXAMPLE |
| I | | | | | | | | EXAMPLE |
| J | | | | | | | | EXAMPLE |
| K | | | | | | | | EXAMPLE |
| L | | | | | | | | EXAMPLE |
| M | | | | | | | | EXAMPLE |
| N | | 0.0006 | 0.0010 | | | | | EXAMPLE |
| O | 0.41 | | | | | | | EXAMPLE |
| P | | | 0.0035 | | | | | EXAMPLE |
| Q | | | | | | | | EXAMPLE |
| R | | | 0.0017 | | | | | EXAMPLE |
| S | | | | | | | | EXAMPLE |
| T | | | | | | | | EXAMPLE |
| U | | | | 0.0015 | | | | EXAMPLE |
| V | | | | | | | | EXAMPLE |
| W | | | | | | 0.0028 | | EXAMPLE |

TABLE 3-continued

| CHEMICAL COMPONENT | W MASS (%) | Ca MASS (%) | Ce MASS (%) | Mg MASS (%) | Zr MASS (%) | La MASS (%) | REM MASS (%) | |
|---|---|---|---|---|---|---|---|---|
| X | | | | | | | | EXAMPLE |
| Y | | | | | | | 0.0036 | EXAMPLE |
| Z | | | | | | | | EXAMPLE |
| AA | | | | | 0.0028 | | | EXAMPLE |
| AB | | 0.0049 | | | | | | EXAMPLE |
| AC | | | | | | | | EXAMPLE |
| AD | | | | | | | | EXAMPLE |
| AE | | | | | | | | COMPARATIVE EXAMPLE |
| AF | | | | | | | | COMPARATIVE EXAMPLE |
| AG | | | | | | | | COMPARATIVE EXAMPLE |
| AH | | | | | | | | COMPARATIVE EXAMPLE |
| AI | | | | | | | | COMPARATIVE EXAMPLE |
| AJ | | | | | | | | COMPARATIVE EXAMPLE |
| AK | | | | | | | | COMPARATIVE EXAMPLE |

TABLE 4

| EXPERIMENTAL EXAMPLE | CHEMICAL COMPONENT | HOT-ROLLING ||| FIRST COOLING |||| SECOND COOLING | COLD-ROLLING | NOTE |
| | | SLAB HEATING TEMPERATURE °C. | EXPRESSION 1 | ROLLING COMPLETION TEMPERATURE °C. | ELAPSED TIME UNTIL COOLING START SECOND | AVERAGE COOLING RATE °C./SECOND | COOLING STOP TEMPERATURE °C. | ELAPSED TIME UNTIL 400° C. TIME | STEP REDUCTION RATIO % | |
|---|---|---|---|---|---|---|---|---|---|---|
| 1 | A | 1215 | 0.40 | 966 | 3.8 | 30.0 | 571 | 3.3 | 40 | EXAMPLE |
| 2 | A | 1240 | 0.57 | 952 | 3.2 | 34.8 | 605 | 3.9 | 56 | EXAMPLE |
| 3 | A | 1230 | 0.88 | 884 | 4.1 | 25.5 | 573 | 2.1 | 42 | EXAMPLE |
| 4 | A | 1260 | 0.43 | 929 | 4.0 | 26.7 | 584 | 5.2 | 53 | EXAMPLE |
| 5 | B | 1240 | 0.46 | 890 | 4.0 | 26.5 | 582 | 2.4 | 60 | EXAMPLE |
| 6 | B | 1205 | 0.18 | 978 | 1.8 | 37.7 | 575 | 3.0 | 65 | EXAMPLE |
| 7 | B | 1265 | 0.61 | 953 | 2.4 | 51.4 | 553 | 3.8 | 50 | EXAMPLE |
| 8 | B | 1245 | 0.69 | 887 | 3.2 | 27.5 | 602 | 3.3 | 65 | EXAMPLE |
| 9 | C | 1280 | 0.51 | 909 | 1.4 | 25.9 | 611 | 3.8 | 50 | EXAMPLE |
| 10 | C | 1200 | 0.58 | 948 | 1.5 | 35.1 | 616 | 2.7 | 59 | EXAMPLE |
| 11 | C | 1215 | 0.79 | 934 | 3.5 | 37.8 | 566 | 3.4 | 63 | EXAMPLE |
| 12 | C | 1220 | 0.31 | 950 | 2.7 | 45.2 | 597 | 5.2 | 71 | EXAMPLE |
| 13 | D | 1270 | 0.65 | 949 | 2.9 | 29.0 | 565 | 2.7 | 59 | EXAMPLE |
| 14 | D | 1215 | 0.40 | 915 | 1.6 | 31.0 | 634 | 4.6 | 50 | EXAMPLE |
| 15 | D | 1210 | 0.84 | 899 | 8.5 | 28.2 | 582 | 2.9 | 58 | EXAMPLE |
| 16 | D | 1030 | 0.02 | 750 | 2.4 | 12.5 | 577 | 2.5 | 58 | COMPARATIVE EXAMPLE |
| 17 | E | 1255 | 0.72 | 952 | 2.3 | 31.5 | 547 | 4.0 | 45 | EXAMPLE |
| 18 | E | 1210 | 0.45 | 945 | 4.4 | 27.4 | 568 | 2.0 | 72 | EXAMPLE |
| 19 | E | 1245 | 0.62 | 915 | 3.4 | 24.6 | 604 | 2.9 | 40 | EXAMPLE |
| 20 | E | 1210 | 0.07 | 957 | 2.7 | 28.6 | 578 | 2.2 | 63 | COMPARATIVE EXAMPLE |
| 21 | F | 1260 | 0.31 | 920 | 2.7 | 26.6 | 599 | 3.4 | 58 | EXAMPLE |
| 22 | F | 1260 | 0.62 | 988 | 3.9 | 47.5 | 595 | 2.6 | 35 | EXAMPLE |
| 23 | F | 1245 | 0.69 | 912 | 2.4 | 26.5 | 602 | 4.1 | 34 | EXAMPLE |
| 24 | F | 1265 | 0.02 | 927 | 3.6 | 46.8 | 560 | 2.4 | 48 | COMPARATIVE EXAMPLE |
| 25 | G | 1235 | 0.25 | 934 | 2.3 | 31.8 | 602 | 3.9 | 50 | EXAMPLE |
| 26 | G | 1205 | 0.40 | 913 | 3.5 | 46.0 | 524 | 2.5 | 48 | EXAMPLE |
| 27 | G | 1240 | 0.60 | 941 | 3.2 | 29.6 | 587 | 3.3 | 64 | EXAMPLE |
| 28 | G | 1260 | 0.18 | 840 | 2.2 | 44.6 | 551 | 3.6 | 66 | COMPARATIVE EXAMPLE |
| 29 | H | 1275 | 0.54 | 882 | 2.9 | 41.3 | 569 | 2.7 | 56 | EXAMPLE |
| 30 | H | 1205 | 0.23 | 917 | 4.7 | 35.8 | 614 | 3.7 | 56 | EXAMPLE |

TABLE 5

| EXPERIMENTAL EXAMPLE | CHEMICAL COMPONENT | HOT-ROLLING | | | FIRST COOLING | |
|---|---|---|---|---|---|---|
| | | SLAB HEATING TEMPERATURE ° C. | EXPRESSION I | ROLLING COMPLETION TEMPERATURE ° C. | ELAPSED TIME UNTIL COOLING START SECOND | AVERAGE COOLING RATE ° C./ SECOND |
| 31 | H | 1220 | 0.19 | 935 | 4.7 | 16.1 |
| 32 | H | 1230 | 0.37 | 949 | 0.2 | 26.1 |
| 33 | I | 1205 | 0.91 | 933 | 3.9 | 41.8 |
| 34 | I | 1225 | 0.67 | 913 | 7.4 | 31.7 |
| 35 | I | 1230 | 0.41 | 884 | 3.7 | 21.0 |
| 36 | I | 1250 | 0.21 | 901 | 2.5 | 33.9 |
| 37 | J | 1240 | 0.52 | 920 | 1.1 | 30.5 |
| 38 | J | 1275 | 0.83 | 946 | 2.8 | 33.9 |
| 39 | J | 1235 | 0.27 | 886 | 3.2 | 21.6 |
| 40 | J | 1235 | 0.54 | 956 | 1.2 | 44.1 |
| 41 | K | 1200 | 0.25 | 895 | 3.0 | 29.8 |
| 42 | K | 1240 | 0.62 | 953 | 3.3 | 35.8 |
| 43 | K | 1200 | 0.31 | 953 | 3.1 | 44.0 |
| 44 | K | 1210 | 0.54 | 916 | 3.1 | 26.0 |
| 45 | L | 1200 | 0.58 | 955 | 4.2 | 41.9 |
| 46 | L | 1225 | 0.60 | 940 | 3.7 | 28.9 |
| 47 | L | 1260 | 0.51 | 964 | 3.1 | 30.8 |
| 48 | L | 1205 | 0.20 | 956 | 3.3 | 43.4 |
| 49 | M | 1200 | 0.67 | 907 | 3.7 | 31.7 |
| 50 | M | 1260 | 0.38 | 913 | 4.4 | 28.8 |
| 51 | M | 1240 | 0.60 | 930 | 4.8 | 35.7 |
| 52 | M | 1260 | 0.34 | 937 | 3.2 | 37.3 |
| 53 | N | 1260 | 0.52 | 960 | 4.9 | 41.6 |
| 54 | N | 1270 | 0.53 | 951 | 1.4 | 49.2 |
| 55 | N | 1270 | 0.22 | 973 | 2.2 | 29.8 |
| 56 | N | 1250 | 0.40 | 932 | 4.1 | 35.8 |
| 57 | O | 1200 | 0.69 | 940 | 2.6 | 41.7 |
| 58 | O | 1205 | 0.46 | 982 | 3.4 | 37.8 |
| 59 | O | 1245 | 0.30 | 913 | 3.1 | 28.5 |
| 60 | O | 1205 | 0.44 | 966 | 1.7 | 36.7 |

| EXPERIMENTAL EXAMPLE | FIRST COOLING COOLING STOP TEMPERATURE ° C. | SECOND COOLING ELAPSED TIME UNTIL 400° C. TIME | COLD-ROLLING STEP REDUCTION RATIO % | NOTE |
|---|---|---|---|---|
| 31 | 611 | 3.8 | 53 | EXAMPLE |
| 32 | 615 | 4.7 | 80 | COMPARATIVE EXAMPLE |
| 33 | 566 | 3.4 | 38 | EXAMPLE |
| 34 | 574 | 2.5 | 53 | EXAMPLE |
| 35 | 609 | 3.3 | 64 | EXAMPLE |
| 36 | 428 | 5.0 | 30 | COMPARATIVE EXAMPLE |
| 37 | 549 | 5.0 | 50 | EXAMPLE |
| 38 | 582 | 2.3 | 38 | EXAMPLE |
| 39 | 588 | 1.6 | 66 | EXAMPLE |
| 40 | 543 | 0.3 | 60 | COMPARATIVE EXAMPLE |
| 41 | 561 | 2.3 | 45 | EXAMPLE |
| 42 | 589 | 3.5 | 59 | EXAMPLE |
| 43 | 583 | 2.8 | 43 | EXAMPLE |
| 44 | 613 | 3.8 | 15 | COMPARATIVE EXAMPLE |
| 45 | 621 | 1.8 | 41 | EXAMPLE |
| 46 | 584 | 2.9 | 55 | EXAMPLE |
| 47 | 590 | 3.9 | 47 | EXAMPLE |
| 48 | 577 | 2.2 | 88 | COMPARATIVE EXAMPLE |
| 49 | 567 | 3.8 | 44 | EXAMPLE |
| 50 | 587 | 1.6 | 40 | EXAMPLE |
| 51 | 613 | 2.5 | 58 | EXAMPLE |
| 52 | 608 | 2.8 | 63 | COMPARATIVE EXAMPLE |
| 53 | 599 | 4.4 | 35 | EXAMPLE |
| 54 | 596 | 4.0 | 46 | EXAMPLE |
| 55 | 605 | 5.4 | 48 | EXAMPLE |
| 56 | 623 | 2.8 | 42 | COMPARATIVE EXAMPLE |
| 57 | 585 | 2.0 | 65 | EXAMPLE |

TABLE 5-continued

| | | | | |
|---|---|---|---|---|
| 58 | 599 | 2.7 | 64 | EXAMPLE |
| 59 | 587 | 3.5 | 67 | EXAMPLE |
| 60 | 582 | 2.2 | 71 | COMPARATIVE EXAMPLE |

TABLE 6

| EXPERIMENTAL EXAMPLE | CHEMICAL COMPONENT | HOT-ROLLING SLAB HEATING TEMPERATURE ° C. | EXPRESSION 1 | ROLLING COMPLETION TEMPERATURE ° C. | FIRST COOLING ELAPSED TIME UNTIL COOLING START SECOND | FIRST COOLING AVERAGE COOLING RATE ° C./SECOND |
|---|---|---|---|---|---|---|
| 61 | P | 1275 | 0.26 | 939 | 3.6 | 41.6 |
| 62 | P | 1200 | 0.16 | 950 | 3.6 | 26.2 |
| 63 | P | 1266 | 0.54 | 933 | 3.9 | 30.1 |
| 64 | P | 1260 | 1.55 | 923 | 2.9 | 24.9 |
| 65 | Q | 1215 | 0.41 | 941 | 2.0 | 33.9 |
| 66 | Q | 1265 | 0.81 | 901 | 9.2 | 13.5 |
| 67 | Q | 1230 | 0.21 | 965 | 4.7 | 44.6 |
| 68 | Q | 1205 | 2.03 | 922 | 2.5 | 37.7 |
| 69 | R | 1240 | 0.40 | 942 | 2.6 | 40.3 |
| 70 | R | 1255 | 0.72 | 302 | 3.3 | 21.4 |
| 71 | R | 1210 | 0.50 | 915 | 2.2 | 31.5 |
| 72 | R | 1280 | 0.65 | 910 | 3.3 | 32.6 |
| 73 | S | 1270 | 0.55 | 928 | 2.4 | 29.7 |
| 74 | S | 1215 | 0.27 | 887 | 4.0 | 30.2 |
| 75 | S | 1220 | 0.76 | 958 | 3.4 | 52.5 |
| 76 | S | 1255 | 0.65 | 961 | 2.2 | 34.1 |
| 77 | T | 1275 | 0.48 | 920 | 2.2 | 52.5 |
| 78 | T | 1240 | 0.14 | 926 | 2.6 | 36.8 |
| 79 | T | 1245 | 0.49 | 952 | 2.9 | 44.1 |
| 80 | T | 1235 | 0.32 | 916 | 3.1 | 31.1 |
| 81 | U | 1265 | 0.48 | 917 | 4.5 | 38.2 |
| 82 | U | 1250 | 0.22 | 894 | 4.6 | 22.9 |
| 83 | U | 1255 | 0.25 | 917 | 4.3 | 39.3 |
| 84 | U | 1275 | 0.52 | 906 | 3.5 | 25.4 |
| 85 | V | 1280 | 0.79 | 936 | 4.7 | 42.2 |
| 86 | V | 1255 | 0.48 | 963 | 2.0 | 46.6 |
| 87 | V | 1215 | 0.43 | 893 | 4.4 | 35.4 |
| 88 | V | 1200 | 0.76 | 958 | 4.8 | 31.0 |
| 89 | W | 1210 | 0.71 | 917 | 2.3 | 27.6 |
| 90 | W | 1240 | 0.26 | 964 | 3.8 | 28.5 |

| EXPERIMENTAL EXAMPLE | FIRST COOLING COOLING STOP TEMPERATURE ° C. | SECOND COOLING ELAPSED TIME UNTIL 400° C. TIME | COLD ROLLING STEP REDUCTION RATIO % | NOTE |
|---|---|---|---|---|
| 61 | 565 | 4.9 | 38 | EXAMPLE |
| 62 | 640 | 7.9 | 43 | EXAMPLE |
| 63 | 600 | 6.2 | 44 | EXAMPLE |
| 64 | 608 | 3.1 | 53 | COMPARATIVE EXAMPLE |
| 65 | 598 | 5.4 | 37 | EXAMPLE |
| 66 | 638 | 6.6 | 53 | EXAMPLE |
| 67 | 562 | 3.4 | 46 | EXAMPLE |
| 68 | 597 | 4.5 | 44 | COMPARATIVE EXAMPLE |
| 69 | 535 | 1.7 | 46 | EXAMPLE |
| 70 | 600 | 4.0 | 53 | EXAMPLE |
| 71 | 585 | 4.0 | 64 | EXAMPLE |
| 72 | 555 | 3.6 | 45 | EXAMPLE |
| 73 | 560 | 1.7 | 50 | EXAMPLE |
| 74 | 568 | 3.2 | 50 | EXAMPLE |
| 75 | 562 | 3.0 | 50 | EXAMPLE |
| 76 | 608 | 4.4 | 62 | EXAMPLE |
| 77 | 514 | 1.5 | 40 | EXAMPLE |
| 78 | 597 | 3.2 | 50 | EXAMPLE |
| 79 | 585 | 2.9 | 61 | EXAMPLE |
| 80 | 566 | 3.9 | 50 | EXAMPLE |
| 81 | 609 | 3.5 | 63 | EXAMPLE |
| 82 | 598 | 6.0 | 41 | EXAMPLE |

TABLE 6-continued

| | | | | |
|---|---|---|---|---|
| 83 | 579 | 2.4 | 56 | EXAMPLE |
| 84 | 566 | 3.6 | 53 | EXAMPLE |
| 85 | 558 | 2.8 | 71 | EXAMPLE |
| 86 | 586 | 3.0 | 53 | EXAMPLE |
| 87 | 565 | 4.3 | 42 | EXAMPLE |
| 88 | 596 | 3.1 | 43 | EXAMPLE |
| 89 | 579 | 3.6 | 58 | EXAMPLE |
| 90 | 605 | 5.3 | 65 | EXAMPLE |

TABLE 7

| EXPERIMENTAL EXAMPLE | CHEMICAL COMPONENT | HOT-ROLLING SLAB HEATING TEMPERATURE °C. | EXPRESSION I | ROLLING COMPLETION TEMPERATURE °C. | FIRST COOLING ELAPSED TIME UNTIL COOLING START SECOND | FIRST COOLING AVERAGE COOLING RATE °C./SECOND |
|---|---|---|---|---|---|---|
| 91 | W | 1255 | 0.43 | 927 | 10.9 | 30.9 |
| 92 | W | 1275 | 0.71 | 924 | 4.8 | 28.8 |
| 93 | X | 1250 | 0.28 | 916 | 3.3 | 23.8 |
| 94 | X | 1200 | 0.74 | 907 | 3.9 | 32.5 |
| 95 | X | 1205 | 0.44 | 945 | 4.9 | 41.1 |
| 96 | X | 1250 | 0.63 | 950 | 2.3 | 47.5 |
| 97 | Y | 1225 | 0.50 | 909 | 3.0 | 11.6 |
| 98 | Y | 1275 | 0.31 | 917 | 1.2 | 43.4 |
| 99 | Y | 1215 | 0.21 | 912 | 2.9 | 33.6 |
| 100 | Y | 1230 | 0.34 | 924 | 4.8 | 38.6 |
| 101 | Z | 1215 | 0.43 | 923 | 3.1 | 43.1 |
| 102 | Z | 1215 | 0.59 | 945 | 3.5 | 30.5 |
| 103 | Z | 1200 | 0.43 | 919 | 2.0 | 45.7 |
| 104 | Z | 1230 | 0.61 | 926 | 2.0 | 29.5 |
| 105 | AA | 1225 | 0.24 | 936 | 3.5 | 35.6 |
| 106 | AA | 1205 | 0.37 | 943 | 3.4 | 35.6 |
| 107 | AA | 1240 | 0.49 | 907 | 1.9 | 35.4 |
| 108 | AA | 1215 | 0.20 | 961 | 4.2 | 36.6 |
| 109 | AB | 1235 | 0.65 | 950 | 2.6 | 36.5 |
| 110 | AB | 1215 | 0.32 | 966 | 3.0 | 33.6 |
| 111 | AB | 1225 | 0.50 | 945 | 3.7 | 29.8 |
| 112 | AB | 1205 | 0.29 | 880 | 2.4 | 21.5 |
| 113 | AC | 1210 | 0.40 | 955 | 3.5 | 32.7 |
| 114 | AC | 1250 | 0.64 | 932 | 6.1 | 22.1 |
| 115 | AC | 1230 | 0.31 | 930 | 4.5 | 47.2 |
| 116 | AC | 1255 | 0.45 | 952 | 3.6 | 41.1 |
| 117 | AD | 1210 | 0.32 | 952 | 2.8 | 26.6 |
| 118 | AD | 1255 | 0.67 | 923 | 2.1 | 31.2 |
| 119 | AD | 1240 | 0.59 | 916 | 2.1 | 37.7 |
| 120 | AD | 1250 | 0.46 | 942 | 4.7 | 25.5 |
| 121 | AE | 1225 | 0.66 | 930 | 2.3 | 34.2 |
| 122 | AF | 1255 | 0.39 | 894 | 4.2 | 23.1 |
| 123 | AG | 1225 | 0.78 | 937 | 3.7 | 34.4 |
| 124 | AH | 1205 | 0.41 | 894 | 3.1 | 38 |
| 125 | AI | 1255 | 0.31 | 920 | 1.7 | 37 |
| 126 | AJ | TEST STOPPED DUE TO FRACTURE OF SLAB | | | | |
| 127 | AK | 1205 | 0.47 | 880 | 2.6 | 34 |
| 128 | G | 1200 | 0.18 | 894 | 3.5 | <u>4</u> |
| 129 | G | 1235 | 0.79 | 919 | 1.4 | <u>83</u> |
| 130 | G | 1245 | 0.20 | 897 | 2.4 | 33 |
| 131 | V | 1215 | 0.37 | 917 | 2.3 | 22 |
| 132 | V | 1215 | 0.36 | 913 | 3.5 | 37 |
| 133 | B | 1205 | 0.34 | 892 | 2.3 | 29 |
| 134 | B | 1240 | 0.47 | 888 | 3.5 | 25 |
| 135 | O | 1225 | 0.33 | 903 | 2.6 | 25 |
| 136 | O | 1225 | 0.39 | 914 | 3.2 | 40 |
| 137 | D | 1200 | 0.51 | 911 | 3.4 | 35 |

| EXPERIMENTAL EXAMPLE | FIRST COOLING COOLING STOP TEMPERATURE °C. | SECOND COOLING ELAPSED TIME UNTIL 400° C. TIME | COLD-ROLLING STEP REDUCTION RATIO % | NOTE |
|---|---|---|---|---|
| 91 | 580 | 3.2 | 57 | EXAMPLE |
| 92 | 590 | 2.3 | 64 | EXAMPLE |
| 93 | 589 | 3.5 | 44 | EXAMPLE |

TABLE 7-continued

| | | | | |
|---|---|---|---|---|
| 94 | 560 | 4.3 | 58 | EXAMPLE |
| 95 | 580 | 2.3 | 54 | EXAMPLE |
| 96 | 575 | 3.2 | 55 | EXAMPLE |
| 97 | 610 | 2.8 | 60 | EXAMPLE |
| 98 | 566 | 2.6 | 60 | EXAMPLE |
| 99 | 599 | 2.5 | 47 | EXAMPLE |
| 100 | 582 | 2.4 | 60 | EXAMPLE |
| 101 | 595 | 2.4 | 64 | EXAMPLE |
| 102 | 572 | 3.0 | 62 | EXAMPLE |
| 103 | 585 | 3.1 | 39 | EXAMPLE |
| 104 | 584 | 2.3 | 67 | EXAMPLE |
| 105 | 593 | 4.8 | 53 | EXAMPLE |
| 106 | 584 | 2.3 | 57 | EXAMPLE |
| 107 | 520 | 1.6 | 60 | EXAMPLE |
| 108 | 565 | 3.8 | 59 | EXAMPLE |
| 109 | 588 | 4.0 | 46 | EXAMPLE |
| 110 | 627 | 4.2 | 41 | EXAMPLE |
| 111 | 610 | 2.8 | 44 | EXAMPLE |
| 112 | 603 | 4.3 | 57 | EXAMPLE |
| 113 | 569 | 2.3 | 31 | EXAMPLE |
| 114 | 582 | 2.4 | 56 | EXAMPLE |
| 115 | 533 | 3.7 | 42 | EXAMPLE |
| 116 | 572 | 3.6 | 50 | EXAMPLE |
| 117 | 602 | 7.5 | 58 | EXAMPLE |
| 118 | 613 | 3.0 | 58 | EXAMPLE |
| 119 | 611 | 4.7 | 44 | EXAMPLE |
| 120 | 601 | 3.6 | 39 | EXAMPLE |
| 121 | 597 | 2.8 | 56 | COMPARATIVE EXAMPLE |
| 122 | 587 | 3.0 | 45 | COMPARATIVE EXAMPLE |
| 123 | 563 | 2.5 | 50 | COMPARATIVE EXAMPLE |
| 124 | 608 | 2.6 | — | COMPARATIVE EXAMPLE |
| 125 | 589 | 3.5 | 73 | COMPARATIVE EXAMPLE |
| 126 | TEST STOPPED DUE TO FRACTURE OF SLAB | | | COMPARATIVE EXAMPLE |
| 127 | 600 | 2.3 | 40 | COMPARATIVE EXAMPLE |
| 128 | 618 | 3.8 | 40 | COMPARATIVE EXAMPLE |
| 129 | 592 | 3.3 | 53 | COMPARATIVE EXAMPLE |
| 130 | 613 | 3.9 | 40 | COMPARATIVE EXAMPLE |
| 131 | 612 | 3.6 | 60 | COMPARATIVE EXAMPLE |
| 132 | 606 | 3.5 | 67 | COMPARATIVE EXAMPLE |
| 133 | 582 | 2.9 | 50 | COMPARATIVE EXAMPLE |
| 134 | 599 | 4.1 | 50 | COMPARATIVE EXAMPLE |
| 135 | 597 | 2.8 | 47 | COMPARATIVE EXAMPLE |
| 136 | 583 | 3.7 | 60 | COMPARATIVE EXAMPLE |
| 137 | 605 | 2.8 | 53 | COMPARATIVE EXAMPLE |

Next, the annealing step to the plating step are performed under each of conditions illustrated in Tables 8 to 14 by using the continuous annealing plating line having the preheating zone, the reduction zone, and the plating zone.

Note that in each of examples 2, 26, 38, 98 and 114, the bainite transformation process is performed during a period after the steel sheet is immersed into the plating bath until it is cooled to the room temperature. On the other hand, in each of examples 10, 22, 42, 102 and 107, the bainite transformation process is performed during a period after the steel sheet is immersed into the plating bath and the alloying treatment is performed until it is cooled to the room temperature. In examples other than the above, the bainite transformation process is performed after the first cooling step and before the steel sheet is immersed into the plating bath.

Besides, a third cooling step described in Table is a cooling step within a range of 740 to a 500° C., the bainite transformation process is a process retaining the steel sheet at a temperature within a range of 300 to 470° C. after it is immersed into the plating bath, and a fourth cooling step is a step cooling to a temperature range of 150° C. or less in the cooling process after the retention.

After plating step, the reheating process (tempering step) is performed for a part of the steel sheets with the aim of tempering the martensite, further the temper rolling is performed with each of the reduction ratios illustrated in Tables 8 to 14 for a part of the steel sheets.

Note that a steel type GI illustrated in each of Tables 8 to 14 represents a hot-dip galvanized steel sheet in which hot-dip galvanizing is performed for the steel sheet surface, a steel type GA represents an alloyed hot-dip galvanized steel sheet in which the alloying treatment is performed after the hot-dip galvanizing is performed.

Note that $Ac_3$ an each of Tables 8 to 14 is calculated based on the following empirical formula.

$$Ac_3\,[°C.] = 910 - 203\sqrt{C} + 44.7Si - 30Mn + 200Al - 20Ni - 10Cr$$

TABLE 8

| | | | CONTINUOUS ANNEALING PLATING | | | | | | |
|---|---|---|---|---|---|---|---|---|---|
| | | | HEATING STEP | | | | THIRD COOLING STEP | BAINITE TRANSFORMATION | FOURTH COOLING | TEMPERING |
| EXPERIMENTAL EXAMPLE | CHEMICAL COMPONENT | STEEL TYPE | HEATING RATE AT 600° C. TO 750° C. ° C./ SECOND | HEATING TEMPERATURE ° C. | Ac3 ° C. | HEATING TEMPERATURE − Ac3 ° C. | COOLING RATE AT 740° C. TO 500° C. ° C./ SECOND | PROCESS RETENTION TIME AT 300° C. TO 470° C. SECOND | STEP COOLING RATE ° C./ SECOND | STEP TEMPERING TEMPERATURE ° C. |
| 1 | A | GI | 5.3 | 790 | 815 | −25 | 4.3 | 217.8 | 2.1 | — |
| 2 | A | GI | 5.9 | 803 | 815 | −12 | 1.8 | 37.7 | 3.2 | — |
| 3 | A | GA | 4.7 | 827 | 815 | 12 | 32.9 | 55.8 | 2.6 | — |
| 4 | A | GI | 3.8 | 821 | 815 | 6 | 1.6 | 36.4 | 3.1 | — |
| 5 | B | GI | 2.6 | 813 | 841 | −28 | 3.2 | 38.6 | 2.2 | — |
| 6 | B | GA | 3.9 | 871 | 841 | 30 | 15.5 | 48.3 | 2.7 | — |
| 7 | B | GA | 5.1 | 874 | 841 | 33 | 6.4 | 56.9 | 3.3 | — |
| 8 | B | GI | 6.0 | 831 | 841 | −10 | 2.6 | 26.1 | 5.3 | — |
| 9 | C | GI | 4.7 | 766 | 790 | −24 | 5.3 | 24.6 | 3.1 | — |
| 10 | C | GA | 3.8 | 805 | 790 | 15 | 3.2 | 28.7 | 1.9 | — |
| 11 | C | GA | 3.9 | 785 | 790 | −5 | 18.5 | 87.6 | 3.5 | 360 |
| 12 | C | GI | 4.0 | 775 | 790 | −15 | 24.4 | 29.9 | 3.6 | — |
| 13 | D | GI | 1.2 | 827 | 823 | 4 | 5.0 | 110.4 | 4.8 | — |
| 14 | D | GA | 2.9 | 815 | 823 | −8 | 41.7 | 30.3 | 3.9 | 390 |
| 15 | D | GA | 4.0 | 819 | 823 | −4 | 4.2 | 47.5 | 2.5 | — |
| 16 | D | GI | 5.2 | 857 | 823 | 34 | 41.8 | 48.6 | 4.2 | — |
| 17 | E | GI | 5.0 | 892 | 926 | −34 | 2.6 | 27.4 | 6.3 | — |
| 18 | E | GI | 2.3 | 924 | 926 | −2 | 11.7 | 25.8 | 4.1 | — |
| 19 | E | GA | 2.8 | 943 | 926 | 17 | 5.7 | 37.9 | 4.1 | — |
| 20 | E | GI | 2.7 | 934 | 926 | 8 | 21.6 | 28.8 | 3.6 | — |
| 21 | F | GI | 2.7 | 829 | 836 | −7 | 2.7 | 130.3 | 2.4 | — |

| | | CONTINUOUS ANNEALING PLATING | | | | | | |
|---|---|---|---|---|---|---|---|---|
| | | | | PLATING ZONE | | | | |
| | COLD-ROLLING | PRE-HEATING ZONE | REDUCTION ZONE | EFFECTIVE Al AMOUNT | PLATING BATH | ENTERING TEMPERATURE OF | ALLOYING FURNACE | |
| EXPERIMENTAL EXAMPLE | REDUCTION RATIO % | AIR RATIO | $P(H_2O)/P(H_2)$ | MASS % | TEMPERATURE ° C. | STEEL SHEET ° C. | ALLOYING TEMPERATURE ° C. | TREATMENT TIME SECOND | STEEL TYPE |
| 1 | — | 1.0 | 0.058 | 0.10 | 468 | 473 | — | — | EXAMPLE |
| 2 | — | 1.0 | 0.208 | 0.07 | 463 | 458 | — | — | EXAMPLE |
| 3 | 0.20 | 1.0 | 0.125 | 0.08 | 462 | 453 | 523 | 20 | EXAMPLE |
| 4 | — | 1.2 | 0.057 | 0.09 | 454 | 462 | — | — | EXAMPLE |
| 5 | — | 1.0 | 0.054 | 0.10 | 461 | 466 | — | — | EXAMPLE |
| 6 | 0.20 | 0.9 | 0.083 | 0.08 | 454 | 472 | 500 | 14 | EXAMPLE |
| 7 | 0.20 | 1.1 | 0.109 | 0.11 | 457 | 477 | 495 | 18 | EXAMPLE |
| 8 | — | 1.0 | 0.063 | 0.12 | 459 | 455 | — | — | EXAMPLE |
| 9 | — | 1.2 | 0.389 | 0.10 | 458 | 458 | — | — | EXAMPLE |
| 10 | — | 1.2 | 0.011 | 0.09 | 465 | 476 | 498 | 21 | EXAMPLE |
| 11 | — | 0.7 | 0.019 | 0.10 | 454 | 449 | 551 | 4 | EXAMPLE |
| 12 | — | 1.1 | 0.042 | 0.09 | 460 | 465 | — | — | EXAMPLE |
| 13 | — | 1.1 | 0.014 | 0.08 | 463 | 454 | — | — | EXAMPLE |
| 14 | — | 0.9 | 0.048 | 0.09 | 451 | 480 | 576 | 12 | EXAMPLE |
| 15 | — | 0.7 | 0.028 | 0.09 | 454 | 446 | 504 | 16 | EXAMPLE |
| 16 | — | 0.9 | 0.371 | 0.09 | 462 | 452 | — | — | COMPARATIVE EXAMPLE |
| 17 | — | 0.7 | 0.056 | 0.11 | 461 | 459 | — | — | EXAMPLE |
| 18 | — | 0.7 | 0.021 | 0.09 | 460 | 448 | — | — | EXAMPLE |
| 19 | — | 0.9 | 0.562 | 0.11 | 459 | 448 | 551 | 23 | EXAMPLE |
| 20 | — | 0.9 | 0.064 | 0.12 | 464 | 456 | — | — | COMPARATIVE EXAMPLE |
| 21 | — | 0.9 | 0.036 | 0.11 | 464 | 440 | — | — | EXAMPLE |

TABLE 9

| | | | CONTINUOUS ANNEALING PLATING | | | | | | |
|---|---|---|---|---|---|---|---|---|---|
| | | | HEATING STEP | | | | THIRD COOLING STEP | BAINITE TRANSFORMATION | FOURTH COOLING STEP | TEMPERING STEP |
| EXPERIMENTAL EXAMPLE | CHEMICAL COMPONENT | STEEL TYPE | HEATING RATE AT 600° C. TO 750° C. ° C./SECOND | HEATING TEMPERATURE ° C. | Ac3 ° C. | HEATING TEMPERATURE − Ac3 ° C. | COOLING RATE AT 740° C. TO 500° C. ° C./SECOND | PROCESS RETENTION TIME AT 300° C. TO 470° C. SECOND | COOLING RATE ° C./SECOND | TEMPERING TEMPERATURE ° C. |
| 22 | F | GA | 12.3 | 789 | 836 | −47 | 44.8 | 207.6 | 2.2 | — |
| 23 | F | GA | 4.2 | 858 | 836 | 22 | 4.5 | 169.0 | 4.4 | — |
| 24 | F | GI | 6.5 | 818 | 836 | −18 | 23.2 | 31.1 | 4.6 | — |
| 25 | G | GI | 4.3 | 813 | 790 | 23 | 42.2 | 29.1 | 2.9 | 325 |
| 26 | G | GI | 4.4 | 761 | 790 | −29 | 1.8 | 367.1 | 5.2 | — |
| 27 | G | GA | 6.3 | 762 | 790 | −28 | 7.7 | 26.5 | 1.7 | — |
| 28 | G | GI | 3.7 | 785 | 790 | −5 | 4.5 | 30.2 | 2.5 | — |
| 29 | H | GI | 3.9 | 888 | 903 | −15 | 6.4 | 29.4 | 4.3 | — |
| 30 | H | GA | 3.3 | 881 | 903 | −22 | 25.6 | 58.1 | 3.4 | — |
| 31 | H | GA | 5.0 | 875 | 903 | −28 | 2.0 | 28.8 | 1.6 | — |
| 32 | H | GI | 5.7 | 907 | 903 | 4 | 35.2 | 27.7 | 4.2 | — |
| 33 | I | GI | 5.5 | 965 | 949 | 16 | 2.1 | 235.8 | 2.8 | — |
| 34 | I | GI | 2.9 | 936 | 949 | −13 | 4.7 | 47.4 | 4.2 | — |
| 35 | I | GA | 4.6 | 971 | 949 | 22 | 15.7 | 57.6 | 4.4 | — |
| 36 | I | GI | 6.4 | 949 | 949 | 0 | 4.5 | 29.5 | 4.5 | — |
| 37 | J | GI | 5.1 | 760 | 795 | −35 | 38.2 | 55.5 | 5.3 | — |
| 38 | J | GI | 5.4 | 823 | 795 | 28 | 8.9 | 27.3 | 3.4 | — |
| 39 | J | GA | 4.4 | 790 | 795 | −5 | 13.8 | 268.9 | 4.1 | — |
| 40 | J | GI | 6.7 | 791 | 795 | −1 | 6.8 | 137.9 | 6.3 | — |
| 41 | K | GI | 4.0 | 839 | 825 | 14 | 1.3 | 29.6 | 1.8 | — |
| 42 | K | GA | 4.7 | 810 | 825 | −15 | 7.8 | 267.9 | 2.0 | — |

| | | | CONTINUOUS ANNEALING PLATING | | | | | | |
|---|---|---|---|---|---|---|---|---|---|
| | | | | PLATING ZONE | | | | | |
| | COLD-ROLLING | PRE-HEATING ZONE AIR RATIO | REDUCTION ZONE P(H$_2$O)/P(H$_2$) | EFFECTIVE Al AMOUNT MASS % | PLATING BATH TEMPERATURE ° C. | ENTERING TEMPERATURE OF STEEL SHEET ° C. | ALLOYING FURNACE | | |
| EXPERIMENTAL EXAMPLE | REDUCTION RATIO % | | | | | | ALLOYING TEMPERATURE ° C. | TREATMENT TIME SECOND | STEEL TYPE |
| 22 | — | 0.7 | 0.323 | 0.10 | 456 | 443 | 481 | 22 | EXAMPLE |
| 23 | — | 1.0 | 0.025 | 0.10 | 457 | 471 | 515 | 17 | EXAMPLE |
| 24 | — | 1.0 | 0.295 | 0.10 | 459 | 457 | — | — | COMPARATIVE EXAMPLE |
| 25 | — | 0.8 | 0.181 | 0.08 | 463 | 443 | — | — | EXAMPLE |
| 26 | — | 1.0 | 0.501 | 0.10 | 455 | 471 | — | — | EXAMPLE |
| 27 | — | 0.9 | 0.004 | 0.10 | 458 | 480 | 496 | 20 | EXAMPLE |
| 28 | — | 0.9 | 0.064 | 0.10 | 458 | 466 | — | — | COMPARATIVE EXAMPLE |
| 29 | — | 1.0 | 0.007 | 0.17 | 459 | 469 | — | — | EXAMPLE |
| 30 | — | 0.8 | 0.0004 | 0.08 | 461 | 475 | 584 | 21 | EXAMPLE |
| 31 | — | 1.1 | 0.043 | 0.09 | 460 | 446 | 503 | 13 | EXAMPLE |
| 32 | — | 1.0 | 0.029 | 0.09 | 456 | 455 | — | — | COMPARATIVE EXAMPLE |
| 33 | — | 1.1 | 0.028 | 0.10 | 461 | 471 | — | — | EXAMPLE |
| 34 | — | 0.7 | 0.190 | 0.09 | 458 | 458 | — | — | EXAMPLE |
| 35 | 0.50 | 1.0 | 0.052 | 0.09 | 462 | 469 | 542 | 15 | EXAMPLE |
| 36 | — | 0.7 | 0.045 | 0.10 | 464 | 464 | — | — | COMPARATIVE EXAMPLE |
| 37 | — | 1.0 | 0.457 | 0.10 | 460 | 446 | — | — | EXAMPLE |
| 38 | — | 1.0 | 0.013 | 0.08 | 458 | 459 | — | — | EXAMPLE |
| 39 | — | 1.0 | 0.046 | 0.10 | 463 | 463 | 512 | 43 | EXAMPLE |
| 40 | — | 0.9 | 0.013 | 0.11 | 467 | 459 | — | — | COMPARATIVE EXAMPLE |
| 41 | — | 1.0 | 0.047 | 0.13 | 453 | 473 | — | — | EXAMPLE |
| 42 | — | 0.7 | 0.003 | 0.10 | 458 | 461 | 485 | 34 | EXAMPLE |

TABLE 10

| EXPERI-MENTAL EXAMPLE | CHEMICAL COMPONENT | STEEL TYPE | CONTINUOUS ANNEALING PLATING ||||||||
|---|---|---|---|---|---|---|---|---|---|---|
| | | | HEATING STEP |||| THIRD COOLING STEP | BAINITE TRANSFORMATION | FOURTH COOLING | TEMPERING |
| | | | HEATING RATE AT 600° C./ TO 750° C. ° C./ SECOND | HEATING TEMPERATURE ° C. | Ac3 ° C. | HEATING TEMPERATURE − Ac3 ° C. | COOLING RATE AT 740° C. TO 500° C. ° C./ SECOND | PROCESS RETENTION TIME AT 300° C. TO 470° C. SECOND | STEP COOLING RATE ° C./ SECOND | STEP TEMPERING TEMPERATURE ° C. |
| 43 | K | GA | 1.2 | 839 | 825 | 14 | 38.1 | 108.2 | 3.6 | 410 |
| 44 | K | GI | 2.8 | 791 | 825 | −34 | 41.3 | 25.9 | 2.2 | — |
| 45 | L | GI | 4.8 | 899 | 891 | 8 | 16.7 | 57.5 | 5.3 | — |
| 46 | L | GI | 5.1 | 883 | 891 | −8 | 4.8 | 29.2 | 4.3 | — |
| 47 | L | GA | 5.5 | 897 | 891 | 6 | 4.4 | 319.5 | 2.5 | — |
| 48 | L | | TEST STOPPED DUE TO FRACTURE OF STEEL SHEET IN COLD-ROLLING STEP |||||||| |
| 49 | M | GI | 2.7 | 901 | 872 | 29 | 15.4 | 27.0 | 2.8 | — |
| 50 | M | GA | 4.5 | 859 | 872 | −13 | 1.9 | 219.5 | 2.4 | — |
| 51 | M | GA | 1.7 | 885 | 872 | 13 | 20.7 | 26.8 | 1.6 | — |
| 52 | M | GI | 3.8 | 750 | 872 | −122 | 2.8 | 28.6 | 1.7 | — |
| 53 | N | GI | 4.6 | 863 | 875 | −12 | 24.5 | 130.0 | 5.3 | 395 |
| 54 | N | GA | 1.6 | 870 | 875 | −5 | 4.3 | 26.7 | 4.6 | — |
| 55 | N | GA | 2.4 | 853 | 875 | −22 | 17.8 | 56.6 | 1.7 | — |
| 56 | N | GI | 1.5 | 868 | 875 | −7 | 4.6 | 1150 | 2.3 | — |
| 57 | O | GI | 2.6 | 806 | 801 | 5 | 2.8 | 55.0 | 4.1 | — |
| 58 | O | GA | 7.5 | 789 | 801 | −12 | 10.1 | 30.7 | 3.5 | — |
| 59 | O | GA | 4.0 | 822 | 801 | 21 | 6.4 | 188.7 | 2.6 | — |
| 60 | O | GI | 3.5 | 822 | 801 | 21 | 17.6 | 5.0 | 4.0 | — |
| 61 | P | GI | 6.1 | 795 | 817 | −22 | 23.5 | 106.6 | 4.0 | — |
| 62 | P | GI | 4.0 | 799 | 817 | −18 | 41.9 | 37.9 | 4.0 | — |
| 63 | P | GA | 1.4 | 804 | 817 | −13 | 7.1 | 29.7 | 2.6 | — |

| EXPERI-MENTAL EXAMPLE | COLD-ROLLING REDUCTION RATIO % | CONTINUOUS ANNEALING PLATING |||||| STEEL TYPE |
|---|---|---|---|---|---|---|---|---|
| | | PRE-HEATING ZONE AIR RATIO | PLATING ZONE ||| ALLOYING FURNACE || |
| | | | REDUCTION ZONE P(H₂O)/P(H₂) | EFFECTIVE Al AMOUNT MASS % | PLATING BATH TEMPERATURE ° C. | ENTERING TEMPERATURE OF STEEL SHEET ° C. | ALLOYING TEMPERATURE ° C. | TREATMENT TIME SECOND | |
| 43 | — | 1.0 | 0.897 | 0.10 | 462 | 454 | 530 | 14 | EXAMPLE |
| 44 | — | 1.0 | 0.025 | 0.10 | 458 | 471 | — | — | COMPARATIVE EXAMPLE |
| 45 | — | 0.9 | 0.093 | 0.10 | 465 | 477 | — | — | EXAMPLE |
| 46 | — | 1.0 | 0.008 | 0.08 | 456 | 463 | — | — | EXAMPLE |
| 47 | — | 0.9 | 0.001 | 0.12 | 464 | 452 | 491 | 20 | EXAMPLE |
| 48 | TEST STOPPED DUE TO FRACTURE OF STEEL SHEET IN COLD-ROLLING STEP |||||||| COMPARATIVE EXAMPLE |
| 49 | — | 0.9 | 0.008 | 0.09 | 454 | 475 | — | — | EXAMPLE |
| 50 | — | 1.2 | 0.123 | 0.07 | 464 | 449 | 489 | 21 | EXAMPLE |
| 51 | — | 0.9 | 0.030 | 0.08 | 467 | 458 | 535 | 7 | EXAMPLE |
| 52 | — | 0.8 | 0.080 | 0.09 | 455 | 474 | — | — | COMPARATIVE EXAMPLE |
| 53 | — | 0.8 | 0.151 | 0.04 | 454 | 474 | — | — | EXAMPLE |
| 54 | — | 0.8 | 0.005 | 0.10 | 454 | 475 | 538 | 12 | EXAMPLE |
| 55 | — | 0.9 | 0.134 | 0.08 | 455 | 462 | 505 | 38 | EXAMPLE |
| 56 | — | 1.1 | 0.251 | 0.12 | 462 | 471 | — | — | COMPARATIVE EXAMPLE |
| 57 | — | 1.2 | 0.025 | 0.09 | 454 | 441 | — | — | EXAMPLE |
| 58 | — | 0.8 | 0.112 | 0.10 | 465 | 447 | 528 | 111 | EXAMPLE |
| 59 | — | 0.8 | 0.014 | 0.12 | 467 | 460 | 495 | 15 | EXAMPLE |
| 60 | — | 0.8 | 0.081 | 0.11 | 455 | 454 | — | — | COMPARATIVE EXAMPLE |
| 61 | — | 0.8 | 0.067 | 0.10 | 461 | 456 | — | — | EXAMPLE |
| 62 | — | 0.8 | 1.520 | 0.09 | 461 | 449 | — | — | EXAMPLE |
| 63 | — | 1.0 | 0.204 | 0.10 | 456 | 463 | 508 | 24 | EXAMPLE |

TABLE 11

| | | | CONTINUOUS ANNEALING PLATING | | | | | | | |
|---|---|---|---|---|---|---|---|---|---|---|
| | | | HEATING STEP | | | | THIRD COOLING STEP | BAINITE TRANSFORMATION | FOURTH COOLING | TEMPERING |
| EXPERIMENTAL EXAMPLE | CHEMICAL COMPONENT | STEEL TYPE | HEATING RATE AT 600° C./ TO 750° C. ° C./ SECOND | HEATING TEMPERATURE ° C. | Ac3 ° C. | HEATING TEMPERATURE – Ac3 ° C. | COOLING RATE AT 740° C. TO 500° C. ° C./ SECOND | PROCESS RETENTION TIME AT 300° C. TO 470° C. SECOND | STEP COOLING RATE ° C./ SECOND | STEP TEMPERING TEMPERATURE ° C. |
| 64 | P | GI | 4.2 | 787 | 817 | −30 | 18.8 | 26.7 | 3.9 | — |
| 65 | Q | GI | 2.4 | 961 | 993 | −32 | 23.9 | 28.4 | 4.7 | — |
| 66 | Q | GI | 1.5 | 974 | 993 | −19 | 8.7 | 26.4 | 2.5 | — |
| 67 | Q | GA | 4.5 | 947 | 993 | −46 | 6.2 | 28.4 | 5.1 | — |
| 68 | Q | GI | 3.5 | 962 | 993 | −31 | 12.4 | 106.0 | 4.7 | — |
| 69 | R | GI | 5.3 | 900 | 874 | 26 | 7.1 | 36.1 | 5.4 | — |
| 70 | R | GA | 3.2 | 869 | 874 | −5 | 7.3 | 267.2 | 5.3 | — |
| 71 | R | GA | 2.9 | 869 | 874 | −5 | 27.4 | 38.1 | 4.9 | — |
| 72 | R | GI | 6.2 | 903 | 874 | 29 | 28.2 | 186.9 | 4.8 | 280 |
| 73 | S | GI | 3.3 | 794 | 797 | −3 | 24.9 | 27.7 | 2.0 | — |
| 74 | S | GA | 5.7 | 809 | 797 | 12 | 6.6 | 29.9 | 3.2 | — |
| 75 | S | GA | 8.3 | 819 | 797 | 22 | 11.5 | 268.5 | 2.4 | — |
| 76 | S | GI | 2.5 | 769 | 797 | −28 | 21.9 | 51.5 | 5.0 | — |
| 77 | T | GI | 6.4 | 840 | 834 | 6 | 14 | 27.7 | 4.3 | — |
| 78 | T | GA | 1.9 | 330 | 834 | −4 | 28.5 | 46.2 | 3.6 | — |
| 79 | T | GA | 4.2 | 834 | 834 | 0 | 3.5 | 26.2 | 2.6 | — |
| 80 | T | GI | 4.4 | 823 | 834 | −11 | 16.5 | 137.1 | 2.0 | — |
| 81 | U | GI | 3.3 | 833 | 819 | 19 | 17.4 | 25.5 | 1.6 | — |
| 82 | U | GA | 2.7 | 829 | 819 | 10 | 3.5 | 27.3 | 3.6 | 310 |
| 83 | U | GA | 4.0 | 803 | 819 | −16 | 40.2 | 56.5 | 3.3 | — |
| 84 | U | GI | 2.4 | 822 | 819 | 3 | 33.8 | 58.0 | 3.4 | — |

| | | CONTINUOUS ANNEALING PLATING | | | | | | | |
|---|---|---|---|---|---|---|---|---|---|
| | | | | PLATING ZONE | | | | | |
| | COLD-ROLLING | PRE- | REDUCTION | EFFECTIVE Al | PLATING | ENTERING TEMPERATURE OF | ALLOYING FURNACE | | |
| EXPERIMENTAL EXAMPLE | REDUCTION RATIO % | HEATING ZONE AIR RATIO | ZONE P(H₂O)/ P(H₂) | AMOUNT MASS % | BATH TEMPERATURE ° C. | STEEL SHEET ° C. | ALLOYING TEMPERATURE ° C. | TREATMENT TIME SECOND | STEEL TYPE |
| 64 | — | 1.2 | 0.050 | 0.09 | 480 | 484 | — | — | COMPARATIVE EXAMPLE |
| 65 | — | 1.0 | 0.020 | 0.09 | 454 | 470 | — | — | EXAMPLE |
| 66 | — | 1.2 | 0.173 | 0.08 | 469 | 480 | — | — | EXAMPLE |
| 67 | — | 1.1 | 0.013 | 0.09 | 454 | 439 | 539 | 21 | EXAMPLE |
| 68 | — | 1.0 | 0.052 | 0.11 | 457 | 476 | — | — | COMPARATIVE EXAMPLE |
| 69 | 0.45 | 0.9 | 0.031 | 0.11 | 456 | 472 | — | — | EXAMPLE |
| 70 | — | 1.0 | 0.011 | 0.08 | 458 | 487 | 610 | 4 | EXAMPLE |
| 71 | — | 1.0 | 0.046 | 0.09 | 463 | 458 | 500 | 35 | EXAMPLE |
| 72 | — | 0.8 | 0.100 | 0.10 | 463 | 454 | — | — | EXAMPLE |
| 73 | — | 0.9 | 0.035 | 0.08 | 467 | 445 | — | — | EXAMPLE |
| 74 | — | 1.0 | 1.12 | 0.09 | 465 | 472 | 511 | 24 | EXAMPLE |
| 75 | — | 1.2 | 0.006 | 0.09 | 465 | 457 | 526 | 10 | EXAMPLE |
| 76 | — | 0.7 | 0.501 | 0.09 | 464 | 455 | — | — | EXAMPLE |
| 77 | — | 0.9 | 0.011 | 0.07 | 457 | 487 | — | — | EXAMPLE |
| 78 | — | 1.2 | 0.301 | 0.09 | 455 | 448 | 590 | 24 | EXAMPLE |
| 79 | — | 1.1 | 0.066 | 0.07 | 464 | 476 | 562 | 21 | EXAMPLE |
| 80 | — | 1.1 | 0.014 | 0.09 | 459 | 452 | — | — | EXAMPLE |
| 81 | — | 1.0 | 0.007 | 0.08 | 462 | 456 | — | — | EXAMPLE |
| 82 | — | 1.1 | 0.081 | 0.08 | 462 | 448 | 507 | 25 | EXAMPLE |
| 83 | — | 1.0 | 0.015 | 0.11 | 455 | 480 | 535 | 20 | EXAMPLE |
| 84 | — | 0.8 | 0.050 | 0.10 | 456 | 477 | — | — | EXAMPLE |

TABLE 12

| | | | CONTINUOUS ANNEALING PLATING | | | | | | |
|---|---|---|---|---|---|---|---|---|---|
| | | | HEATING STEP | | | | THIRD COOLING STEP | BAINITE TRANSFORMATION | FOURTH COOLING | TEMPERING |
| EXPERIMENTAL EXAMPLE | CHEMICAL COMPONENT | STEEL TYPE | HEATING RATE AT 600° C./ TO 750° C. ° C./ SECOND | HEATING TEMPERATURE ° C. | Ac3 ° C. | HEATING TEMPERATURE − Ac3 ° C. | COOLING RATE AT 740° C. TO 500° C. ° C./ SECOND | PROCESS RETENTION TIME AT 300° C. TO 470° C. SECOND | STEP COOLING RATE ° C./ SECOND | STEP TEMPERING TEMPERATURE ° C. |
| 85 | V | GI | 4.3 | 808 | 819 | −11 | 37.0 | 26.5 | 1.9 | — |
| 86 | V | GI | 4.0 | 795 | 819 | −24 | 1.6 | 28.5 | 2.9 | — |
| 87 | V | GA | 2.1 | 787 | 819 | −32 | 3.7 | 57.0 | 2.9 | — |
| 88 | V | GI | 2.1 | 815 | 819 | −4 | 13.8 | 26.3 | 4.7 | — |
| 89 | W | GI | 3.0 | 924 | 925 | −1 | 2.3 | 190.3 | 4.2 | — |
| 90 | W | GI | 2.8 | 917 | 925 | −8 | 8.2 | 26.3 | 3.5 | — |
| 91 | W | GA | 2.7 | 923 | 925 | −2 | 4.2 | 28.7 | 4.4 | — |
| 92 | W | GI | 4.6 | 909 | 925 | −16 | 6.6 | 285.9 | 3.1 | — |
| 93 | X | GI | 3.7 | 916 | 915 | 1 | 40.4 | 230.1 | 4.8 | — |
| 94 | X | GI | 6.6 | 910 | 915 | −5 | 3.1 | 30.3 | 2.5 | — |
| 95 | X | GA | 4.0 | 944 | 915 | 29 | 6.2 | 28.7 | 2.4 | — |
| 96 | X | GI | 4.3 | 900 | 915 | −15 | 54.7 | 27.1 | 2.5 | — |
| 97 | Y | GI | 3.5 | 856 | 869 | −13 | 3.8 | 126.2 | 3.1 | — |
| 98 | Y | GI | 4.9 | 895 | 869 | 26 | 3.3 | 28.6 | 4.5 | — |
| 99 | Y | GA | 4.5 | 848 | 869 | −21 | 38.5 | 29.3 | 4.4 | — |
| 100 | Y | GI | 4.0 | 863 | 869 | −6 | 16.1 | 107.4 | 4.7 | — |
| 101 | Z | GI | 2.4 | 753 | 784 | −31 | 11.5 | 29.6 | 3.0 | — |
| 102 | Z | GA | 2.0 | 771 | 784 | −13 | 50.5 | 190.0 | 4.6 | — |
| 103 | Z | GA | 4.5 | 788 | 784 | 4 | 3.0 | 30.8 | 5.0 | — |
| 104 | Z | GI | 4.8 | 775 | 784 | −9 | 15.8 | 57.0 | 3.2 | — |
| 105 | AA | GI | 6.7 | 798 | 800 | −2 | 25.4 | 226.6 | 3.0 | — |

| | | CONTINUOUS ANNEALING PLATING | | | | | | | |
|---|---|---|---|---|---|---|---|---|---|
| | | | PLATING ZONE | | | | | | |
| | COLD-ROLLING | PRE-HEATING | REDUCTION | EFFECTIVE Al | PLATING | ENTERING TEMPERATURE OF | ALLOYING FURNACE | | |
| EXPERIMENTAL EXAMPLE | REDUCTION RATIO % | ZONE AIR RATIO | ZONE P(H₂O)/ P(H₂) | AMOUNT MASS % | BATH TEMPERATURE ° C. | STEEL SHEET ° C. | ALLOYING TEMPERATURE ° C. | TREATMENT TIME SECOND | STEEL TYPE |
| 85 | — | 1.2 | 0.067 | 0.10 | 462 | 443 | — | — | EXAMPLE |
| 86 | — | 1.2 | 0.091 | 0.09 | 466 | 466 | — | — | EXAMPLE |
| 87 | — | 0.8 | 0.015 | 0.09 | 453 | 470 | 511 | 21 | EXAMPLE |
| 88 | — | 1.0 | 0.112 | 0.10 | 458 | 478 | — | — | EXAMPLE |
| 89 | — | 0.9 | 0.269 | 0.11 | 451 | 465 | — | — | EXAMPLE |
| 90 | — | 1.1 | 0.019 | 0.07 | 458 | 472 | — | — | EXAMPLE |
| 91 | — | 0.8 | 0.177 | 0.10 | 458 | 462 | 510 | 67 | EXAMPLE |
| 92 | — | 0.9 | 0.057 | 0.08 | 457 | 471 | — | — | EXAMPLE |
| 93 | — | 0.9 | 0.041 | 0.11 | 460 | 440 | — | — | EXAMPLE |
| 94 | — | 1.2 | 0.083 | 0.10 | 458 | 460 | — | — | EXAMPLE |
| 95 | — | 0.9 | 0.013 | 0.08 | 453 | 467 | 485 | 13 | EXAMPLE |
| 96 | — | 0.8 | 0.061 | 0.08 | 458 | 460 | — | — | EXAMPLE |
| 97 | — | 1.0 | 0.060 | 0.08 | 465 | 469 | — | — | EXAMPLE |
| 98 | — | 1.0 | 0.023 | 0.08 | 461 | 467 | — | — | EXAMPLE |
| 99 | — | 0.8 | 0.051 | 0.10 | 452 | 444 | 492 | 16 | EXAMPLE |
| 100 | — | 1.1 | 0.007 | 0.10 | 460 | 456 | — | — | EXAMPLE |
| 101 | — | 0.8 | 0.033 | 0.09 | 462 | 471 | — | — | EXAMPLE |
| 102 | — | 0.8 | 0.004 | 0.07 | 463 | 461 | 606 | 23 | EXAMPLE |
| 103 | — | 0.8 | 0.087 | 0.12 | 462 | 465 | 535 | 23 | EXAMPLE |
| 104 | — | 1.0 | 0.028 | 0.10 | 464 | 478 | — | — | EXAMPLE |
| 105 | — | 0.8 | 0.058 | 0.08 | 458 | 446 | — | — | EXAMPLE |

TABLE 13

| EXPERIMENTAL EXAMPLE | CHEMICAL COMPONENT | STEEL TYPE | HEATING STEP - HEATING RATE AT 600° C. TO 750° C. ° C./SECOND | HEATING STEP - HEATING TEMPERATURE ° C. | HEATING STEP - Ac3 ° C. | HEATING STEP - HEATING TEMPERATURE − Ac3 ° C. | THIRD COOLING STEP - COOLING RATE AT 740° C. TO 500° C. ° C./SECOND | BAINITE TRANSFORMATION - PROCESS RETENTION TIME AT 300° C. TO 470° C. SECOND | FOURTH COOLING STEP - COOLING RATE ° C./SECOND | TEMPERING STEP - TEMPERING TEMPERATURE ° C. |
|---|---|---|---|---|---|---|---|---|---|---|
| 106 | AA | GA | 3.3 | 805 | 800 | 5 | 2.9 | 35.8 | 2.8 | — |
| 107 | AA | GA | 1.9 | 819 | 800 | 19 | 33.4 | 104.9 | 4.1 | 425 |
| 108 | AA | GI | 2.6 | 820 | 800 | 20 | 5.4 | 25.6 | 2.4 | — |
| 109 | AB | GI | 6.2 | 827 | 842 | −15 | 3.4 | 25.8 | 3.8 | — |
| 110 | AB | GA | 3.0 | 856 | 842 | 14 | 8.0 | 130.7 | 4.1 | — |
| 111 | AB | GA | 4.6 | 848 | 842 | 6 | 44.3 | 233.0 | 3.9 | — |
| 112 | AB | GI | 3.9 | 864 | 842 | 22 | 14.8 | 26.6 | 4.6 | — |
| 113 | AC | GI | 2.8 | 757 | 769 | −12 | 20.0 | 25.8 | 4.3 | — |
| 114 | AC | GI | 1.9 | 772 | 769 | 3 | 8.3 | 190.4 | 4.1 | — |
| 115 | AC | GA | 2.1 | 781 | 769 | 12 | 8.5 | 29.4 | 2.0 | — |
| 116 | AC | GI | 3.5 | 801 | 769 | 32 | 23.4 | 38.1 | 4.1 | — |
| 117 | AD | GI | 4.6 | 845 | 836 | 9 | 5.1 | 24.7 | 1.7 | — |
| 118 | AD | GI | 5.6 | 820 | 836 | −15 | 5.4 | 27.6 | 2.9 | — |
| 119 | AD | GA | 4.0 | 850 | 836 | 14 | 24.5 | 25.7 | 4.5 | — |
| 120 | AD | GI | 3.4 | 851 | 836 | 15 | 12.8 | 127.0 | 1.9 | — |
| 121 | AE | GI | 3.4 | 851 | 849 | 23 | 10.8 | 29.2 | 4.7 | — |
| 122 | AF | GI | 3.7 | 785 | 769 | 16 | 16.2 | 26.4 | 4.7 | — |
| 123 | AG | GI | 3.3 | 866 | 878 | −12 | 14.4 | 29.3 | 5.4 | — |

| EXPERIMENTAL EXAMPLE | COLD-ROLLING REDUCTION RATIO % | PRE-HEATING ZONE AIR RATIO | REDUCTION ZONE P(H₂O)/P(H₂) | PLATING ZONE - EFFECTIVE Al AMOUNT MASS % | PLATING ZONE - PLATING BATH TEMPERATURE ° C. | PLATING ZONE - ENTERING TEMPERATURE OF STEEL SHEET ° C. | ALLOYING FURNACE - ALLOYING TEMPERATURE ° C. | ALLOYING FURNACE - TREATMENT TIME SECOND | STEEL TYPE |
|---|---|---|---|---|---|---|---|---|---|
| 106 | 0.80 | 0.9 | 0.114 | 0.08 | 462 | 480 | — | — | EXAMPLE |
| 107 | — | 0.9 | 0.112 | 0.08 | 460 | 455 | 532 | 12 | EXAMPLE |
| 108 | — | 1.0 | 0.014 | 0.11 | 462 | 448 | — | — | EXAMPLE |
| 109 | — | 0.8 | 0.660 | 0.10 | 466 | 477 | — | — | EXAMPLE |
| 110 | 0.30 | 0.9 | 0.042 | 0.09 | 458 | 454 | 527 | 15 | EXAMPLE |
| 111 | — | 0.8 | 0.120 | 0.09 | 464 | 454 | 529 | 12 | EXAMPLE |
| 112 | — | 1.0 | 0.208 | 0.09 | 463 | 449 | — | — | EXAMPLE |
| 113 | — | 0.9 | 0.074 | 0.12 | 458 | 463 | — | — | EXAMPLE |
| 114 | — | 0.9 | 0.104 | 0.10 | 465 | 469 | — | — | EXAMPLE |
| 115 | — | 1.0 | 0.087 | 0.11 | 458 | 477 | 501 | 10 | EXAMPLE |
| 116 | — | 0.9 | 0.288 | 0.10 | 462 | 451 | — | — | EXAMPLE |
| 117 | — | 0.8 | 0.004 | 0.11 | 465 | 458 | — | — | EXAMPLE |
| 118 | — | 0.9 | 0.512 | 0.11 | 461 | 469 | 564 | 18 | EXAMPLE |
| 119 | — | 0.9 | 0.022 | 0.09 | 466 | 459 | 506 | 10 | EXAMPLE |
| 120 | — | 0.8 | 0.084 | 0.09 | 466 | 456 | — | — | EXAMPLE |
| 121 | — | 0.8 | 0.038 | 0.09 | 460 | 467 | — | — | COMPARATIVE EXAMPLE |
| 122 | — | 0.8 | 0.040 | 0.09 | 465 | 462 | — | — | COMPARATIVE EXAMPLE |
| 123 | — | 0.8 | 0.051 | 0.10 | 464 | 479 | — | — | COMPARATIVE EXAMPLE |

TABLE 14

| | | | CONTINUOUS ANNEALING PLATING | | | | | | | |
|---|---|---|---|---|---|---|---|---|---|---|
| | | | HEATING STEP | | | | THIRD COOLING STEP | BAINITE TRANSFORMATION | FOURTH COOLING | TEMPERING |
| EXPERIMENTAL EXAMPLE | CHEMICAL COMPONENT | STEEL TYPE | HEATING RATE AT 600° C./ TO 750° C. ° C./ SECOND | HEATING TEMPERATURE ° C. | Ac3 ° C. | HEATING TEMPERATURE − Ac3 ° C. | COOLING RATE AT 740° C. TO 500° C. ° C./ SECOND | PROCESS RETENTION TIME AT 300° C. TO 470° C. SECOND | STEP COOLING RATE ° C./ SECOND | STEP TEMPERING TEMPERATURE ° C. |
| 124 | AH | — | TEST STOPPED DUE TO FRACTURE IN COLD-ROLLING STEP | | | | | | | |
| 125 | AI | GA | 3.8 | 800 | 782 | 18 | 16.1 | 33 | 3.3 | — |
| 126 | AJ | — | TEST STOPPED DUE TO SLAB FRACTURE | | | | | | | |
| 127 | AK | — | TEST STOPPED DUE TO WELD ZONE FRACTURE IN CONTINUOUS ANNEALING STEP | | | | | | | |
| 128 | G | GA | 2.3 | 771 | 790 | −19 | 5.6 | 138 | 2.6 | — |
| 129 | G | GA | 3.7 | 768 | 790 | −22 | 23.3 | 101 | 3.4 | — |
| 130 | G | GA | 35.0 | 765 | 790 | −25 | 22.6 | 143 | 2.5 | — |
| 131 | V | GA | 3.6 | 814 | 819 | −5 | 0.4 | 29 | 3.4 | — |
| 132 | V | GA | 3.6 | 829 | 819 | 10 | 16.7 | 72 | 0.1 | — |
| 133 | B | GA | 2.7 | 855 | 841 | 14 | 19.4 | 35 | 2.9 | — |
| 134 | B | GA | 3.2 | 864 | 841 | 23 | 23.2 | 30 | 2.9 | — |
| 135 | O | GA | 3.0 | 814 | 801 | 13 | 14.0 | 115 | 2.6 | — |
| 136 | O | GA | 3.9 | 824 | 801 | 23 | 22.0 | 154 | 2.4 | — |
| 137 | O | GA | 2.8 | 790 | 790 | 0 | 13.8 | 79 | 3.1 | — |

| | | CONTINUOUS ANNEALING PLATING | | | | | | |
|---|---|---|---|---|---|---|---|---|
| | | PLATING ZONE | | | | | | |
| | COLD-ROLLING | PRE-HEATING | REDUCTION | EFFECTIVE Al | PLATING | ENTERING TEMPERATURE OF | ALLOYING FURNACE | |
| EXPERIMENTAL EXAMPLE | REDUCTION RATIO % | ZONE AIR RATIO | ZONE P(H₂O)/P(H₂) | AMOUNT MASS % | BATH TEMPERATURE ° C. | STEEL SHEET ° C. | ALLOYING TEMPERATURE ° C. | TREATMENT TIME SECOND | STEEL TYPE |
| 124 | TEST STOPPED DUE TO FRACTURE IN COLD-ROLLING STEP | | | | | | | | COMPARATIVE EXAMPLE |
| 125 | — | 1.0 | 0.096 | 0.08 | 460 | 463 | 512 | 14 | COMPARATIVE EXAMPLE |
| 126 | TEST STOPPED DUE TO SLAB FRACTURE | | | | | | | | COMPARATIVE EXAMPLE |
| 127 | TEST STOPPED DUE TO WELD ZONE FRACTURE IN CONTINUOUS ANNEALING STEP | | | | | | | | COMPARATIVE EXAMPLE |
| 128 | — | 1.1 | 0.127 | 0.09 | 462 | 461 | 541 | 28 | COMPARATIVE EXAMPLE |
| 129 | — | 1.0 | 0.089 | 0.10 | 462 | 458 | 492 | 25 | COMPARATIVE EXAMPLE |
| 130 | — | 1.1 | 0.166 | 0.08 | 467 | 461 | 532 | 20 | COMPARATIVE EXAMPLE |
| 131 | — | 0.9 | 0.034 | 0.11 | 461 | 456 | 547 | 23 | COMPARATIVE EXAMPLE |
| 132 | — | 1.1 | 0.104 | 0.11 | 465 | 466 | 510 | 13 | COMPARATIVE EXAMPLE |
| 133 | — | 0.3 | 0.099 | 0.09 | 465 | 466 | 542 | 13 | COMPARATIVE EXAMPLE |
| 134 | — | 1.8 | 0.092 | 0.08 | 463 | 456 | 509 | 19 | COMPARATIVE EXAMPLE |
| 135 | — | 1.0 | 0.0000 | 0.08 | 467 | 464 | 542 | 16 | COMPARATIVE EXAMPLE |
| 136 | — | 1.1 | 2.24 | 0.10 | 461 | 468 | 526 | 21 | COMPARATIVE EXAMPLE |
| 137 | — | 0.9 | 0.041 | 0.40 | 464 | 460 | 523 | 19 | COMPARATIVE EXAMPLE |

In each of the hot-dip galvanized steel sheets (or the alloyed hot-dip galvanized steel sheets) of examples 1 to 137 obtained as stated above, a microstructure within a range from ⅛ thickness centered around a ¼ sheet thickness from a surface to ⅜ thickness centered around ¼ sheet thickness from the surface is observed, and a volume fraction is measured. Results thereof are illustrated in Tables 15 to 18.

Within a microstructure fraction, a retained austenite amount is measured by the X-ray diffraction, the others are obtained by cutting out a thicknesswise cross section in parallel to the rolling direction of the steel sheet and performing a nital etching for the cross section polished into a mirror surface and observing the cross section by using the Field Emission Scanning Electron Microscope (FE-SEM).

Besides:, a content of iron at ½ thickness of the alloyed hot-dip galvanized layer is measured by using the EDX. Results thereof are illustrated in Tables 15 to 18.

Besides, the solid-solution carbon amount in the retained austenite is found by finding a lattice constant "a" of the retained austenite by performing the X-ray diffraction test under the same condition as the measurement of the area fraction of the retained austenite, and by using the above-stated expression (2).

Besides, the X-ray random intensity ratio of the FCC iron of the retained austenite is measured by the X-ray diffraction.

An average grain diameter of the crystal grains of the retained austenite relative to the rolling direction is set as d(RD), an average grain diameter relative to the sheet width direction is found set as d(TD), and the parameter d(RD)/d(TD) made up of both is calculated. Note that the crystal grain of the retained austenite is evaluated by finishing a surface in parallel to the sheet surface at ¼ thickness into the mirror surface, performing the high-resolution crystal orientation analysis by the EBSD (Electron Bach-Scattering Diffraction) method by using the FE-SEM (Field Emission Scanning Electron Microscopy). A measurement step is set as 0.1 μm, and a region where 10 points or more each representing a diffraction pattern of the FCC iron aggregate, and whose crystal misorientation with each other is less than 10° is defined as the crystal grain of the retained austenite. As for the grain diameter, the grain diameters in the rolling direction and the sheet width direction are each measured as for 30 pieces to 300 pieces of the retained austenite crystal grains selected at random.

Besides, a decarburized layer thickness is measured by finishing the thicknesswise cross section in parallel to the rolling direction into the mirror surface, and observing by using the FE-SEM. Note that three positions or more of the decarburized layer thicknesses are measured for each one steel sheet, and an average value thereof is set as the decarburized layer thickness.

Further, a density of the oxides is calculated by finishing the thicknesswise cross section in parallel to the rolling direction into the mirror surface, counting the number of oxides by observing 7 μm for two minutes by using the FE-SEM or by using an observation area required to count up to 1000 oxides. Besides, an average grain diameter of the oxides is calculated by averaging circle equivalent diameters of 100 to 1000 oxides selected at random.

Next, an evaluation test of the bake hardenability is performed by measuring the BH amount.

At first, a JIS No. 5 test piece is manufactured from each steel sheet obtained by the above-stated manufacturing method, tensile prestrain of 2% is added, and thereafter, a heat treatment corresponding to a coating-baking is performed with a condition of 170° C.×20 min retention, and the bake hardening (BH) amount is measured. Note that the BH amount relative to the rolling direction is set as ΔBH(RD), the BH amount relative to the sheet width direction is set as ΔBH(TD), and in the present evaluation, a negative judgment is given for one whose BH amount is less than 65 MPa. Further, one in which ΔBH (RD)/ΔBH(TD) is within a range of 0.8 to 1.2 is judged to be passed.

Next, tensile test pieces based on JIS Z 2201 are obtained from the hot-dip galvanized steel sheets (or the alloyed hot-dip galvanized steel sheets) of examples 1 to 109, a tensile test is performed based on JIS Z 2241, and an yield stress, a tensile strength, and a total elongation are measured.

An external appearance of the steel sheet surface is evaluated by performing an occurrence state of unplating by a visual determination. A sign "x" is a steel sheet in which unplating with a diameter of 0.5 mm or more is observed and deviates from tolerance range in appearance, and a sign "○" is a steel sheet having a practically tolerable external appearance other than the above.

Besides, a tape is adhered at inside of a bent Portion and then the tape is peeled off after a 60° V bending test, to evaluate plating adhesiveness at a processing time when a compressive stress is applied. The plating adhesiveness is evaluated from a peeled state of the plating layer peeled off together with the tape. A sign "x" is a practically intolerable steel sheet whose peeled width is 7.0 mm or more. A sign "○" is a steel sheet having the practically tolerable plating adhesiveness other than the above.

Test results, evaluation results of the above are illustrated in Table 15 to Table 18.

Note that in Tables 1 to 18, underlined numerical values and symbols represent out of the range of the present invention. In this case, an example 124 is an example in which the content of Si is large as for the chemical component, the steel sheet is fractured in the cold-rolling step, and the test is stopped.

The alloyed hot-dip galvanized steel sheet of an example 125 is an example in which the content of Si is small, the sufficient amount of retained austenite cannot be obtained, a lot of iron-based carbides are generated during the alloying treatment of the plating layer, and therefore, the strength and the ductility are deteriorated.

An example 126 is an example in which the content of Mn is large as for the chemical component, the slab is fractured during a period after the casting is completed until it is supplied for the hot-rolling step, and the test is stopped.

An example 127 is an example in which the content of Al is large as for the chemical component, a portion preceding welded to the steel sheet is fractured in the continuous annealing step, and the test is stopped.

An example 128 is an example in which the cooling rate after the hot-rolling of the alloyed hot-dip galvanized steel sheet is small as for the average cooling rate of 10 to 60° C./second, the retained austenite after the annealing extends, and the anisotropy of the bake hardenability increases.

An example 129 is an example in which in the alloyed hot-dip galvanized steel sheet, the cooling rate after the hot-rolling is large, the texture of The retained austenite after the annealing increases, and the anisotropy of the bake hardenability increases.

An example 130 is an example in which in the alloyed hot-dip galvanized steel sheet, the heating rate at 650 to 750° C. of the heating step in the annealing step is large as for the heating rate at 650 to 750° C. of the heating step in the annealing step of 20° C./second or less, the anisotropy of the retained austenite after the annealing increases, and the anisotropy of the bake hardenability increases.

An example 131 is an example in which in the alloyed hot-dip galvanized steel sheet, the cooling rate at 740 to 500° C. of the first cooling step in the annealing step is small as for the cooling rate at 740 to 500° C. of the first cooling step in the annealing step of 1.0° C./second or acre, the ferrite fraction excessively increases, and the bake hardenability deteriorates.

An example 132 is an example in which in the alloyed hot-dip galvanized steel sheet, the cooling rate in the second cooling step in the annealing step is small as for the cooling rate in the second cooling step in the annealing step of 0.5° C./second or more, a lot of coarse carbide is generated, the retained austenite fraction is lowered, and the strength and the bake hardenability deteriorate.

An example 133 is an example in which in the alloyed hot-dip galvanized steel sheet, the air ratio at the preheating zone of the plating step is small as for the air ratio of 0.7 to 1.2 in the plating step, the thickness of the decarburized layer at the surface layer becomes insufficient, and the plating adhesiveness deteriorates.

An example 134 is an example in which in the alloyed hot-dip galvanized steel sheet, the air ratio at the preheating zone of the plating step is large, and the thickness of the decarburized layer at the surface layer becomes excessively large, and fatigue strength thereof significantly deteriorates and is practically intolerable.

An example 135 is an example in which in the alloyed hot-dip galvanized steel sheet, the atmosphere at the reduction zone in the plating step is out of the range of the present invention as for the partial pressure ratio of 0.0001 to 2.00 of the reduction zone atmosphere in the plating step (refer to, the amount of the oxides in the decarburized layer at the surface layer is small, a crack starting from an interface between the decarburized layer and the base material occurs in a plating peeling test, the external appearance deteriorates, and therefore, the plating adhesiveness is evaluated to be deteriorated.

An example 136 is an example in which in the alloyed hot-zip galvanized steel sheet, the atmosphere of the reduction zone in the plating step is out of the range of the present invention, the decarburized layer at the surface layer excessively grows, and the fatigue strength significantly deteriorates, and is practically intolerable.

An example 137 is an example in which in the alloyed hot-dip galvanized steel sheet, an effective Al concentration of the plating bath is high as for the effective Al amount of 0.01 to 0.18 wt % in the plating step, and the external appearance quality significantly deteriorates in an inspection just after the annealing step, and therefore, the subsequent microstructure observation and property evaluation test are stopped.

TABLE 15

| EXPERIMENTAL EXAMPLE | CHEMICAL COMPONENT | STEEL TYPE | MICROSTRUCTURE ||||||| RETAINED AUSTENITE ||| AVERAGE DISLOCATION DENSITY $10^{13}/m^2$ |
| --- | --- | --- | --- | --- | --- | --- | --- | --- | --- | --- | --- | --- |
| | | | STRUCTURAL FRACTION |||||| SOLID-SOLUTION CARBON AMOUNT MASS % | X-RAY INTENSITY | d(RD)/d(TD) | |
| | | | FERRITE % | BAINITE % | BAINITIC FERRITE % | MARTENSITE % | TEMPERED MARTENSITE % | RETAINED AUSTENITE % | OTHERS % | | | | |
| 1 | A | GI | 35 | 37 | 18 | 0 | 0 | 9 | 1 | 0.71 | 2.0 | 1.06 | 2.7 |
| 2 | A | GI | 36 | 28 | 32 | 3 | 0 | 7 | 0 | 0.79 | 1.7 | 1.19 | 3.1 |
| 3 | A | GA | 12 | 52 | 15 | 12 | 0 | 8 | 1 | 0.92 | 1.8 | 0.96 | 24.7 |
| 4 | A | GI | 24 | 40 | 30 | 0 | 0 | 6 | 0 | 0.78 | 1.9 | 0.90 | 3.5 |
| 5 | B | GI | 42 | 39 | 12 | 0 | 0 | 7 | 0 | 0.81 | 2.0 | 1.01 | 1.7 |
| 6 | B | GA | 14 | 57 | 15 | 5 | 0 | 8 | 1 | 0.78 | 2.5 | 0.87 | 14.2 |
| 7 | B | GA | 16 | 37 | 39 | 2 | 0 | 6 | 0 | 0.78 | 1.8 | 1.24 | 14.9 |
| 8 | B | GI | 29 | 35 | 28 | 1 | 1 | 6 | 0 | 0.76 | 2.2 | 0.77 | 1.8 |
| 9 | C | GI | 32 | 40 | 22 | 2 | 0 | 4 | 0 | 0.78 | 2.4 | 0.81 | 2.0 |
| 10 | C | GA | 21 | 32 | 38 | 0 | 0 | 7 | 1 | 0.81 | 1.6 | 1.13 | 2.7 |
| 11 | C | GA | 17 | 43 | 22 | 0 | 10 | 8 | 0 | 0.82 | 1.9 | 0.78 | 1.7 |
| 12 | D | GI | 21 | 39 | 24 | 7 | 0 | 8 | 2 | 0.91 | 1.8 | 0.87 | 18.9 |
| 13 | D | GI | 16 | 55 | 23 | 0 | 0 | 7 | 0 | 0.88 | 1.7 | 0.87 | 11.6 |
| 14 | D | GA | 17 | 20 | 22 | 0 | 34 | 8 | 2 | 0.75 | 2.2 | 1.10 | 1.9 |
| 15 | D | GI | 24 | 40 | 19 | 0 | 0 | 10 | 2 | 0.84 | 1.6 | 0.94 | 5.6 |
| 16 | D | GI | 9 | 23 | 26 | 0 | 34 | 9 | 2 | 0.77 | 4.3 | 1.61 | 22.1 |
| 17 | E | GI | 30 | 44 | 20 | 0 | 0 | 7 | 3 | 0.62 | 1.6 | 1.07 | 4.8 |
| 18 | E | GI | 13 | 54 | 16 | 0 | 1 | 9 | 0 | 0.89 | 1.5 | 1.01 | 3.2 |
| 19 | E | GI | 15 | 54 | 23 | 0 | 0 | 10 | 2 | 0.89 | 1.8 | 0.98 | 1.6 |
| 20 | E | GA | 10 | 33 | 19 | 25 | 0 | 7 | 1 | 0.74 | 3.5 | 0.94 | 35.1 |
| 21 | F | GI | 25 | 44 | 24 | 2 | 0 | 8 | 0 | 0.78 | 2.4 | 1.21 | 2.0 |
| 22 | F | GA | 32 | 34 | 20 | 6 | 0 | 9 | 1 | 0.93 | 2.4 | 0.98 | 11.2 |
| 23 | F | GI | 19 | 43 | 32 | 0 | 0 | 6 | 0 | 0.76 | 2.0 | 0.94 | 14.8 |
| 24 | F | GI | 22 | 35 | 37 | 0 | 0 | 6 | 0 | 0.89 | 4.3 | 1.21 | 7.6 |
| 25 | G | GI | 3 | 33 | 22 | 0 | 34 | 7 | 1 | 0.90 | 1.3 | 1.68 | 9.8 |
| 26 | G | GA | 38 | 28 | 26 | 2 | 0 | 10 | 0 | 0.89 | 2.4 | 0.87 | 1.4 |
| 27 | G | GI | 30 | 38 | 20 | 0 | 0 | 11 | 1 | 0.89 | 2.0 | 1.04 | 6.7 |
| 28 | G | GA | 22 | 36 | 29 | 0 | 0 | 10 | 3 | 0.77 | 3.7 | 1.24 | 2.3 |
| 29 | H | GI | 29 | 32 | 27 | 4 | 0 | 8 | 0 | 0.94 | 2.1 | 1.04 | 3.2 |
| 30 | H | GA | 28 | 40 | 20 | 1 | 0 | 11 | 0 | 0.88 | 2.0 | 1.11 | 2.3 |
| 31 | H | GA | 39 | 40 | 13 | 0 | 0 | 6 | 2 | 0.89 | 2.1 | 1.03 | 3.5 |
| 32 | H | GI | 11 | 40 | 36 | 4 | 0 | 7 | 0 | 0.84 | 3.3 | 1.09 | 5.1 |
| 33 | H | GI | 8 | 59 | 18 | 5 | 0 | 12 | 1 | 0.89 | 1.8 | 1.10 | 10.0 |
| 34 | H | GI | 25 | 40 | 20 | 4 | 0 | 10 | 1 | 0.77 | 1.6 | 0.97 | 6.3 |
| 35 | J | GA | 4 | 60 | 20 | 8 | 0 | 8 | 0 | 0.86 | 1.8 | 1.06 | 38.4 |
| 36 | J | GI | 16 | 49 | 17 | 7 | 0 | 10 | 1 | 0.83 | 3.6 | 0.78 | 13.4 |
| 37 | J | GI | 27 | 32 | 23 | 7 | 0 | 10 | 1 | 0.93 | 1.8 | 1.07 | 1.6 |
| 38 | J | GI | 15 | 40 | 32 | 8 | 0 | 5 | 0 | 0.79 | 1.3 | 0.92 | 2.9 |
| 39 | J | GA | 18 | 42 | 31 | 1 | 0 | 8 | 0 | 0.80 | 2.0 | 0.94 | 3.3 |
| 40 | J | GI | 19 | 33 | 37 | 1 | 0 | 5 | 0 | 0.75 | 3.2 | 1.44 | 9.7 |

TABLE 15-continued

| EXPERI-MENTAL EXAMPLE | PLATING LAYER STEEL SHEET SURFACE LAYER | | | PROPERTY | | PROPERTY TENSILE PROPERTY | | | BAKE HARDENABILITY | | |
|---|---|---|---|---|---|---|---|---|---|---|---|
| | DECAR-BURIZED FIXED LAYER THICKNESS μm | OXIDE DENSITY 10^13 OXIDES/m² | OXIDE SIZE nm | EXTERNAL APPEAR-ANCE | PLATING PEELING | YIELD STRESS MPa | TENSILE STRENGTH MPa | TOTAL ELONGA-TION % | ΔBH (RD) MPa | ΔBH (TD) MPa | ΔBH (RD)/ ΔBH (TD) |
| 1 | 1.77 | 69.8 | 51 | ○ | ○ | 603 | 961 | 21 | 93 | 92 | 1.01 |
| 2 | 1.32 | 54.1 | 52 | ○ | ○ | 886 | 1231 | 16 | 82 | 75 | 1.09 |
| 3 | 1.21 | 42.7 | 56 | ○ | ○ | 1041 | 1277 | 13 | 102 | 109 | 0.93 |
| 4 | 0.67 | 52.4 | 58 | ○ | ○ | 704 | 1066 | 19 | 86 | 82 | 1.04 |
| 5 | 1.27 | 103.4 | 51 | ○ | ○ | 531 | 958 | 17 | 86 | 80 | 1.07 |
| 6 | 2.19 | 178.4 | 49 | ○ | ○ | 935 | 1303 | 17 | 98 | 89 | 1.10 |
| 7 | 1.69 | 65.1 | 65 | ○ | ○ | 938 | 1304 | 18 | 93 | 93 | 1.00 |
| 8 | 1.63 | 49.7 | 55 | ○ | ○ | 803 | 1187 | 14 | 68 | 71 | 0.95 |
| 9 | 4.16 | 0.0 | 87 | ○ | ○ | 800 | 1186 | 17 | 73 | 68 | 1.10 |
| 10 | 0.72 | 23.1 | 51 | ○ | ○ | 908 | 1196 | 19 | 77 | 78 | 0.98 |
| 11 | 1.17 | 13.4 | 67 | ○ | ○ | 981 | 1352 | 13 | 78 | 77 | 1.01 |
| 12 | 0.83 | 9.0 | 91 | ○ | ○ | 1042 | 1419 | 14 | 102 | 83 | 1.09 |
| 13 | 0.78 | 14.1 | 68 | ○ | ○ | 819 | 1159 | 16 | 90 | 60 | 1.12 |
| 14 | 2.10 | 26.9 | 67 | ○ | ○ | 1045 | 1489 | 12 | 79 | 73 | 1.08 |
| 15 | 2.07 | 20.5 | 66 | ○ | ○ | 998 | 1405 | 18 | 92 | 83 | 1.10 |
| 16 | 3.16 | 30.2 | 77 | ○ | ○ | 1013 | 1292 | 5 | 80 | 122 | 0.65 |
| 17 | 2.08 | 18.1 | 67 | ○ | ○ | 629 | 1042 | 15 | 92 | 88 | 1.04 |
| 18 | 2.48 | 29.8 | 56 | ○ | ○ | 939 | 1277 | 11 | 96 | 98 | 1.00 |
| 19 | 4.15 | 81.7 | 51 | ○ | ○ | 916 | 1189 | 13 | 95 | 100 | 0.92 |
| 20 | 1.92 | 35.0 | 56 | ○ | ○ | 1030 | 1411 | 9 | 78 | 103 | 0.75 |
| 21 | 2.06 | 8.5 | 50 | ○ | ○ | 875 | 1287 | 10 | 71 | 70 | 1.01 |
| 22 | 4.17 | 34.3 | 69 | ○ | ○ | 792 | 1252 | 11 | 97 | 96 | 1.01 |
| 23 | 1.08 | 40.1 | 53 | ○ | ○ | 824 | 1162 | 15 | 89 | 86 | 1.03 |
| 24 | 3.55 | 37.5 | 75 | ○ | ○ | 854 | 1142 | 13 | 58 | 99 | 0.65 |
| 25 | 2.55 | 78.0 | 57 | ○ | ○ | 1103 | 1483 | 9 | 96 | 95 | 1.01 |
| 26 | 5.05 | 76.9 | 53 | ○ | ○ | 707 | 1055 | 18 | 83 | 84 | 0.98 |
| 27 | 1.10 | 34.4 | 48 | ○ | ○ | 862 | 1262 | 14 | 98 | 95 | 1.01 |
| 28 | 1.56 | 41.3 | 65 | ○ | ○ | 950 | 1238 | 15 | 65 | 84 | 0.77 |
| 29 | 1.14 | 74.4 | 36 | ○ | ○ | 928 | 1466 | 13 | 91 | 95 | 0.95 |
| 30 | 0.19 | 22.4 | 37 | ○ | ○ | 851 | 1275 | 10 | 85 | 78 | 1.08 |
| 31 | 1.34 | 51.4 | 57 | ○ | ○ | 808 | 1291 | 13 | 78 | 80 | 0.95 |
| 32 | 1.21 | 79.3 | 52 | ○ | ○ | 918 | 1264 | 15 | 80 | 82 | 0.73 |
| 33 | 0.88 | 77.1 | 43 | ○ | ○ | 1004 | 1263 | 8 | 96 | 115 | 1.04 |
| 34 | 4.14 | 141.9 | 44 | ○ | ○ | 796 | 1209 | 12 | 97 | 105 | 0.92 |
| 35 | 1.68 | 66.8 | 48 | ○ | ○ | 1096 | 1387 | 10 | 115 | 121 | 0.95 |
| 36 | 2.27 | 60.0 | 43 | ○ | ○ | 959 | 1334 | 8 | 75 | 103 | 0.72 |
| 37 | 3.81 | 55.5 | 65 | ○ | ○ | 926 | 1406 | 7 | 75 | 69 | 1.08 |
| 38 | 0.87 | 22.2 | 58 | ○ | ○ | 1104 | 1439 | 12 | 81 | 89 | 0.94 |
| 39 | 2.00 | 20.8 | 72 | ○ | ○ | 1040 | 1498 | 15 | 74 | 79 | 0.93 |
| 40 | 1.04 | 29.3 | 56 | ○ | ○ | 889 | 1169 | 16 | 52 | 85 | 0.72 |

TABLE 16

| EXPERIMENTAL EXAMPLE | CHEMICAL COMPONENT | STEEL TYPE | FERRITE % | BAINITE % | BANITIC FERRITE % | MARTENSITE % | TEMPERED MARTENSITE % | RETAINED AUSTENITE % | OTHERS % |
|---|---|---|---|---|---|---|---|---|---|
| 41 | K | GI | 26 | 50 | 17 | 0 | 0 | 7 | 0 |
| 42 | K | GA | 25 | 48 | 18 | 2 | 0 | 9 | 0 |
| 43 | K | GA | 11 | 32 | 33 | 0 | 14 | 9 | 1 |
| 44 | K | GI | 28 | 23 | 13 | 23 | 0 | 9 | 3 |
| 45 | L | GI | 8 | 33 | 35 | 4 | 0 | 12 | 3 |
| 46 | L | GI | 20 | 51 | 24 | 1 | 0 | 4 | 0 |
| 47 | L | GA | 7 | 53 | 32 | 0 | 0 | 8 | 0 |
| 48 | L | | TEST STOPPED DUE TO FRACTURE OF STEEL SHEET IN COLD-ROLLING STEP | | | | | | |
| 49 | M | GI | 12 | 59 | 20 | 0 | 0 | 8 | 1 |
| 50 | M | GA | 26 | 50 | 16 | 0 | 0 | 6 | 2 |
| 51 | M | GA | 11 | 35 | 38 | 4 | 0 | 8 | 4 |
| 52 | M | GI | <u>75</u> | 0 | 5 | 13 | 0 | 5 | 2 |
| 53 | N | GI | 25 | 24 | 20 | 0 | 20 | 9 | 2 |
| 54 | N | GA | 26 | 40 | 26 | 0 | 0 | 7 | 0 |
| 55 | N | GA | 33 | 33 | 19 | 3 | 0 | 10 | 2 |
| 56 | N | GI | 27 | 34 | 32 | 0 | 0 | 7 | 0 |
| 57 | O | GI | 22 | 33 | 33 | 2 | 0 | 9 | 1 |
| 58 | O | GA | 22 | 36 | 34 | 1 | 0 | 7 | 0 |
| 59 | O | GA | 15 | 56 | 18 | 3 | 0 | 7 | 0 |
| 60 | O | GI | 14 | 38 | 29 | 16 | 0 | 2 | 1 |
| 61 | P | GI | 26 | 26 | 26 | 12 | 0 | 10 | 0 |
| 62 | P | GI | 22 | 45 | 15 | 8 | 0 | 9 | 1 |
| 63 | P | GA | 26 | 45 | 20 | 0 | 0 | 8 | 0 |
| 64 | P | GI | 31 | 28 | 27 | 4 | 0 | 9 | 1 |
| 65 | Q | GI | 25 | 35 | 12 | 23 | 0 | 4 | 1 |
| 66 | Q | GI | 21 | 30 | 15 | 2 | 0 | 10 | 2 |
| 67 | Q | GA | 34 | 44 | 13 | 1 | 0 | 8 | 0 |
| 68 | Q | GI | 25 | 37 | 26 | 2 | 0 | 10 | 0 |
| 69 | R | GI | 13 | 49 | 21 | 5 | 0 | 12 | 0 |
| 70 | R | GA | 20 | 39 | 29 | 1 | 0 | 9 | 2 |
| 71 | R | GA | 16 | 40 | 35 | 3 | 0 | 6 | 0 |
| 72 | R | GI | 10 | 32 | 26 | 28 | 0 | 4 | 0 |
| 73 | S | GI | 17 | 27 | 17 | 0 | 27 | 12 | 0 |
| 74 | S | GA | 18 | 34 | 33 | 2 | 0 | 13 | 2 |
| 75 | S | GA | 9 | 43 | 30 | 6 | 0 | 11 | 1 |
| 76 | S | GI | 33 | 19 | 15 | 23 | 0 | 6 | 4 |
| 77 | T | GI | 17 | 38 | 30 | 2 | 0 | 10 | 3 |
| 78 | T | GA | 15 | 63 | 5 | 9 | 0 | 8 | 0 |
| 79 | T | GA | 16 | 54 | 17 | 2 | 0 | 8 | 0 |
| 80 | T | GI | 21 | 40 | 18 | 13 | 0 | 8 | 1 |

| EXPERIMENTAL EXAMPLE | RETAINED AUSTENITE SOLID-SOLUTION CARBON AMOUNT MASS % | X-RAY INTENSITY | d(RD)/d(TD) | AVERAGE DISLOCATION DENSITY $10^{13}/m^2$ | DECARBURIZED FIXED LAYER THICKNESS μm | OXIDE DENSITY $10^{13}$ OXIDES/$m^2$ | OXIDE SIZE nm | PROPERTY EXTERNAL APPEARANCE |
|---|---|---|---|---|---|---|---|---|
| 41 | 0.77 | 1.7 | 1.12 | 8.1 | 1.27 | 11.5 | 80 | ○ |
| 42 | 0.77 | 2.1 | 1.07 | 19.4 | 1.05 | 14.6 | 59 | ○ |
| 43 | 0.83 | 1.6 | 1.08 | 2.5 | 4.88 | 34.3 | 81 | ○ |
| 44 | 0.73 | 2.8 | <u>1.62</u> | 11.0 | 1.44 | 21.9 | 65 | ○ |
| 45 | 0.74 | 1.7 | 1.10 | 1.7 | 2.13 | 38.0 | 53 | ○ |
| 46 | 0.80 | 2.4 | 0.93 | 3.1 | 0.77 | 29.2 | 41 | ○ |
| 47 | 0.85 | 1.5 | 1.00 | 26.0 | 0.68 | 9.0 | 55 | ○ |
| 48 | | TEST STOPPED DUE TO FRACTURE OF STEEL SHEET IN COLD-ROLLING STEP | | | | | | |
| 49 | 0.79 | 2.0 | 1.00 | 9.9 | 0.59 | 25.5 | 58 | ○ |
| 50 | 0.77 | 2.7 | 0.98 | 1.3 | 2.10 | 3.8 | 68 | ○ |
| 51 | 0.82 | 1.5 | 1.24 | 6.6 | 1.08 | 31.2 | 68 | ○ |
| 52 | 0.77 | 1.7 | <u>1.42</u> | 4.7 | 1.70 | 30.4 | 67 | ○ |
| 53 | 0.87 | 2.0 | 1.29 | 2.0 | 3.54 | 228.5 | 37 | ○ |
| 54 | 0.79 | 2.2 | 1.00 | 4.4 | 0.58 | 142.9 | 28 | ○ |
| 55 | 0.92 | 2.4 | 0.85 | 2.6 | 2.79 | 711.1 | 32 | ○ |
| 56 | <u>1.10</u> | 1.9 | 1.00 | 13.6 | 2.34 | 153.4 | 47 | ○ |
| 57 | 0.77 | 1.2 | 1.27 | 1.4 | 0.75 | 31.4 | 61 | ○ |
| 58 | 0.94 | 1.8 | 1.12 | 1.9 | 2.37 | 105.3 | 51 | ○ |
| 59 | 0.79 | 1.8 | 1.03 | 1.3 | 1.30 | 60.1 | 52 | ○ |
| 60 | <u>0.58</u> | 1.9 | 1.21 | 5.1 | 1.82 | 62.4 | 55 | ○ |

TABLE 16-continued

| | | | | | | | | |
|---|---|---|---|---|---|---|---|---|
| 61 | 0.89 | 1.8 | 1.20 | 7.5 | 2.20 | 34.9 | 63 | ○ |
| 62 | 0.87 | 2.8 | 1.14 | 9.3 | 8.17 | 24.5 | 85 | ○ |
| 63 | 0.94 | 2.4 | 0.78 | 6.1 | 2.42 | 30.3 | 71 | ○ |
| 64 | 0.74 | 1.3 | 0.68 | 5.1 | 1.47 | 21.5 | 74 | ○ |
| 65 | 0.78 | 1.9 | 0.96 | 5.6 | 1.01 | 19.4 | 61 | ○ |
| 66 | 0.88 | 2.3 | 1.28 | 4.6 | 2.78 | 27.2 | 69 | ○ |
| 67 | 0.94 | 2.1 | 1.14 | 3.0 | 0.64 | 9.6 | 72 | ○ |
| 68 | 0.82 | 1.4 | 0.72 | 3.3 | 2.11 | 24.3 | 57 | ○ |
| 69 | 0.74 | 2.1 | 1.07 | 23.9 | 1.62 | 39.1 | 55 | ○ |
| 70 | 0.74 | 1.9 | 1.20 | 2.0 | 0.90 | 26.2 | 57 | ○ |
| 71 | 0.78 | 2.3 | 1.09 | 1.8 | 1.19 | 84.0 | 48 | ○ |
| 72 | 0.86 | 1.6 | 0.96 | 29.6 | 2.48 | 78.9 | 49 | ○ |
| 73 | 0.95 | 1.8 | 1.08 | 2.3 | 1.66 | 38.7 | 64 | ○ |
| 74 | 0.88 | 1.9 | 0.97 | 2.6 | 5.35 | 38.3 | 83 | ○ |
| 75 | 0.87 | 1.6 | 1.01 | 4.8 | 0.42 | 41.7 | 48 | ○ |
| 76 | 0.84 | 1.8 | 0.91 | 1.7 | 4.19 | 111.4 | 57 | ○ |
| 77 | 0.73 | 1.9 | 0.97 | 1.8 | 0.84 | 11.2 | 75 | ○ |
| 78 | 0.82 | 2.0 | 1.19 | 1.9 | 2.09 | 24.4 | 75 | ○ |
| 79 | 0.82 | 1.7 | 1.15 | 5.4 | 1.71 | 44.1 | 58 | ○ |
| 80 | 0.76 | 1.7 | 0.86 | 2.5 | 1.19 | 40.5 | 47 | ○ |

| | | PROPERTY | | | | | | |
|---|---|---|---|---|---|---|---|---|
| | | TENSILE PROPERTY | | | BAKE HARDENABILITY | | | |
| EXPERI-MENTAL EXAMPLE | PLATING PEELING | YIELD STRESS MPa | TENSILE STRENGTH MPa | TOTAL ELONGA-TION % | ΔBH (RD) MPa | ΔBH (TD) MPa | ΔBH (RD)/ ΔBH (TD) | STEEL TYPE |
| 41 | ○ | 845 | 1230 | 17 | 85 | 88 | 0.96 | EXAMPLE |
| 42 | ○ | 777 | 1130 | 12 | 90 | 91 | 1.05 | EXAMPLE |
| 43 | ○ | 1112 | 1410 | 9 | 90 | 90 | 1.00 | EXAMPLE |
| 44 | ○ | 984 | 1440 | 7 | 97 | 120 | 0.72 | COMPARATIVE EXAMPLE |
| 45 | ○ | 1168 | 1466 | 13 | 89 | 162 | 0.67 | EXAMPLE |
| 46 | ○ | 863 | 1230 | 11 | 71 | 79 | 0.89 | EXAMPLE |
| 47 | ○ | 894 | 1261 | 15 | 118 | 120 | 0.98 | EXAMPLE |
| 48 | TEST STOPPED DUE TO FRACTURE OF STEEL SHEET IN COLD-ROLLING STEP | | | | | | | COMPARATIVE EXAMPLE |
| 49 | ○ | 735 | 981 | 16 | 92 | 93 | 0.98 | EXAMPLE |
| 50 | ○ | 549 | 1229 | 15 | 76 | 77 | 0.98 | EXAMPLE |
| 51 | ○ | 969 | 1308 | 15 | 103 | 100 | 1.03 | EXAMPLE |
| 52 | ○ | 421 | 931 | 15 | 26 | 44 | 0.59 | COMPARATIVE EXAMPLE |
| 53 | ○ | 1086 | 1464 | 11 | 74 | 71 | 1.04 | EXAMPLE |
| 54 | ○ | 674 | 1019 | 16 | 73 | 70 | 1.04 | EXAMPLE |
| 55 | ○ | 704 | 1177 | 11 | 85 | 86 | 0.98 | EXAMPLE |
| 56 | ○ | 867 | 1037 | 20 | 49 | 55 | 0.89 | COMPARATIVE EXAMPLE |
| 57 | ○ | 919 | 1318 | 13 | 72 | 74 | 0.97 | EXAMPLE |
| 58 | ○ | 854 | 1205 | 13 | 74 | 70 | 0.97 | EXAMPLE |
| 59 | ○ | 1049 | 1459 | 7 | 84 | 97 | 0.86 | EXAMPLE |
| 60 | ○ | 755 | 1291 | 9 | 40 | 48 | 0.83 | COMPARATIVE EXAMPLE |
| 61 | ○ | 936 | 1337 | 12 | 88 | 87 | 1.01 | EXAMPLE |
| 62 | ○ | 998 | 1392 | 10 | 80 | 69 | 1.15 | EXAMPLE |
| 63 | ○ | 710 | 1046 | 21 | 84 | 82 | 1.02 | EXAMPLE |
| 64 | ○ | 985 | 1433 | 15 | 77 | 61 | 1.20 | COMPARATIVE EXAMPLE |
| 65 | ○ | 897 | 1350 | 10 | 74 | 71 | 1.01 | EXAMPLE |
| 66 | ○ | 810 | 1226 | 15 | 80 | 81 | 0.98 | EXAMPLE |
| 67 | ○ | 743 | 1178 | 9 | 88 | 84 | 0.93 | EXAMPLE |
| 68 | ○ | 758 | 1167 | 17 | 93 | 72 | 1.29 | COMPARATIVE EXAMPLE |
| 69 | ○ | 1153 | 1506 | 11 | 108 | 114 | 0.94 | EXAMPLE |
| 70 | ○ | 1019 | 1298 | 13 | 90 | 84 | 1.07 | EXAMPLE |
| 71 | ○ | 1604 | 1293 | 11 | 62 | 82 | 1.00 | EXAMPLE |
| 72 | ○ | 1301 | 1620 | 6 | 94 | 92 | 0.91 | EXAMPLE |
| 73 | ○ | 1311 | 1568 | 10 | 102 | 95 | 1.07 | EXAMPLE |
| 74 | ○ | 877 | 1178 | 13 | 92 | 94 | 0.97 | EXAMPLE |
| 75 | ○ | 871 | 1197 | 14 | 105 | 103 | 1.01 | EXAMPLE |
| 76 | ○ | 789 | 1235 | 10 | 82 | 62 | 1.00 | EXAMPLE |
| 77 | ○ | 684 | 1257 | 11 | 79 | 86 | 0.91 | EXAMPLE |
| 78 | ○ | 997 | 1373 | 13 | 92 | 85 | 1.08 | EXAMPLE |
| 79 | ○ | 866 | 1203 | 18 | 103 | 105 | 0.97 | EXAMPLE |
| 80 | ○ | 1089 | 1514 | 15 | 88 | 91 | 0.98 | EXAMPLE |

TABLE 17

| EXPERI-MENTAL EXAMPLE | CHEMICAL COMPONENT | STEEL TYPE | MICROSTRUCTURE ||||||| 
| --- | --- | --- | --- | --- | --- | --- | --- | --- | --- |
| | | | STRUCTURAL FRACTION ||||||| 
| | | | FERRITE % | BAINITE % | BAINITIC FERRITE % | MARTENSITE % | TEMPERED MARTENSITE % | RETAINED AUSTENITE % | OTHERS % |
| 81 | U | GI | 8 | 35 | 35 | 6 | 1 | 11 | 2 |
| 82 | U | GA | 20 | 45 | 30 | 1 | 0 | 4 | 0 |
| 83 | U | GA | 20 | 20 | 16 | 0 | 32 | 11 | 1 |
| 84 | U | GI | 11 | 50 | 28 | 4 | 0 | 9 | 0 |
| 85 | V | GI | 17 | 33 | 13 | 27 | 0 | 10 | 0 |
| 86 | V | GI | 32 | 32 | 30 | 1 | 0 | 5 | 0 |
| 87 | V | GA | 36 | 26 | 24 | 3 | 0 | 7 | 2 |
| 88 | V | GI | 17 | 50 | 22 | 2 | 0 | 9 | 0 |
| 89 | W | GI | 72 | 37 | 34 | 1 | 0 | 8 | 0 |
| 90 | W | GI | 20 | 40 | 34 | 1 | 0 | 5 | 0 |
| 91 | W | GA | 15 | 30 | 39 | 2 | 0 | 10 | 1 |
| 92 | W | GI | 25 | 40 | 28 | 0 | 0 | 78 | 0 |
| 93 | X | GI | 9 | 26 | 49 | 5 | 0 | 9 | 2 |
| 94 | X | GI | 21 | 33 | 34 | 5 | 0 | 7 | 0 |
| 95 | X | GA | 14 | 45 | 31 | 2 | 0 | 7 | 1 |
| 96 | X | GI | 20 | 47 | 15 | 8 | 0 | 9 | 0 |
| 97 | Y | GI | 29 | 39 | 20 | 4 | 0 | 8 | 0 |
| 98 | Y | GI | 19 | 48 | 19 | 5 | 0 | 8 | 1 |
| 99 | Y | GA | 29 | 20 | 19 | 26 | 0 | 6 | 0 |
| 100 | Y | GI | 20 | 48 | 20 | 2 | 0 | 9 | 3 |
| 101 | Z | GI | 29 | 40 | 21 | 3 | 0 | 7 | 0 |
| 102 | Z | GA | 18 | 85 | 5 | 4 | 0 | 7 | 0 |
| 103 | Z | GA | 0 | 65 | 18 | 5 | 0 | 9 | 3 |
| 104 | Z | GI | 19 | 27 | 24 | 15 | 0 | 12 | 3 |
| 105 | AA | GI | 16 | 37 | 34 | 3 | 0 | 10 | 0 |
| 106 | AA | GA | 25 | 39 | 20 | 8 | 0 | 8 | 2 |
| 107 | AA | GA | 12 | 11 | 31 | 0 | 38 | 7 | 1 |
| 108 | AA | GI | 16 | 42 | 23 | 4 | 0 | 9 | 0 |
| 109 | AB | GI | 32 | 38 | 24 | 0 | 0 | 6 | 0 |
| 110 | AB | GA | 15 | 45 | 34 | 0 | 0 | 8 | 0 |
| 111 | AB | GA | 11 | 34 | 37 | 3 | 0 | 14 | 1 |
| 112 | AB | GI | 13 | 48 | 21 | 7 | 0 | 11 | 0 |
| 113 | AC | GI | 20 | 27 | 10 | 32 | 0 | 8 | 3 |
| 114 | AC | GI | 17 | 48 | 22 | 6 | 0 | 11 | 2 |
| 115 | AC | GA | 16 | 37 | 34 | 5 | 0 | 8 | 0 |
| 116 | AC | GI | 12 | 17 | 14 | 49 | 0 | 8 | 0 |
| 117 | AD | GI | 11 | 38 | 33 | 10 | 0 | 8 | 0 |
| 118 | AD | GA | 27 | 25 | 21 | 17 | 0 | 7 | 3 |
| 119 | AD | GA | 11 | 25 | 18 | 38 | 0 | 9 | 1 |
| 120 | AD | GI | 13 | 40 | 31 | 7 | 0 | 9 | 0 |

| EXPERI-MENTAL EXAMPLE | MICROSTRUCTURE ||| AVERAGE DISLOCATION DENSITY $10^{13}$ m/$^2$ | PLATING LAYER STEEL SHEET SURFACE LAYER |||| PROPERTY EXTERNAL APPEARANCE |
| --- | --- | --- | --- | --- | --- | --- | --- | --- | --- |
| | RETAINED AUSTENITE ||| | DECAR- ||||  |
| | SOLID-SOLUTION CARBON AMOUNT MASS % | X-RAY INTENSITY | d(RD)/d(TD) | | BURIZED FIXED LAYER THICKNESS μm | OXIDE DENSITY $10^{13}$ OXIDES/m$^2$ | OXIDE SIZE nm | |
| 81 | 0.92 | 1.4 | 0.80 | 12.2 | 0.35 | 16.5 | 70 | ○ |
| 82 | 0.80 | 1.8 | 0.88 | 22.1 | 1.54 | 29.8 | 70 | ○ |
| 83 | 0.76 | 2.1 | 1.12 | 13.1 | 0.73 | 5.4 | 51 | ○ |
| 84 | 0.79 | 1.4 | 0.82 | 12.2 | 1.53 | 45.8 | 55 | ○ |
| 85 | 0.83 | 2.2 | 1.15 | 2.1 | 1.06 | 17.7 | 82 | ○ |
| 86 | 0.84 | 2.2 | 1.04 | 6.9 | 1.39 | 41.9 | 62 | ○ |
| 87 | 0.90 | 2.8 | 0.87 | 2.4 | 0.78 | 21.0 | 64 | ○ |
| 88 | 0.87 | 1.7 | 1.14 | 1.3 | 1.52 | 19.5 | 76 | ○ |
| 89 | 0.83 | 1.7 | 1.01 | 1.4 | 3.31 | 17.7 | 75 | ○ |
| 90 | 0.91 | 2.2 | 1.14 | 3.8 | 0.79 | 12.1 | 65 | ○ |
| 91 | 0.76 | 2.6 | 1.15 | 3.4 | 2.64 | 23.7 | 67 | ○ |
| 92 | 0.91 | 1.7 | 1.12 | 3.1 | 1.25 | 11.4 | 79 | ○ |
| 93 | 0.77 | 1.9 | 0.79 | 5.4 | 1.42 | 40.5 | 48 | ○ |
| 94 | 0.82 | 1.5 | 1.04 | 12.7 | 2.05 | 20.1 | 77 | ○ |
| 95 | 0.68 | 2.1 | 0.90 | 15.9 | 1.11 | 29.0 | 52 | ○ |
| 96 | 0.75 | 1.8 | 0.79 | 4.1 | 1.58 | 21.3 | 67 | ○ |
| 97 | 0.77 | 1.8 | 0.94 | 7.1 | 2.35 | 72.9 | 52 | ○ |
| 98 | 0.75 | 1.9 | 0.98 | 8.4 | 1.13 | 256.1 | 33 | ○ |
| 99 | 0.74 | 2.4 | 0.85 | 12.3 | 2.70 | 158.9 | 47 | ○ |
| 100 | 0.81 | 2.0 | 0.95 | 0.9 | 0.38 | 59.4 | 48 | ○ |

TABLE 17-continued

| | | | | | | | | |
|---|---|---|---|---|---|---|---|---|
| 101 | 0.79 | 1.9 | 1.07 | 4.1 | 2.25 | 13.3 | 75 | ○ |
| 102 | 0.73 | 2.4 | 1.27 | 9.6 | 0.60 | 13.1 | 58 | ○ |
| 103 | 0.90 | 1.4 | 0.79 | 2.0 | 2.65 | 20.8 | 78 | ○ |
| 104 | 0.75 | 2.0 | 1.10 | 1.2 | 0.58 | 18.2 | 62 | ○ |
| 105 | 0.87 | 2.3 | 0.94 | 10.8 | 2.00 | 31.1 | 69 | ○ |
| 106 | 0.79 | 1.9 | 0.86 | 24.2 | 2.72 | 97.9 | 48 | ○ |
| 107 | 0.78 | 1.7 | 1.20 | 1.2 | 2.94 | 88.3 | 54 | ○ |
| 108 | 0.83 | 1.6 | 0.86 | 1.3 | 0.92 | 24.4 | 63 | ○ |
| 109 | 0.77 | 2.0 | 0.86 | 7.4 | 4.00 | 43.3 | 78 | ○ |
| 110 | 0.79 | 2.0 | 1.18 | 42.2 | 2.21 | 62.1 | 53 | ○ |
| 111 | 0.79 | 2.0 | 0.97 | 1.9 | 2.72 | 63.3 | 51 | ○ |
| 112 | 0.83 | 2.0 | 1.09 | 22.1 | 2.58 | 77.1 | 51 | ○ |
| 113 | 0.88 | 2.2 | 1.09 | 5.0 | 1.98 | 63.3 | 57 | ○ |
| 114 | 0.94 | 2.1 | 1.09 | 3.6 | 2.33 | 67.0 | 60 | ○ |
| 115 | 0.92 | 1.9 | 1.12 | 7.5 | 1.85 | 68.4 | 57 | ○ |
| 116 | 0.77 | 1.3 | 1.09 | 15.5 | 4.14 | 107.5 | 53 | ○ |
| 117 | 0.85 | 1.8 | 1.04 | 2.2 | 0.85 | 40.9 | 45 | ○ |
| 118 | 0.89 | 2.2 | 1.21 | 4.0 | 3.74 | 74.9 | 63 | ○ |
| 119 | 0.72 | 1.5 | 0.95 | 2.3 | 1.08 | 84.8 | 53 | ○ |
| 120 | 0.83 | 2.4 | 0.86 | 1.7 | 1.75 | 51.3 | 62 | ○ |

| | | PROPERTY | | | | | | |
|---|---|---|---|---|---|---|---|---|
| | | TENSILE PROPERTY | | | BAKE HARDENABILITY | | | |
| EXPERI-MENTAL EXAMPLE | PLATING PEELING | YIELD STRESS MPa | TENSILE STRENGTH MPa | TOTAL ELONGA-TION % | ΔBH (RD) MPa | ΔBH (TD) MPa | ΔBH (RD)/ ΔBH (TD) | STEEL TYPE |
| 81 | ○ | 1092 | 1361 | 13 | 123 | 110 | 1.11 | EXAMPLE |
| 82 | ○ | 863 | 1158 | 17 | 91 | 100 | 0.91 | EXAMPLE |
| 83 | ○ | 1203 | 1519 | 9 | 102 | 115 | 0.88 | EXAMPLE |
| 84 | ○ | 1189 | 1547 | 10 | 123 | 125 | 0.98 | EXAMPLE |
| 85 | ○ | 1152 | 1569 | 9 | 89 | 80 | 1.10 | EXAMPLE |
| 86 | ○ | 937 | 1358 | 11 | 71 | 89 | 1.02 | EXAMPLE |
| 87 | ○ | 952 | 1372 | 10 | 74 | 73 | 1.01 | EXAMPLE |
| 88 | ○ | 1020 | 1316 | 15 | 81 | 77 | 1.05 | EXAMPLE |
| 89 | ○ | 862 | 1183 | 20 | 62 | 72 | 1.13 | EXAMPLE |
| 90 | ○ | 950 | 1324 | 13 | 72 | 79 | 0.91 | EXAMPLE |
| 91 | ○ | 907 | 1285 | 14 | 81 | 88 | 0.82 | EXAMPLE |
| 92 | ○ | 894 | 1007 | 29 | 90 | 84 | 1.07 | EXAMPLE |
| 93 | ○ | 1170 | 1489 | 12 | 99 | 90 | 1.10 | EXAMPLE |
| 94 | ○ | 813 | 1194 | 12 | 107 | 102 | 1.04 | EXAMPLE |
| 95 | ○ | 1011 | 1342 | 9 | 87 | 79 | 1.10 | EXAMPLE |
| 96 | ○ | 1064 | 1338 | 12 | 100 | 86 | 1.16 | EXAMPLE |
| 97 | ○ | 898 | 1401 | 16 | 88 | 85 | 1.03 | EXAMPLE |
| 98 | ○ | 831 | 1283 | 16 | 96 | 94 | 1.02 | EXAMPLE |
| 99 | ○ | 1013 | 1578 | 8 | 84 | 86 | 0.97 | EXAMPLE |
| 100 | ○ | 917 | 1294 | 15 | 100 | 106 | 0.94 | EXAMPLE |
| 101 | ○ | 1002 | 1494 | 11 | 77 | 99 | 0.86 | EXAMPLE |
| 102 | ○ | 1087 | 1594 | 9 | 83 | 79 | 1.05 | EXAMPLE |
| 103 | ○ | 1057 | 1253 | 10 | 102 | 92 | 1.10 | EXAMPLE |
| 104 | ○ | 1232 | 1665 | 10 | 83 | 79 | 1.05 | EXAMPLE |
| 105 | ○ | 1024 | 1371 | 13 | 101 | 90 | 1.12 | EXAMPLE |
| 106 | ○ | 1063 | 1253 | 10 | 108 | 129 | 0.83 | EXAMPLE |
| 107 | ○ | 1348 | 1575 | 13 | 73 | 71 | 1.02 | EXAMPLE |
| 108 | ○ | 1010 | 1356 | 14 | 79 | 74 | 1.05 | EXAMPLE |
| 109 | ○ | 547 | 1049 | 20 | 74 | 77 | 0.98 | EXAMPLE |
| 110 | ○ | 733 | 984 | 18 | 95 | 106 | 0.89 | EXAMPLE |
| 111 | ○ | 983 | 1283 | 15 | 101 | 104 | 0.97 | EXAMPLE |
| 112 | ○ | 582 | 1217 | 11 | 121 | 114 | 1.06 | EXAMPLE |
| 113 | ○ | 1214 | 1573 | 5 | 77 | 85 | 0.90 | EXAMPLE |
| 114 | ○ | 1000 | 1336 | 14 | 82 | 91 | 0.90 | EXAMPLE |
| 115 | ○ | 1042 | 1293 | 10 | 91 | 69 | 1.02 | EXAMPLE |
| 116 | ○ | 1383 | 1823 | 9 | 103 | 96 | 1.12 | EXAMPLE |
| 117 | ○ | 1180 | 1566 | 12 | 89 | 84 | 1.05 | EXAMPLE |
| 118 | ○ | 965 | 1434 | 11 | 89 | 87 | 1.02 | EXAMPLE |
| 119 | ○ | 1225 | 1617 | 7 | 88 | 83 | 1.06 | EXAMPLE |
| 120 | ○ | 911 | 1280 | 11 | 87 | 92 | 0.94 | EXAMPLE |

TABLE 18

| EXPERI-MENTAL EXAMPLE | CHEMICAL COMPONENT | STEEL TYPE | FERRITE % | BAINITE % | BAINITIC FERRITE % | MARTENSITE % | TEMPERED MARTENSITE % | RETAINED AUSTENITE % | OTHERS % |
|---|---|---|---|---|---|---|---|---|---|
| 121 | AE | GI | 16 | 48 | 23 | 12 | 0 | 0 | 1 |
| 122 | AF | GI | 14 | 16 | 6 | 47 | 0 | 15 | 2 |
| 123 | AG | GI | 23 | 43 | 28 | 0 | 0 | <u>0</u> | 6 |
| 124 | AH | — | TEST STOPPED DUE TO FRACTURE IN COLD-ROLLING STEP | | | | | | |
| 125 | AI | GA | 35 | 34 | 13 | 3 | 0 | 0 | <u>15</u> |
| 126 | AJ | — | TEST STOPPED DUE TO SLAB FRACTURE | | | | | | |
| 127 | AK | — | TEST STOPPED DUE TO WELD ZONE FRACTURE IN CONTINUOUS ANNEALING STEP | | | | | | |
| 128 | G | GA | 44 | 13 | 25 | 8 | 0 | 12 | 0 |
| 129 | G | GA | 41 | 16 | 21 | 6 | 0 | 15 | 1 |
| 130 | G | GA | 41 | 6 | 38 | 2 | 0 | 11 | 2 |
| 131 | V | GA | <u>71</u> | 0 | 15 | 4 | 0 | 8 | 1 |
| 132 | V | GA | 37 | 22 | 25 | 3 | 0 | 2 | <u>11</u> |
| 133 | B | GA | 26 | 18 | 45 | 4 | 1 | 6 | <u>0</u> |
| 134 | B | GA | 37 | 30 | 21 | 2 | 1 | 8 | 1 |
| 135 | O | GA | 17 | 29 | 33 | 8 | 0 | 11 | 2 |
| 136 | O | GA | 26 | 23 | 35 | 6 | 0 | 7 | 4 |
| 137 | D | GA | RESULT OF EXTERNAL APPEARANCE EVALUATION SIGNIFICANTLY DETERIORATES AND MONOSTRUCTURE EVALUATION AND PROPERTY EVALUATION ARE NOT PERFORMED. | | | | | | |

| EXPERI-MENTAL EXAMPLE | SOLID-SOLUTION CARBON AMOUNT MASS % | X-RAY INTENSITY | d(RD)/d(TD) | AVERAGE DISLOCATION DENSITY $10^{13}/m^2$ | DECARBURIZED FIXED LAYER THICKNESS μm | OXIDE DENSITY $10^{13}$ OXIDES $m^2$ | OXIDE SIZE nm | PROPERTY EXTERNAL APPEARANCE |
|---|---|---|---|---|---|---|---|---|
| 121 | 0.72 | 1.9 | 1.10 | 32.2 | 1.72 | 81.0 | 41 | ○ |
| 122 | 0.79 | 1.9 | 0.89 | 2.3 | 2.10 | 110.0 | 38 | ○ |
| 123 | 0.77 | 1.7 | 0.90 | 16.8 | 1.67 | 16.9 | 79 | ○ |
| 124 | TEST STOPPED DUE TO FRACTURE IN COLD-ROLLING STEP | | | | | | | |
| 125 | — | — | — | 1.3 | 1.84 | 3.1 | 63 | ○ |
| 126 | TEST STOPPED DUE TO SLAB FRACTURE | | | | | | | |
| 127 | TEST STOPPED DUE TO WELD ZONE FRACTURE IN CONTINUOUS ANNEALING STEP | | | | | | | |
| 128 | 0.93 | 2.6 | <u>1.48</u> | 6.8 | 2.11 | 17.1 | 67 | ○ |
| 129 | 0.87 | <u>4.5</u> | 1.08 | 13.2 | 1.80 | 21.3 | 83 | ○ |
| 130 | 0.90 | <u>2.2</u> | <u>1.37</u> | 11.9 | 3.05 | 19.3 | 58 | ○ |
| 131 | 0.83 | 2.1 | 1.06 | <u>0.8</u> | 3.00 | 36.3 | 72 | ○ |
| 132 | <u>0.48</u> | 2.2 | 0.94 | <u>2.6</u> | <u>1.62</u> | 28.3 | 38 | ○ |
| 133 | 0.87 | 1.7 | 1.01 | 2.8 | <u>0.00</u> | — | — | ○ |
| 134 | 0.61 | 1.9 | 1.07 | 4.1 | <u>23.5</u> | 34.0 | 55 | ○ |
| 135 | 0.91 | 2.1 | 1.15 | 97 | 1.17 | <u>0.1</u> | 84 | ○ |
| 136 | 0.87 | 2.6 | 1.08 | 68 | 14.2 | 57.6 | 73 | ○ |
| 137 | RESULT OF EXTERNAL APPEARANCE EVALUATION SIGNIFICANTLY DETERIORATES AND MONOSTRUCTURE EVALUATION AND PROPERTY EVALUATION ARE NOT PERFORMED. | | | | | | | x |

| EXPERIMENTAL EXAMPLE | PLATING PEELING | YIELD STRESS MPa | TENSILE STRENGTH MPa | TOTAL ELONGATION % | ΔBH (RD) MPa | ΔBH (TD) MPa | ΔBH (RD)/ ΔBH (TD) | STEEL TYPE |
|---|---|---|---|---|---|---|---|---|
| 121 | ○ | 535 | <u>815</u> | 15 | <u>45</u> | 42 | 0.85 | COMPARATIVE EXAMPLE |
| 122 | ○ | 1026 | 2197 | 4 | 184 | 157 | 1.17 | COMPARATIVE EXAMPLE |
| 123 | ○ | 385 | 703 | 18 | 34 | 32 | 1.06 | COMPARATIVE EXAMPLE |

TABLE 18-continued

| 124 |   | TEST STOPPED DUE TO FRACTURE IN COLD-ROLLING STEP | | | | | | COMPARATIVE EXAMPLE |
|---|---|---|---|---|---|---|---|---|
| 125 | ○ | 487 | 275 | 14 | 58 | 72 | 0.92 | COMPARATIVE EXAMPLE |
| 126 |   | TEST STOPPED DUE TO SLAB FRACTURE | | | | | | COMPARATIVE EXAMPLE |
| 127 |   | TEST STOPPED DUE TO WELD ZONE FRACTURE IN CONTINUOUS ANNEALING STEP | | | | | | COMPARATIVE EXAMPLE |
| 128 | ○ | 595 | 979 | 22 | 84 | 87 | 0.24 | COMPARATIVE EXAMPLE |
| 129 | ○ | 625 | 1005 | 24 | 53 | 80 | 0.66 | COMPARATIVE EXAMPLE |
| 130 | ○ | 714 | 1106 | 21 | 72 | 102 | 0.71 | COMPARATIVE EXAMPLE |
| 131 | ○ | 821 | 1193 | 23 | 39 | 36 | 1.09 | COMPARATIVE EXAMPLE |
| 132 | ○ | 491 | 789 | 14 | 52 | 45 | 1.16 | COMPARATIVE EXAMPLE |
| 133 | x | 562 | 1085 | 23 | 83 | 93 | 0.95 | COMPARATIVE EXAMPLE |
| 134 | ○ | 585 | 972 | 20 | 78 | 82 | 0.95 | COMPARATIVE EXAMPLE |
| 135 | x | 919 | 1190 | 15 | 84 | 84 | 1.00 | COMPARATIVE EXAMPLE |
| 136 | ○ | 864 | 1208 | 13 | 74 | 65 | 1.14 | COMPARATIVE EXAMPLE |
| 137 |   | — | | | | | | COMPARATIVE EXAMPLE |

As illustrated in Tables 1 to 18, in the examples, the excellent bake hardenability is obtained. On the other hand, in comparative examples, it is impossible to obtain sufficient tensile strength, and bake hardenability.

Industrial Applicability

In the high-strength hot-dip galvanized steel sheet and the high-strength alloyed hot-dip galvanized steel sheet according to the present invention, it is possible to enough secure the bake hardening amount and to obtain the isotropic bake hardenability, and therefore, it is possible to largely improve the bake hardenability in addition to the improvement in strength and ductility.

The invention claimed is:

1. A high-strength hot-dip galvanized steel sheet excellent in bake hardenability, comprising:
   a base steel sheet containing, in mass %,
   C: 0.075 to 0.400%,
   Si: 0.01 to 2.00%,
   Mn: 0.80 to 3.50%,
   P: 0.0001 to 0.100%,
   S: 0.0001 to 0.0100%,
   Al: 0.001 to 2.00%,
   N: 0.0001 to 0.0100%, and
   O: 0.0001 to 0.0100%,
      with the balance made up of Fe and inevitable impurities,
      wherein a structure of the base steel sheet contains, in volume fraction, 3% or more of a retained austenite phase, 50% or less of a ferrite phase, and 40% or more of a hard phase, at a range from ⅛ thickness centered around a ¼ sheet thickness from a surface to ⅜ thickness centered around the ¼ sheet thickness from the surface at the base steel sheet,
      wherein an average dislocation density is $5 \times 10^{13}/m^2$ or more,
      wherein a solid-solution C amount contained in the retained austenite phase is in mass % 0.70 to 1.00%,
      wherein an X-ray random intensity ratio of FCC iron in a texture of the retained austenite phase is 3.0 or less,
      wherein a ratio between a grain diameter relative to a rolling direction and a grain diameter relative to a sheet width direction of the retained austenite phase is 0.75 to 1.33, and
      wherein further, a hot-dip galvanized layer is formed at the surface of the base steel sheet and the sheet thickness is 0.6 to 5.0 mm.

2. The high-strength hot-dip galvanized steel sheet excellent in the bake hardenability according to claim 1,
   wherein the hard phase is made up of a bainitic ferrite phase and/or a bainite phase, a tempered martensite phase, and a fresh martensite phase.

3. The high-strength hot-dip galvanized steel sheet excellent in the bake hardenability according to claim 1,
   wherein a thickness of the decarburized layer formed at the surface layer portion of the base steel sheet is set to be within a range of 0.01 μm to 10.0 μm, an average grain diameter of oxides finely dispersed in the decarburized layer is 500 nm or less, and an average density of the oxides in the decarburized layer is within a range of $1.0 \times 10^{12}$ oxides/m² or more.

4. The high-strength hot-dip galvanized steel sheet excellent in the bake hardenability according to claim 1, the base steel sheet further containing, in mass %, one kind or two kinds or more from among
   Ti: 0.001 to 0.150%,
   Nb: 0.001 to 0.100%, and
   V: 0.001 to 0.300%.

5. The high-strength hot-dip galvanized steel sheet excellent in the bake hardenability according to claim 1, the base steel sheet further containing, in mass %, one kind or two kinds or more from among Mo: 0.01 to 2.00%,
W: 0.01 to 2.00%,
Cr: 0.01 to 2.00%,
Ni: 0.01 to 2.00%,
Cu: 0.01 to 2.00%, and
B: 0.0001 to 0.0100%.

6. The high-strength hot-dip galvanized steel sheet excellent in the bake hardenability according to claim 1, the base steel sheet further containing, in mass %, one kind or two kinds or more from among Ca, Ce, Mg, Zr, La, and REM for 0.0001 to 0.0100% as a total.

7. The high-strength hot-dip galvanized steel sheet excellent in bake hardenability according to claim 1, wherein an alloying treatment is performed for the hot-dip galvanized layer formed at the surface of the base steel sheet.

8. A method of manufacturing the high-strength hot-dip galvanized steel sheet excellent in bake hardenability according to claim 1, comprising:

a heating step of heating a base steel sheet containing, in mass %,
C: 0.075 to 0.400%,
Si: 0.01 to 2.00%,
Mn: 0.80 to 3.50%,
P: 0.0001 to 0.100%,
S: 0.0001 to 0.0100%,
Al: 0.001 to 2.00%,
N: 0.0001 to 0.0100%, and
O: 0.0001 to 0.0100%,
with the balance made up of Fe and inevitable impurities, to 1180° C. or more;

a hot rolling step of performing hot-rolling by plural passes such that a relationship among a temperature "T" of a hot-rolled steel sheet within a range from 1050° C. to a rolling completion temperature, a sheet thickness "h", and an elapsed time "t" between each pass satisfies Numerical Expression 1 after the heating step, wherein a finishing temperature of the hot-rolling is at a temperature range of 880° C. or more;

a first cooling step of cooling the hot-rolled steel sheet, wherein the cooling is started 1.0 second or more after completion of the hot-rolling step, and the cooling is stopped at 450°C. or more;

a second cooling step of further cooling the hot-rolled steel sheet down to 400° C. after the first cooling step, wherein an elapsed time from completion of the first cooling step to a point when the hot-rolled steel sheet is cooled down to 400° C. is 1.0 hour or more;

a cold-rolling step of performing cold-rolling with a total reduction ratio of 30 to 75% after the second cooling step;

a continuous annealing step of annealing at a maximum heating temperature of (Ac₃-50)° C. or more after the cold rolling step to obtain an annealed steel sheet;

a third cooling step of cooling the annealed steel sheet at a range of 740° C. to 500° C., at an average cooling rate of 1.0° C./second or more to obtain a cooled steel sheet, after the continuous annealing step; and a bainite transformation step including a plating step of forming a hot-dip galvanized layer at a surface of the cooled steel sheet by immersing the cooled steel sheet into a galvanizing bath, so as to obtain a plated steel sheet, wherein the cooled steel sheet is retained at a temperature within a range of 300 to 470° C. for 20 to 1000 seconds including a time period during which it is being immersed in the galvanized bath, to cause a bainite transformation in the cooled steel sheet after the third cooling step,

[Numerical Expression 1]

$$0.10 \leq \left\{ \sum_{i=1}^{N} (5.20 \times 10^{-6} \cdot T_i^3 - 1.06 \times 10^{-2} \cdot T_i^2 + 1.68 \times 10 \cdot T_i - 5.67 \times 10^3)^2 \cdot \left(\frac{h_{i-1}}{h_i}\right)^2 \cdot \exp\left(-\frac{2.20 \times 10^4}{T_i}\right) \cdot t_i \right\}^{0.5} \leq 1.00 \quad (1)$$

wherein "N" represents a total number of passes from the hot-rolling start to completion, "i" represents an order of each pass, "$T_i$" represents a rolling temperature (° C.) at the i-th pass, "$h_i$" represents a sheet thickness (mm) after the processing of the i-th pass, "$t_i$" represents an elapsed time from the i-th pass to the next pass, and when i=1, $h_0$=a slab thickness; and wherein an elapsed time from a final pass to the next pass is an elapsed time from the final pass to the cooling start time after the hot-rolling completion.

9. The method according to claim 8, wherein in the plating step, oxides are generated at a surface layer portion of the annealed steel sheet at a preheating zone where an air ratio being a ratio between a volume of air contained in mixed gas in a unit volume in the mixed gas of air and fuel gas used for heating and a volume of air theoretically required to enable complete combustion of the fuel gas contained in the mixed gas in a unit volume is set at 0.7 to 1.2, subsequently the oxides are reduced at a reduction zone where a partial pressure ratio ($P(H_2O)/P(H_2)$) between $H_2O$ and $H_2$ is set to be 0.0001 to 2.0, and thereafter, the annealed steel sheet is immersed into the galvanizing bath under a condition in which a plating bath temperature is 450 to 470° C., a steel sheet temperature when entering into the plating bath is 430 to 490° C., and an effective Al amount in the plating bath is 0.01 to 0.18 mass %, to thereby form the hot-dip galvanized layer at the surface of the annealed steel sheet.

10. The method according to claim 8, further comprising: a temper rolling step of performing a rolling for the plated steel sheet with a reduction ratio of 5.00% or less after the plating step is completed and the bainite transformation is caused.

11. A method of manufacturing a high-strength alloyed hot-dip galvanized steel sheet excellent in bake hardenability, comprising:

alloying the hot-dip galvanized layer after the high-strength hot-dip galvanized steel sheet is manufactured by the manufacturing method according to claim 8.

12. The method according to claim 11, further comprising: a temper rolling step of performing a rolling for the high-strength hot-dip galvanized steel sheet with a reduction ratio of 5.00% or less after the hot-dip galvanized layer is alloyed.

13. A method of manufacturing the high-strength hot-dip galvanized steel sheet excellent in bake hardenability according to claim 1, comprising:
- a heating step of heating a base steel sheet containing, in mass %,
- C: 0.075 to 0.400%,
- Si: 0.01 to 2.00%,
- Mn: 0.80 to 3.50%,
- P: 0.0001 to 0.100%,
- S: 0.0001 to 0.0100%,
- Al: 0.001 to 2.00%,
- N: 0.0001 to 0.0100%, and
- O: 0.0001 to 0.0100%,
- with the balance made up of Fe and inevitable impurities, to 1180° C. or more;
- a hot-rolling step of performing hot-rolling by plural passes such that a relationship among a temperature "T" of a hot-rolled steel sheet within a range from 1050° C. to a rolling completion temperature, a sheet thickness "h", and an elapsed time "t" between each pass satisfies Numerical Expression 1 after the heating step, wherein a finishing temperature of the hot-rolling is at a temperature range of 880° C. or more;
- a first cooling step of cooling the hot-rolled steel sheet, wherein the cooling is started 1.0 second or more after completion of the hot-rolling step, and the cooling is stopped at 450° C. or more;
- a second cooling step of further cooling the hot-rolled steel sheet down to 400° C. after the first cooling step, wherein an elapsed time from completion of the first cooling step to a point when the hot-rolled steel sheet is cooled down to 400° C. is 1.0 hour or more;
- a cold-rolling step of performing cold-rolling with a total reduction ratio of 30 to 75% after the second cooling step;
- a continuous annealing step of annealing at a maximum heating temperature of ($Ac_3$-50)° C. or more after the cold-rolling step to obtain an annealed steel sheet;
- a third cooling step of cooling the annealed steel sheet at a range of 740° C. to 500° C., at an average cooling rate of 1.0° C/second or more to obtain a cooled steel sheet, after the continuous annealing step;
- a bainite transformation step of retaining the cooled steel sheet at a temperature within a range of 300 to 470° C. for 20 to 1000 seconds after the third cooling step, to cause a bainite transformation in the cooled steel sheet; and
- a plating step of forming a hot-dip galvanized layer at a surface of the cooled steel sheet by immersing the cooled steel sheet into a galvanizing bath after the bainite transformation step,

[Numerical Expression 1]

$$0.10 \leq \left\{ \sum_{i=1}^{N} (5.20 \times 10^{-6} \cdot T_i^3 - 1.06 \times 10^{-2} \cdot T_i^2 + 1.68 \times 10 \cdot T_i - 5.67 \times 10^3)^2 \cdot \left(\frac{h_{i-1}}{h_i}\right)^2 \cdot \exp\left(-\frac{2.20 \times 10^4}{T_i}\right) \cdot t_i \right\}^{0.5} \leq 1.00 \quad (1)$$

wherein "N" represents a total number of passes from the hot-rolling start to completion, "i" represents an order of each pass, "$T_i$" represents a rolling temperature (° C.) at the i-th pass, "$h_i$" represents a sheet thickness (mm) after the processing of the i-th pass, "$t_i$" represents an elapsed time from the i-th pass to the next pass, and when i=1, $h_0$=a slab thickness; and wherein an elapsed time from a final pass to the next pass is an elapsed time from the final pass to the cooling start time after the hot-rolling completion.

14. The method according to claim 13, wherein in the plating step, oxides are generated at a surface layer portion of the annealed steel sheet at a preheating zone where an air ratio being a ratio between a volume of air contained in mixed gas in a unit volume in the mixed gas of air and fuel gas used for heating and a volume of air theoretically required to enable complete combustion of the fuel gas contained in the mixed gas in a unit volume is set at 0.7 to 1.2, subsequently the oxides are reduced at a reduction zone where a partial pressure ratio ($P(H_2O)/P(H_2)$) between $H_2O$ and $H_2$ is set to be 0.0001 to 2.0, and thereafter, the annealed steel sheet is immersed into the galvanizing bath under a condition in which a plating bath temperature is 450 to 470° C., a steel sheet temperature when entering into the plating bath is 430 to 490° C., and an effective Al amount in the plating bath is 0.01 to 0.18 mass %, to thereby form the hot-dip galvanized layer at the surface of the annealed steel sheet.

15. The method according to claim 13, further comprising:
- a temper rolling step of performing a rolling for the plated steel sheet with a reduction ratio of 5.00% or less after the plating step is completed.

16. A method of manufacturing a high-strength alloyed hot-dip galvanized steel sheet excellent in bake hardenability, comprising:
- alloying the hot-dip galvanized layer after the high-strength hot-dip galvanized steel sheet is manufactured by the manufacturing method according to claim 13.

17. The method according to claim 16, further comprising:
- a temper rolling step of performing a rolling for the high-strength hot-dip galvanized steel sheet with a reduction ratio of 5.00% or less after the hot-dip galvanized layer is alloyed.

18. A method of manufacturing the high-strength hot-dip galvanized steel sheet excellent in bake hardenability according to claim 1, comprising:
- a heating step of heating a base steel sheet containing, in mass %,
- C: 0.075 to 0.400%,
- Si: 0.01 to 2.00%,
- Mn: 0.80 to 3.50%,
- P: 0.0001 to 0.100%,
- S: 0.0001 to 0.0100%,
- Al: 0.001 to 2.00%,
- N: 0.0001 to 0.0100%, and
- O: 0.0001 to 0.0100%,
- with the balance made up of Fe and inevitable impurities, to 1180° C. or more;
- a hot-rolling step of performing hot-rolling by plural passes such that a relationship among a temperature "T" of a hot-rolled steel sheet within a range from 1050° C. to a rolling completion temperature, a sheet thickness "h", and an elapsed time "t" between each pass satisfies Numerical Expression 1 after the heating step, wherein a finishing temperature of the hot-rolling is at a temperature range of 880° C. or more;
- a first cooling step of cooling the hot-rolled steel sheet, wherein the cooling is started 1.0 second or more after completion of the hot-rolling step, and the cooling is stopped at 450° C. or more;

a second cooling step of further cooling the hot-rolled steel sheet down to 400° C. after the first cooling step, wherein an elapsed time from completion of the first cooling step to a point when the hot-rolled steel sheet is cooled down to 400° C. is 1.0 hour or more;

a cold-rolling step of performing cold-rolling with a total reduction ratio of 30 to 75% after the second cooling step;

a continuous annealing step of annealing at a maximum heating temperature of $(Ac_3-50)°$ C. or more after the cold-rolling step to obtain an annealed steel sheet;

a third cooling step of cooling the annealed steel sheet at a range of 740° C. to 500° C., at an average cooling rate of 1.0° C./second or more to obtain a cooled steel sheet, after the continuous annealing step;

a plating step of forming a hot-dip galvanized layer at a surface of the cooled steel sheet by immersing the cooled steel sheet into a galvanizing bath after the third cooling step, so as to obtain a plated steel sheet; and a bainite transformation step of retaining the plated steel sheet at a temperature within a range of 300 to 470° C. for 20 to 1000 seconds after the plating step, to cause a bainite transformation in the plated steel sheet,

[Numerical Expression 1]

$$0.10 \leq \left\{ \sum_{i=1}^{N} (5.20 \times 10^{-6} \cdot T_i^3 - 1.06 \times 10^{-2} \cdot T_i^2 + 1.68 \times 10 \cdot T_i - 5.67 \times 10^3)^2 \cdot \left(\frac{h_{i-1}}{h_i}\right)^2 \cdot \exp\left(-\frac{2.20 \times 10^4}{T_i}\right) \cdot t_i \right\}^{0.5} \leq 1.00 \quad (1)$$

wherein "N" represents a total number of passes from the hot-rolling start to completion, "i" represents an order of each pass, "$T_i$" represents a rolling temperature (° C.) at the i-th pass, "$h_i$" represents a sheet thickness (mm) after the processing of the i-th pass, "$t_i$" represents an elapsed time from the i-th pass to the next pass, and when i=1, $h_0$=a slab thickness; and wherein an elapsed time from a final pass to the next pass is an elapsed time from the final pass to the cooling start time after the hot-rolling completion.

19. The method according to claim 18, wherein in the plating step, oxides are generated at a surface layer portion of the annealed steel sheet at a preheating zone where an air ratio being a ratio between a volume of air contained in mixed gas in a unit volume in the mixed gas of air and fuel gas used for heating and a volume of air theoretically required to enable complete combustion of the fuel gas contained in the mixed gas in a unit volume is set at 0.7 to 1.2, subsequently the oxides are reduced at a reduction zone where a partial pressure ratio ($P(H_2O)/P(H_2)$) between $H_2O$ and $H_2$ is set to be 0.0001 to 2.0, and thereafter, the annealed steel sheet is immersed into the galvanizing bath under a condition in which a plating bath temperature is 450 to 470° C., a steel sheet temperature when entering into the plating bath is 430 to 490° C., and an effective Al amount in the plating bath is 0.01 to 0.18 mass %, to thereby form the hot-dip galvanized layer at the surface of the annealed steel sheet.

20. The method according to claim 18, further comprising:
a temper rolling step of performing a rolling for the plated steel sheet with a reduction ratio of 5.00% or less after the bainite transformation is caused.

21. A method of manufacturing a high-strength alloyed hot-dip galvanized steel sheet excellent in bake hardenability, comprising:
alloying the hot-dip galvanized layer after the high-strength hot-dip galvanized steel sheet is manufactured by the manufacturing method according to claim 18.

22. The method according to claim 21, further comprising:
a temper rolling step of performing a rolling for the high-strength hot-dip galvanized steel sheet with a reduction ratio of 5.00% or less after the alloying step.

* * * * *